United States Patent
Van Ostrand et al.

(10) Patent No.: US 11,797,120 B2
(45) Date of Patent: *Oct. 24, 2023

(54) SCREEN-TO-SCREEN PACKAGE FORMATS

(71) Applicant: SigmaSense, LLC., Wilmington, DE (US)

(72) Inventors: Daniel Keith Van Ostrand, Leander, TX (US); Gerald Dale Morrison, Redmond, WA (US); Richard Stuart Seger, Jr., Belton, TX (US); Timothy W. Markison, Mesa, AZ (US)

(73) Assignee: SigmaSense, LLC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,630

(22) Filed: Nov. 30, 2021

(65) Prior Publication Data

US 2022/0083166 A1 Mar. 17, 2022

Related U.S. Application Data

(63) Continuation of application No. 16/882,875, filed on May 26, 2020, now Pat. No. 11,221,704.

(Continued)

(51) Int. Cl.
*G06F 3/041* (2006.01)
*G06F 3/01* (2006.01)
*G06F 3/044* (2006.01)

(52) U.S. Cl.
CPC ............ *G06F 3/0414* (2013.01); *G06F 3/016* (2013.01); *G06F 3/044* (2013.01); *G06F 3/041662* (2019.05)

(58) Field of Classification Search
CPC .... G06F 3/016; G06F 3/0414; G06F 3/04162; G06F 3/041662; G06F 3/044;

(Continued)

(56) References Cited

U.S. PATENT DOCUMENTS 6,218,972 B1 4/2001 Groshong
6,665,013 B1 12/2003 Fossum et al.
(Continued)

FOREIGN PATENT DOCUMENTS

CN 103995626 A 8/2014
CN 104182105 A 12/2014

OTHER PUBLICATIONS

Baker; How delta-sigma ADCs work, Part 1; Analog Applications Journal; Oct. 1, 2011; 6 pgs.

(Continued)

*Primary Examiner* — Richard J Hong
(74) *Attorney, Agent, or Firm* — Garlick & Markison; Timothy W. Markison; Shayne X. Short

(57) ABSTRACT

A method includes a first computing device generating a signal having an oscillating component and driving the signal on a first touch sense element of the first computing device. The method continues with the first computing device detecting a touch on the first touch sense element based on the signal. While the touch is detected, the method continues by the first computing device modulating the signal with data to produce a modulated data signal. The method continues with a second computing device receiving the modulated data signal via a transmission medium and a second touch sense element of the second computing device, where the transmission medium includes at least one of a human body and a close proximity between the first and second computing devices. The method continues with by the second computing device demodulating the modulated data signal to recover the data.

20 Claims, 61 Drawing Sheets
(9 of 61 Drawing Sheet(s) Filed in Color)

Related U.S. Application Data

(60) Provisional application No. 62/970,306, filed on Feb. 5, 2020.

(58) Field of Classification Search
CPC .... G06F 3/04842; G06F 3/1454; G06F 3/017; H04W 12/06; H04W 4/80; H04B 13/005; H04L 63/0853; G07C 9/37
See application file for complete search history.

(56) References Cited

U.S. PATENT DOCUMENTS

| | | |
|---|---|---|
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 10,007,335 B2 | 6/2018 | Lee |
| 2008/0046039 A1* | 2/2008 | Corndorf ............ H04L 63/0853 607/60 |
| 2008/0259043 A1 | 10/2008 | Buil et al. |
| 2010/0102832 A1 | 4/2010 | Bartling et al. |
| 2010/0277435 A1* | 11/2010 | Han .................... G06F 3/04842 345/173 |
| 2010/0289673 A1* | 11/2010 | Kim .................... H04B 13/005 341/20 |
| 2010/0315206 A1 | 12/2010 | Schenk |
| 2011/0063154 A1 | 3/2011 | Hotelling et al. |
| 2011/0227856 A1* | 9/2011 | Corroy ................ H04B 13/005 345/173 |
| 2011/0298745 A1 | 12/2011 | Souchkov |
| 2011/0304583 A1 | 12/2011 | Kruglick |
| 2012/0026129 A1* | 2/2012 | Kawakami ........... H04B 13/005 345/174 |
| 2012/0126944 A1* | 5/2012 | Ueno ....................... G07C 9/37 340/5.82 |
| 2012/0278031 A1 | 11/2012 | Oda |
| 2013/0142363 A1 | 6/2013 | Amento et al. |
| 2013/0278447 A1 | 10/2013 | Kremin |
| 2014/0184555 A1 | 7/2014 | Pi |
| 2014/0199944 A1 | 7/2014 | Ran |
| 2014/0313154 A1* | 10/2014 | Bengtsson ........... H04B 13/005 345/173 |
| 2014/0327644 A1 | 11/2014 | Mohindra |
| 2015/0091847 A1 | 4/2015 | Chang |
| 2015/0092962 A1 | 4/2015 | Amento |
| 2015/0138062 A1 | 5/2015 | Baldwin |
| 2015/0149310 A1 | 5/2015 | He |
| 2015/0150116 A1 | 5/2015 | Baldwin |
| 2015/0242015 A1 | 8/2015 | Cho |
| 2015/0346889 A1 | 12/2015 | Chen |
| 2016/0070899 A1 | 3/2016 | Vemula et al. |
| 2016/0109958 A1* | 4/2016 | Moon .................... G06F 3/017 345/156 |
| 2016/0188049 A1 | 6/2016 | Yang et al. |
| 2016/0286338 A1* | 9/2016 | Bengtsson ............ G06F 3/1454 |
| 2017/0077974 A1* | 3/2017 | Aoki .................... H04W 12/06 |
| 2018/0275804 A1 | 9/2018 | Huang |
| 2018/0275824 A1 | 9/2018 | Li |
| 2018/0316442 A1 | 11/2018 | Kim |
| 2019/0229816 A1 | 7/2019 | Kobayashi |

OTHER PUBLICATIONS

Brian Pisani, "Digital Filter Types in Delta-Sigma ADCs", Application Report SBAA230, May 2017, pp. 1-8, Texas Instruments Incorporated, Dallas, Texas.

International Searching Authority; International Search Report and Written Opinion; International Application No. PCT/US2021/015486; dated May 12, 2021; 8 pgs.

* cited by examiner computing device 12-14 computing device 12-14 computing device 12-14

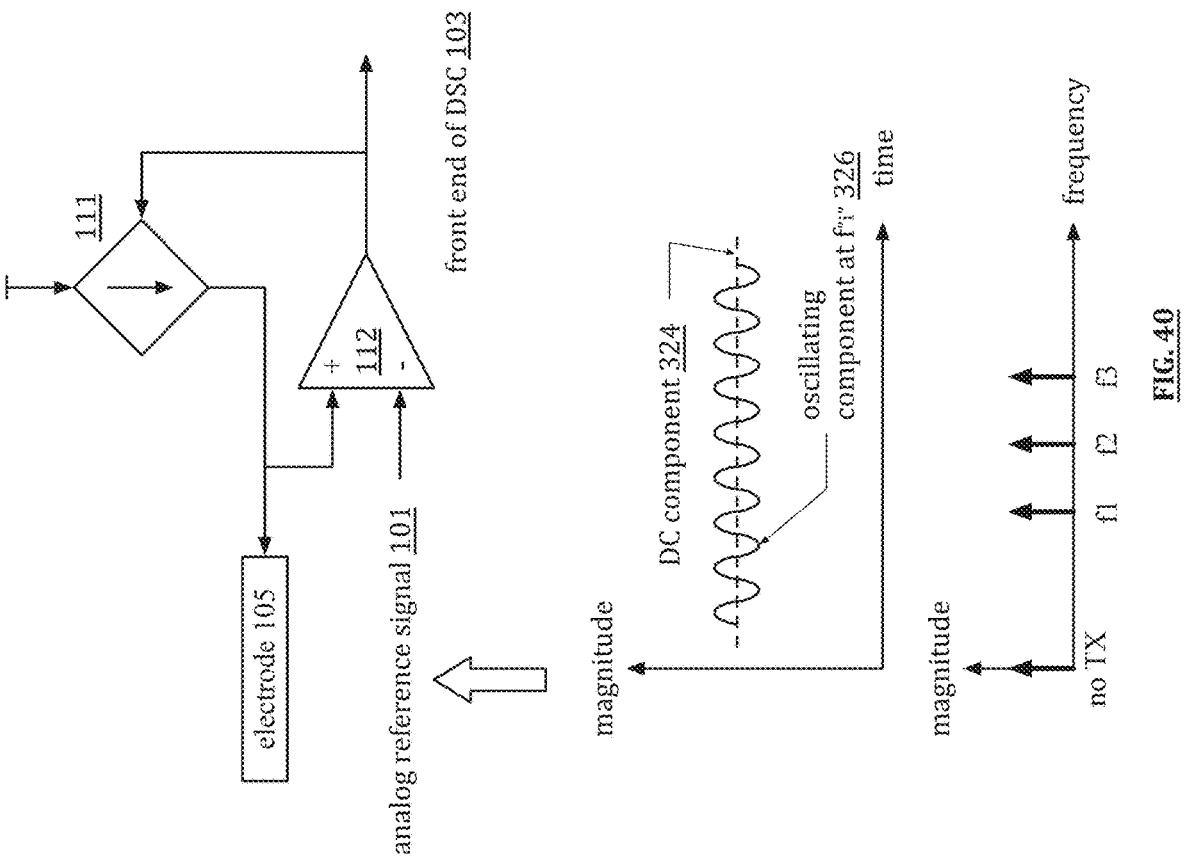

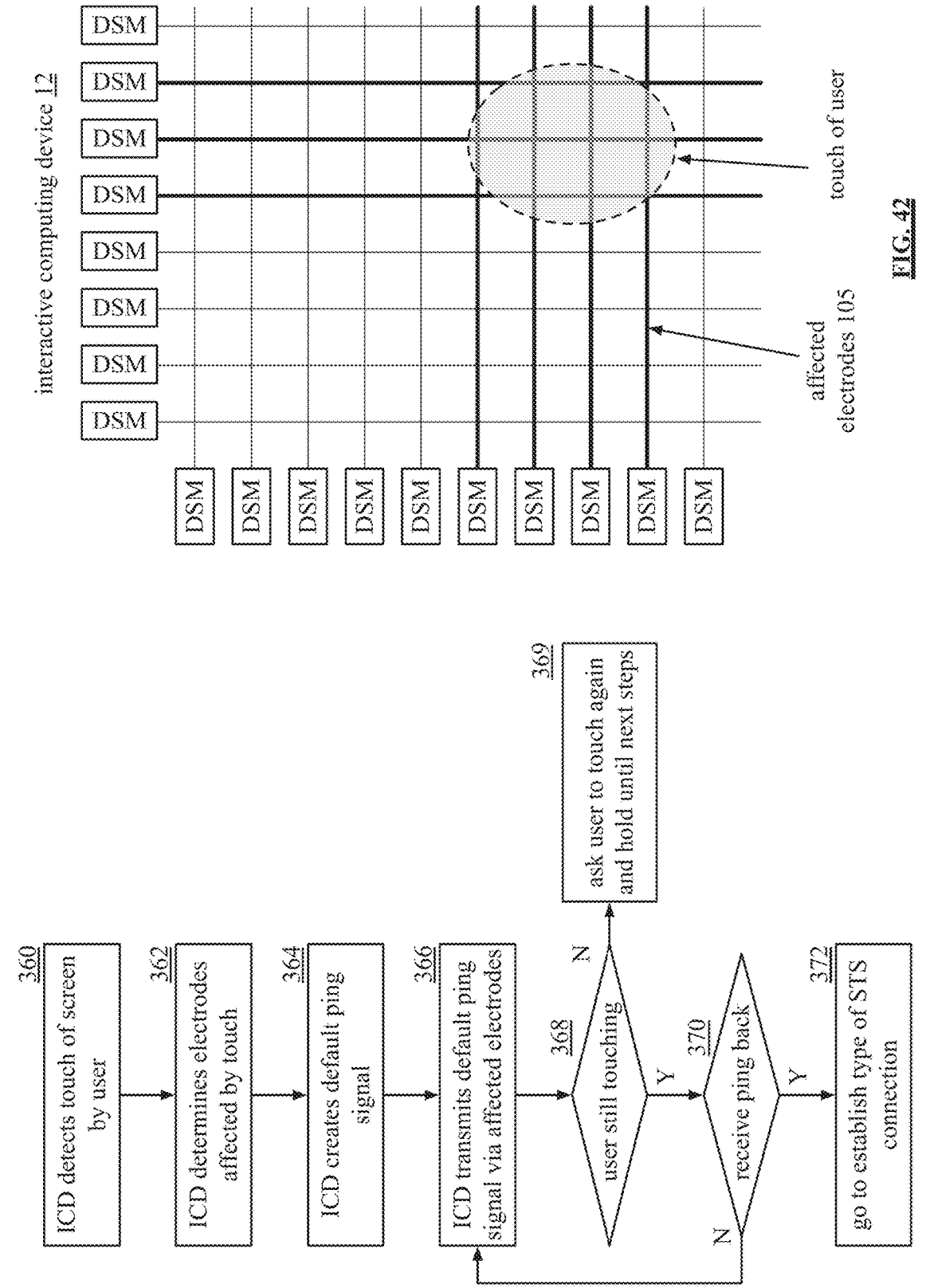

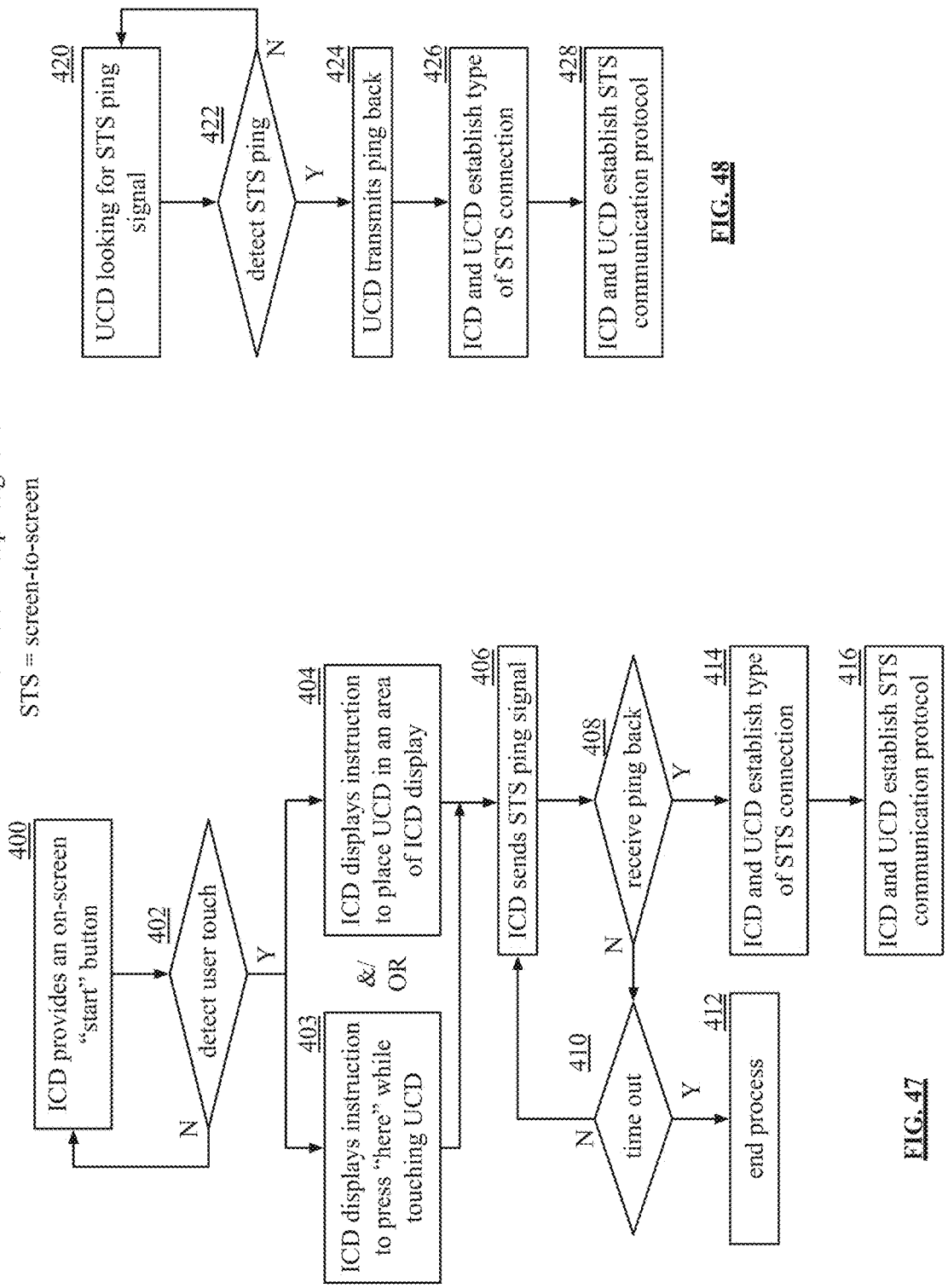

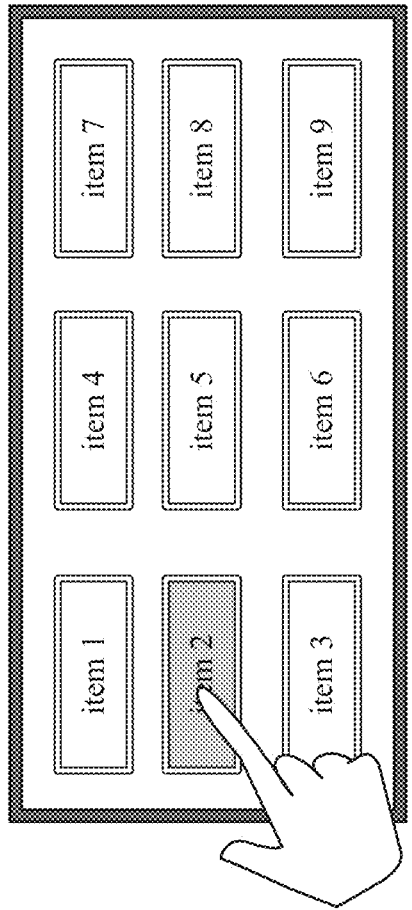
FIG. 51
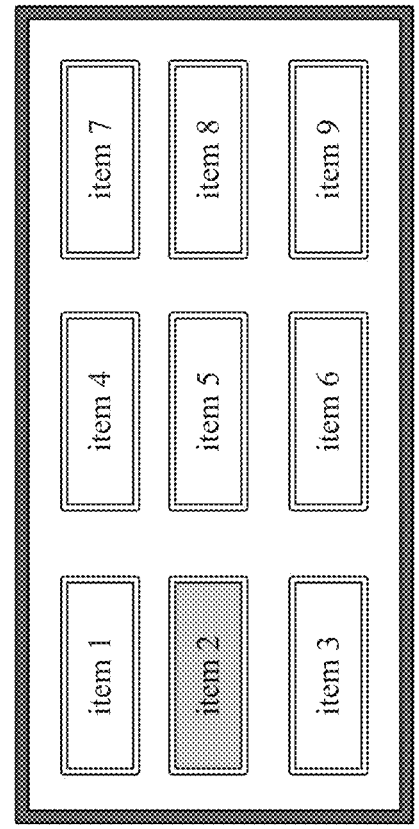
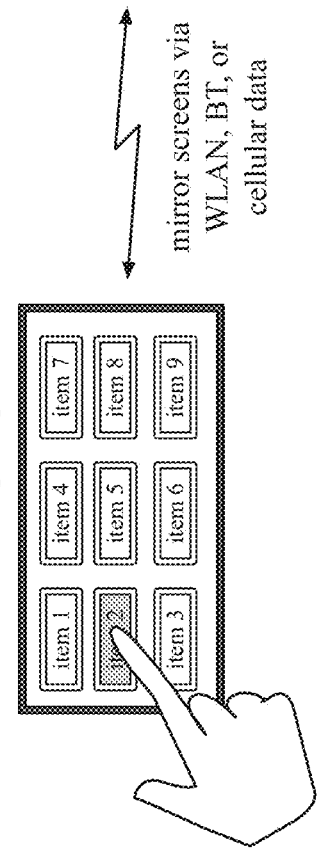
FIG. 52

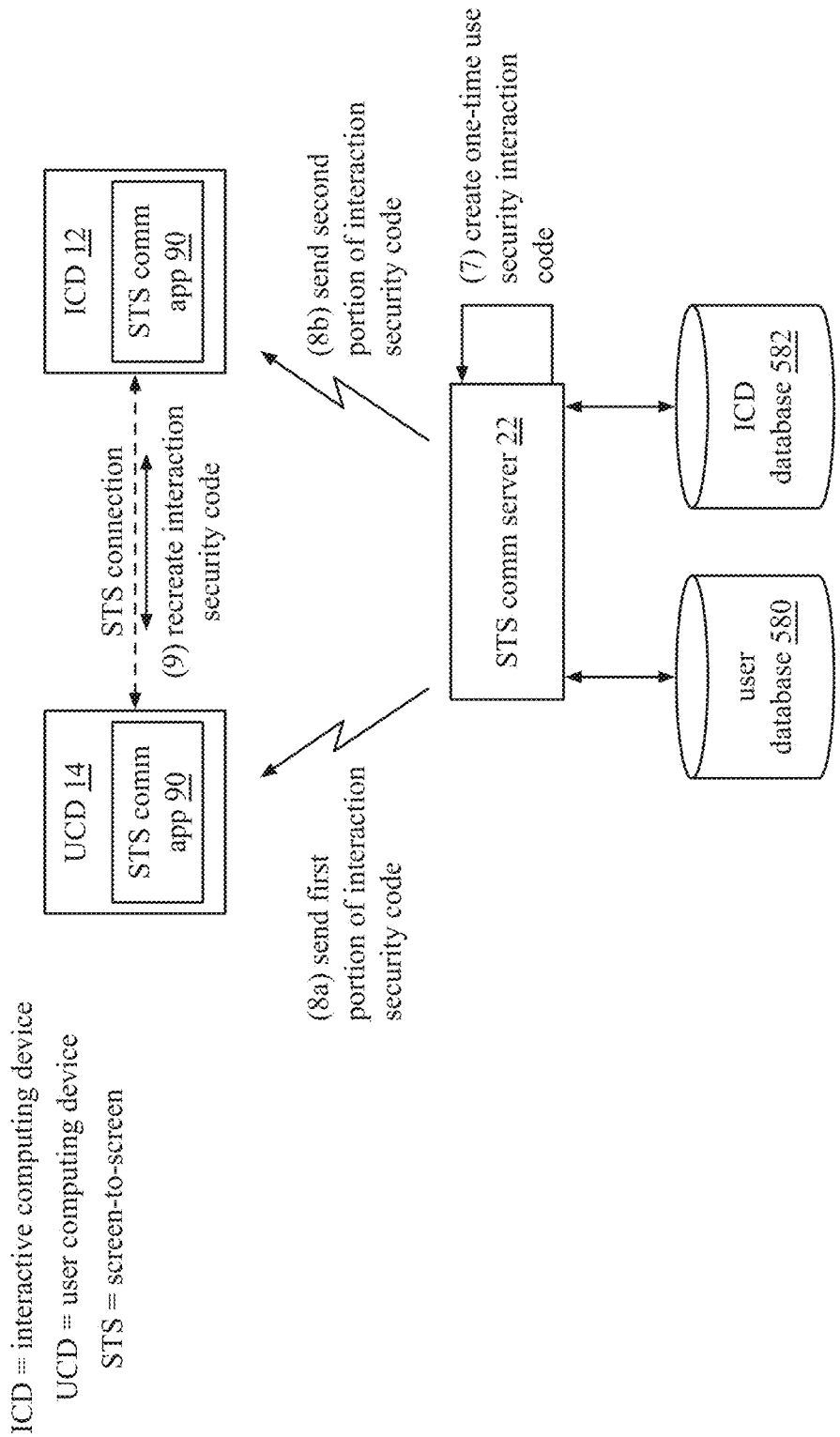

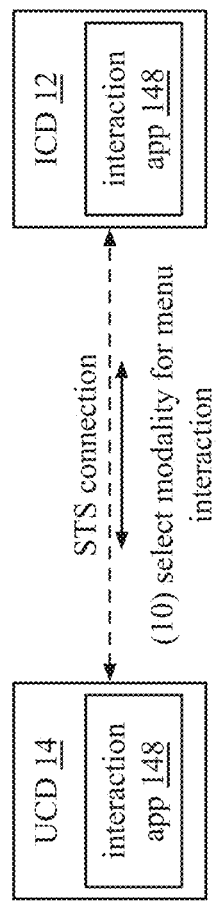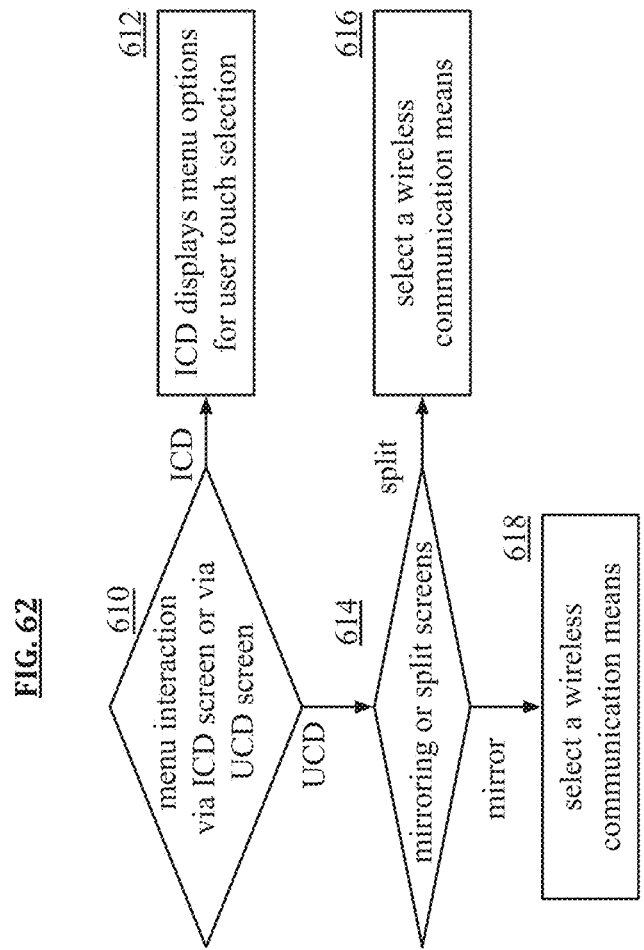

SCREEN-TO-SCREEN PACKAGE FORMATS

CROSS REFERENCE TO RELATED PATENTS

The present U.S. Utility Patent Application claims priority pursuant to 35 U.S.C. § 120 as a continuation of U.S. Utility application Ser. No. 16/882,875, entitled "Screen-To-Screen Communication Via Touch Sense Elements," filed May 26, 2020, pending, which claims priority pursuant to 35 U.S.C. § 119(e) to U.S. Provisional Application No. 62/970,306, entitled "Screen-to-Screen Communication Network and Applications Thereof", filed Feb. 5, 2020, both of which are hereby incorporated herein by reference in their entirety and made part of the present U.S. Utility Patent Applications for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to data communication systems and more particularly to data communication between touch screens.

Description of Related Art

A computing device is known to communicate data, process data, and/or store data. The computing device may be a cellular phone, a laptop, a tablet, a personal computer (PC), a work station, a video game device, a server, and/or a data center that support millions of web searches, stock trades, or on-line purchases every hour.

A computing device may also transmit data to another computing device via a near proximity communication. For example, a computing device may use near field communication (NFC), infrared (IR), and/or Bluetooth (BT) to communicate data over short distances. In some examples, the use of near proximity communications are utilized for point-of-sale (POS) transactions and other data communications where security of the data is desired.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

Figure 34:
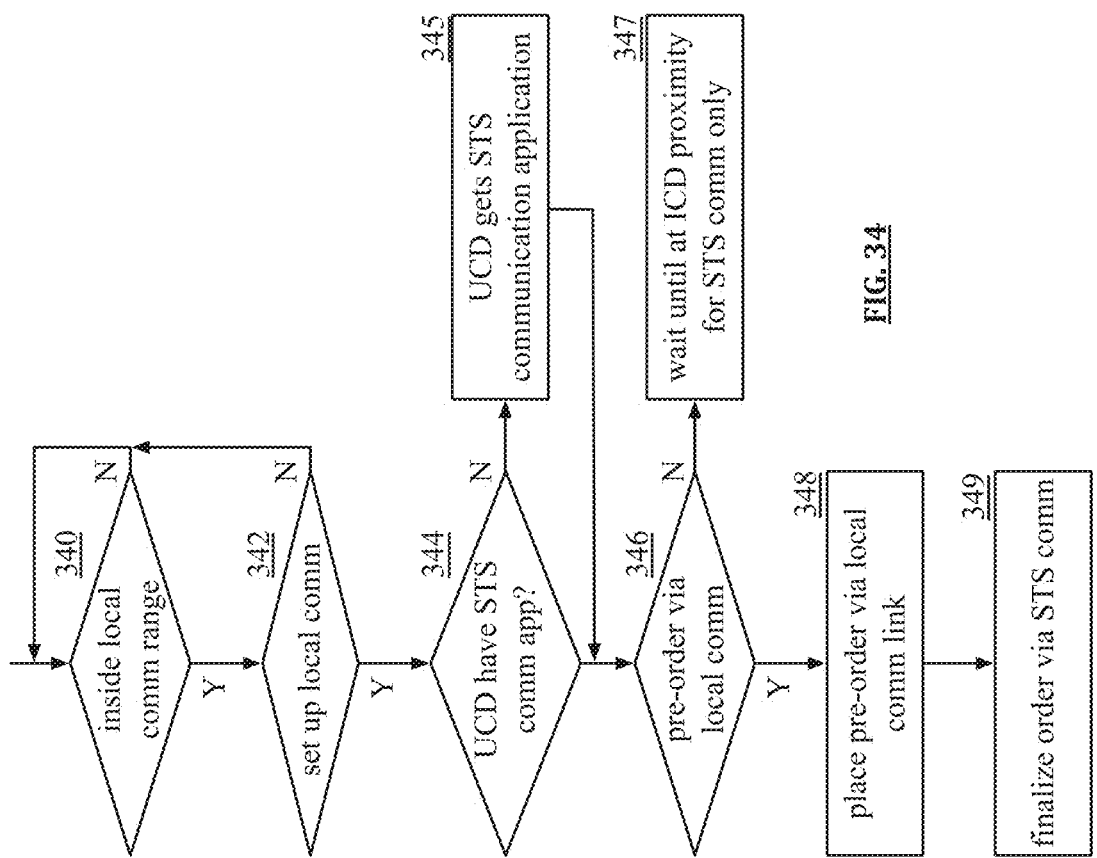
Figure 35:
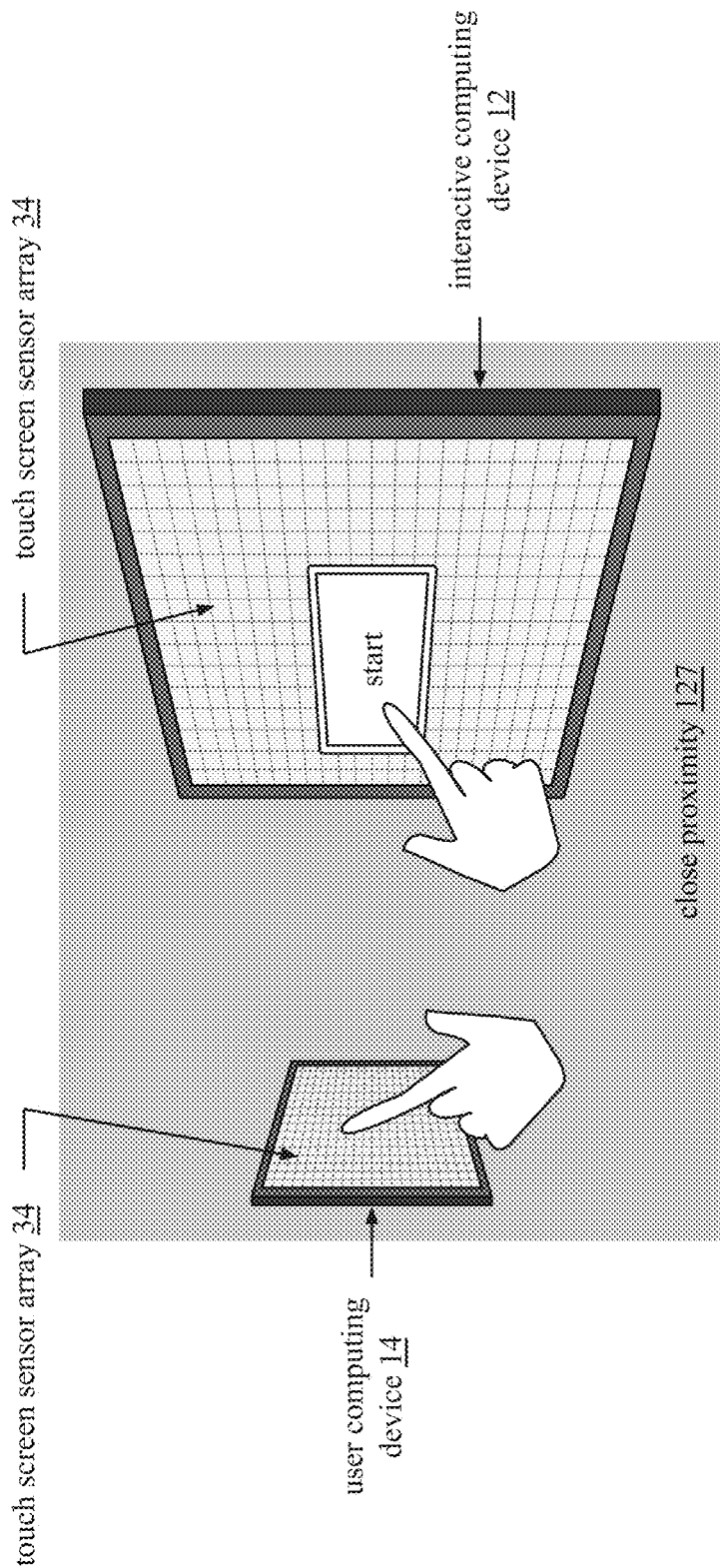
Figure 36:
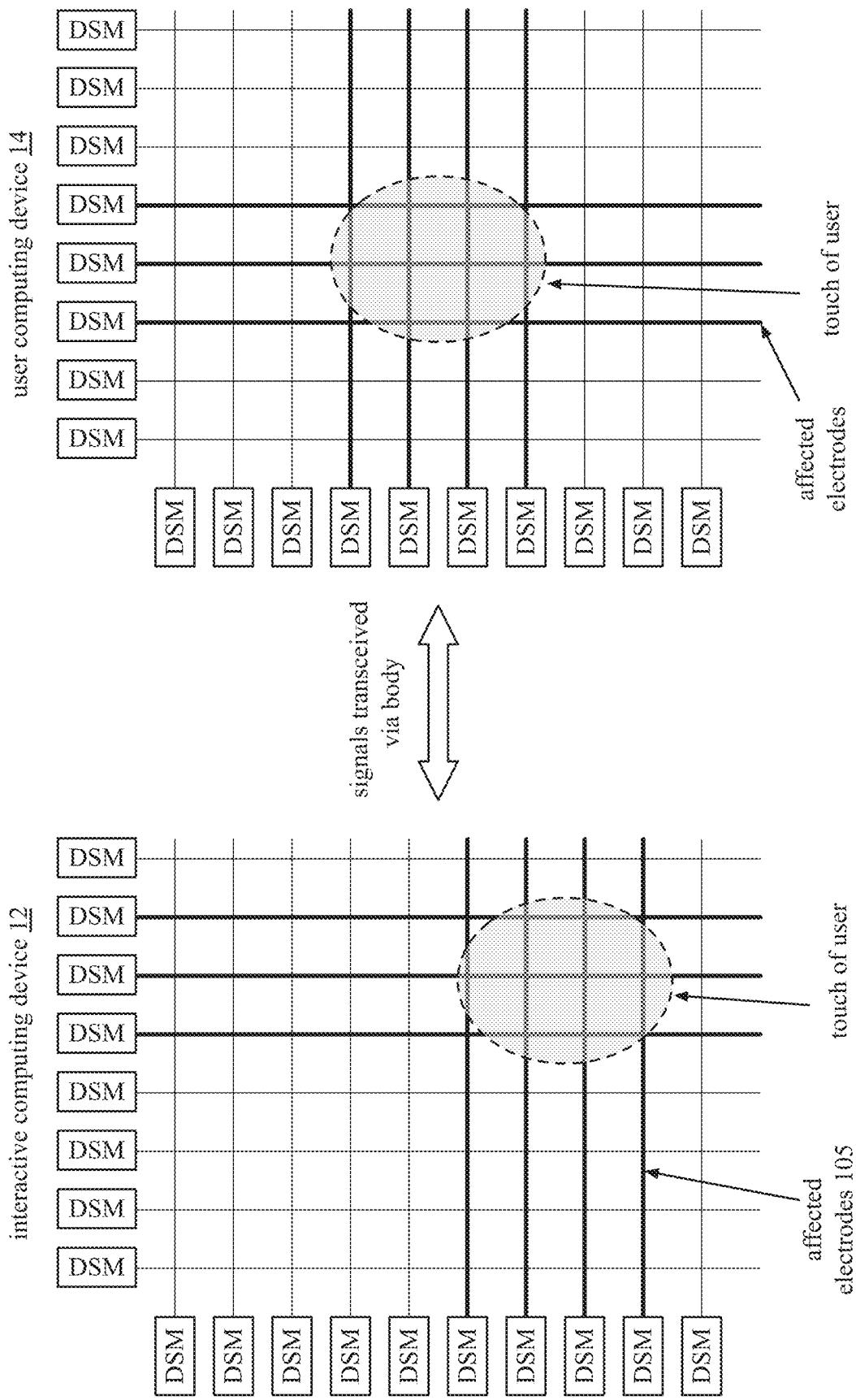
Figures 37, 38:
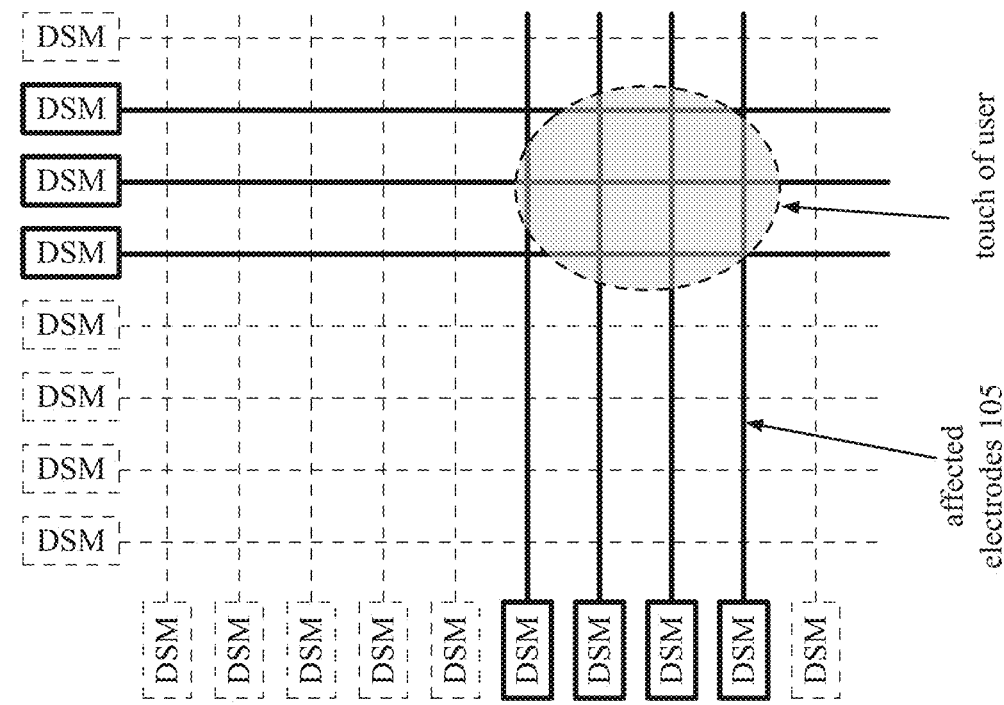
Figure 43:
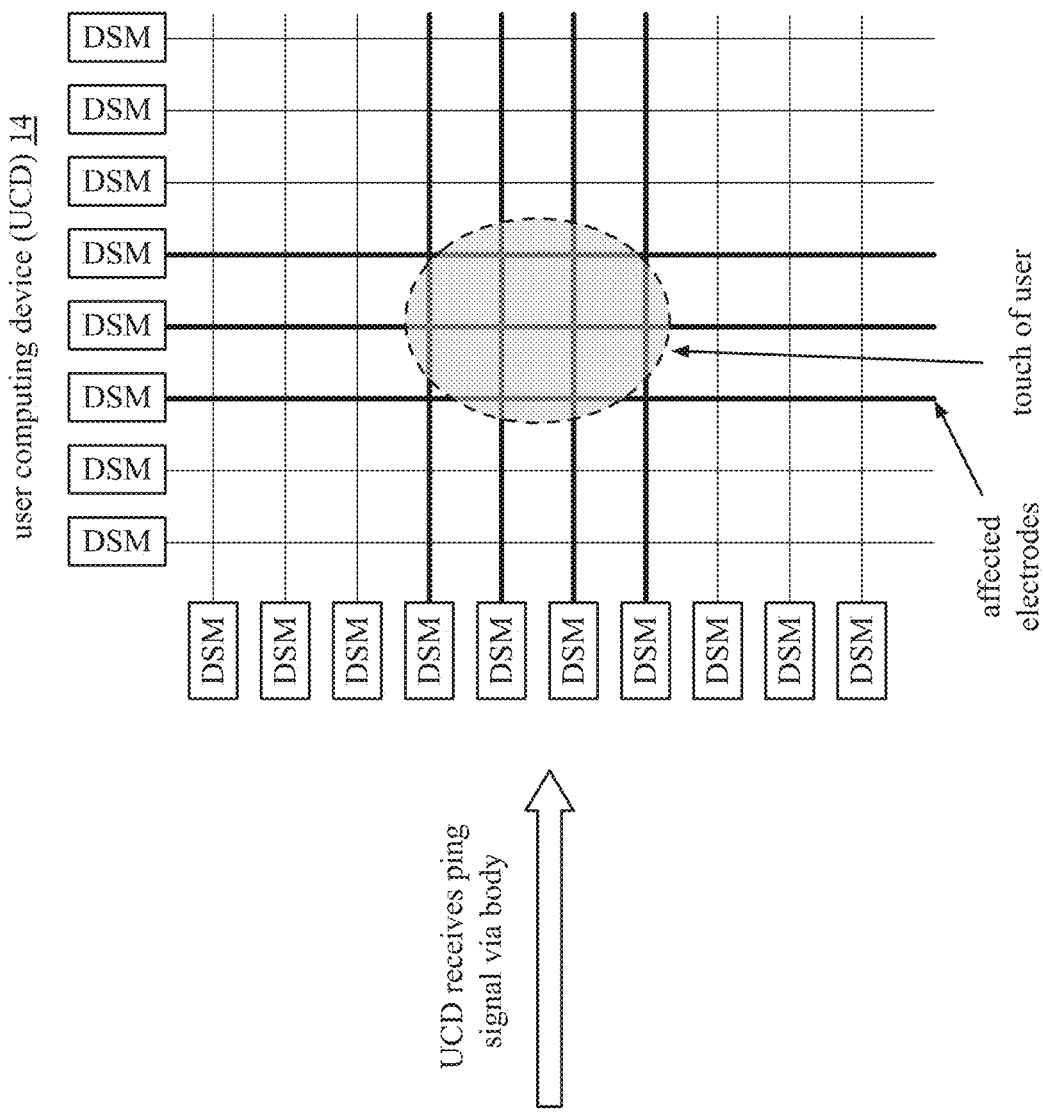
Figure 44:
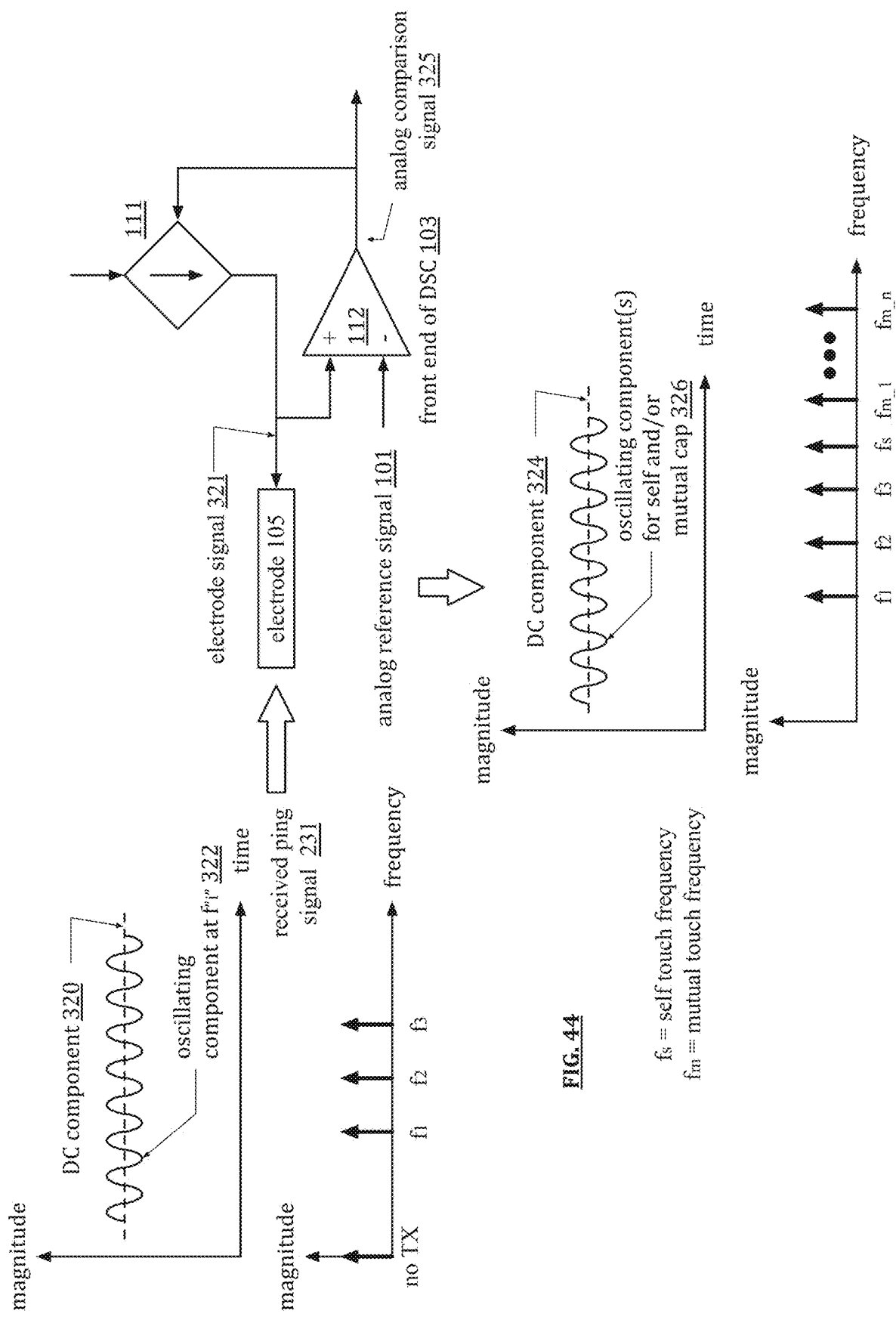
Figure 45:
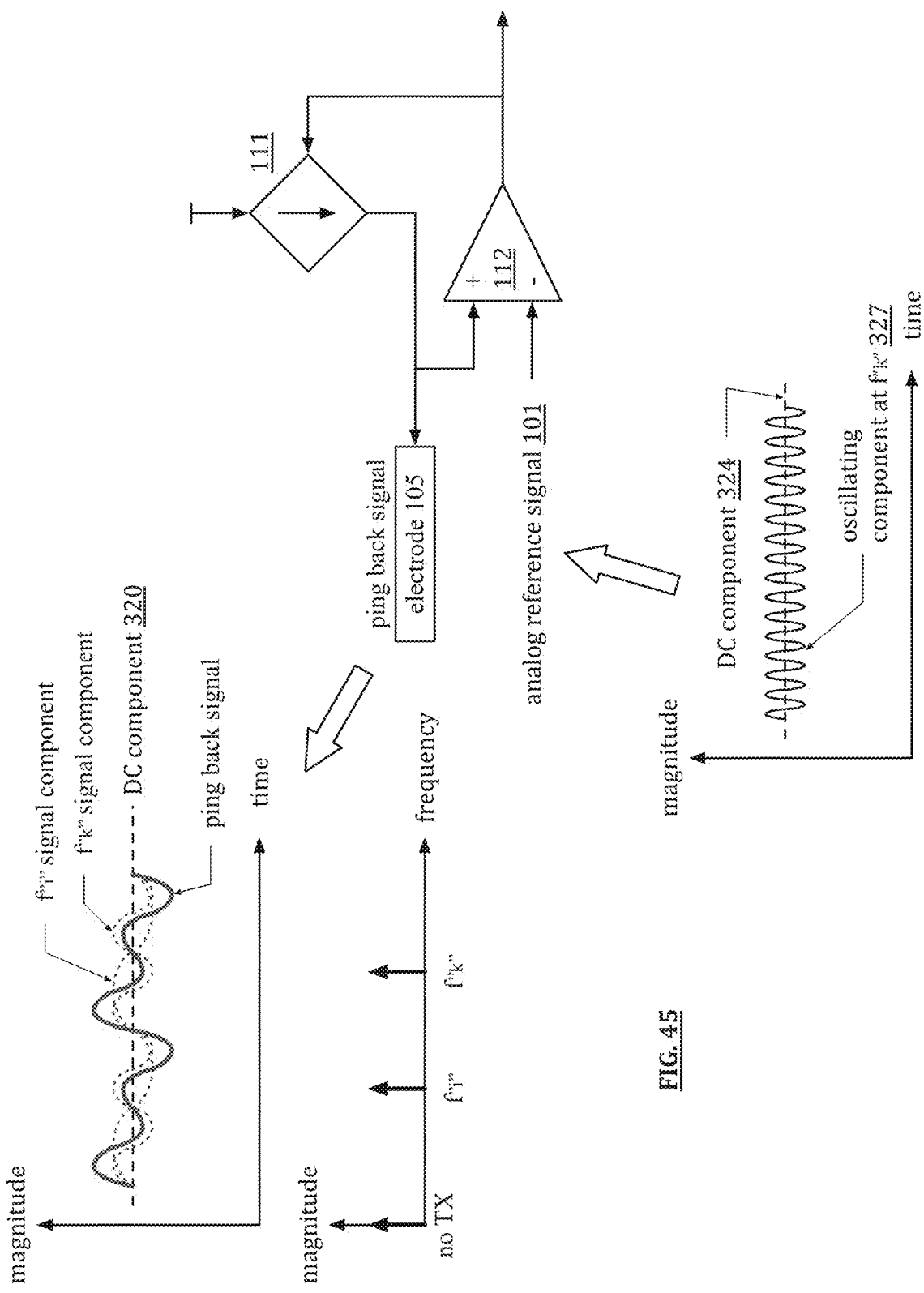
Figure 46:
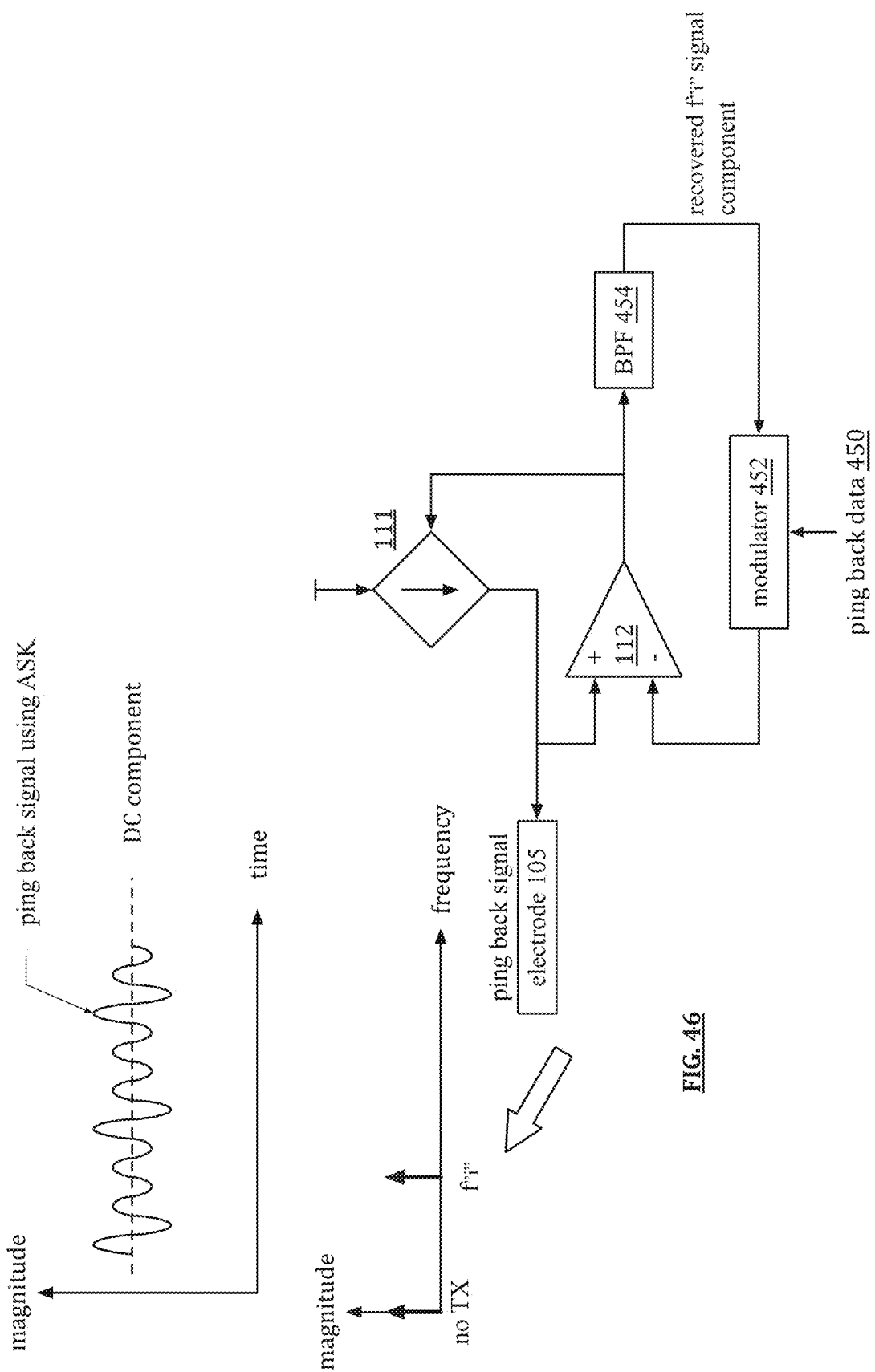
Figure 49:
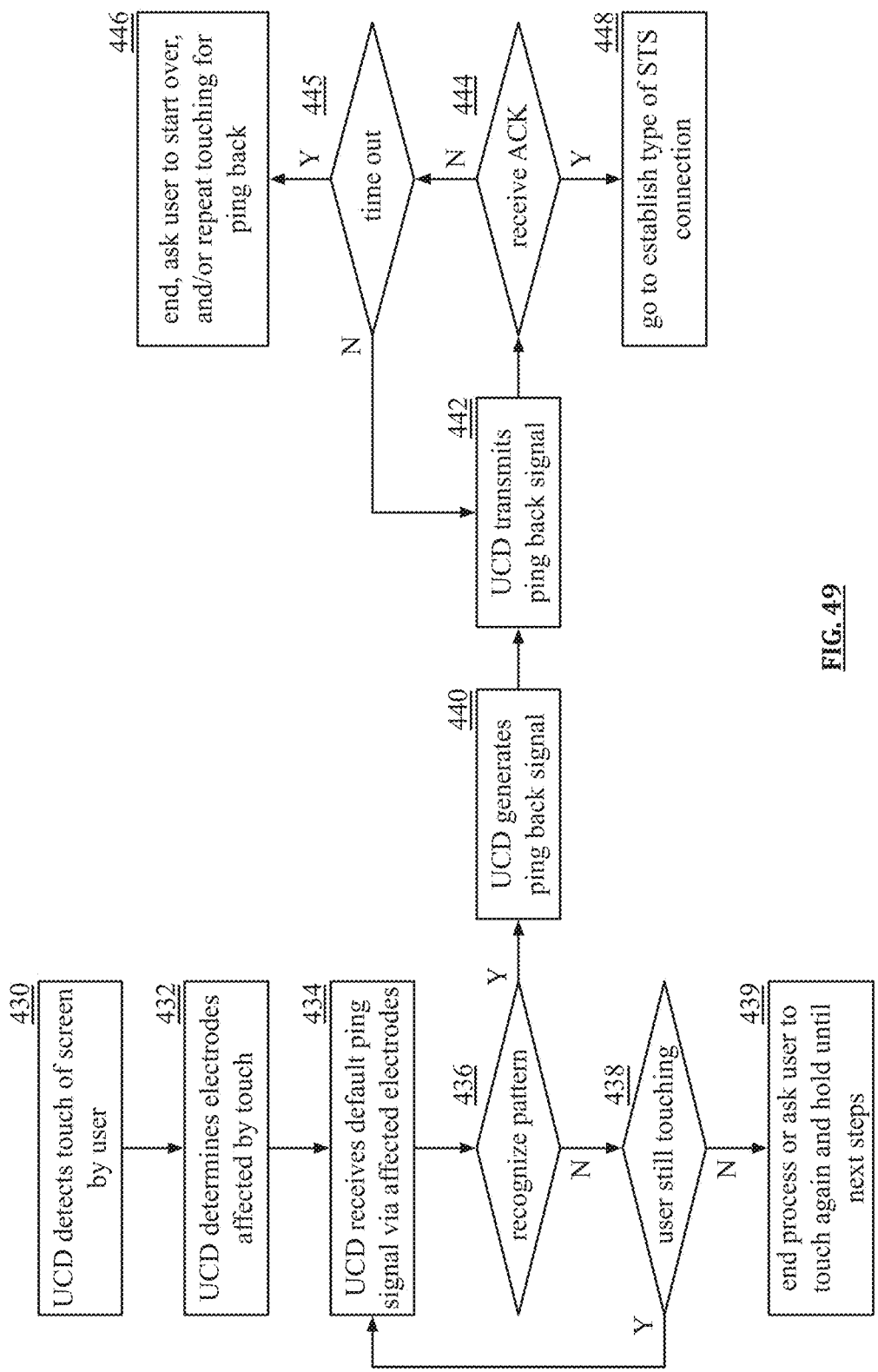
Figure 50:
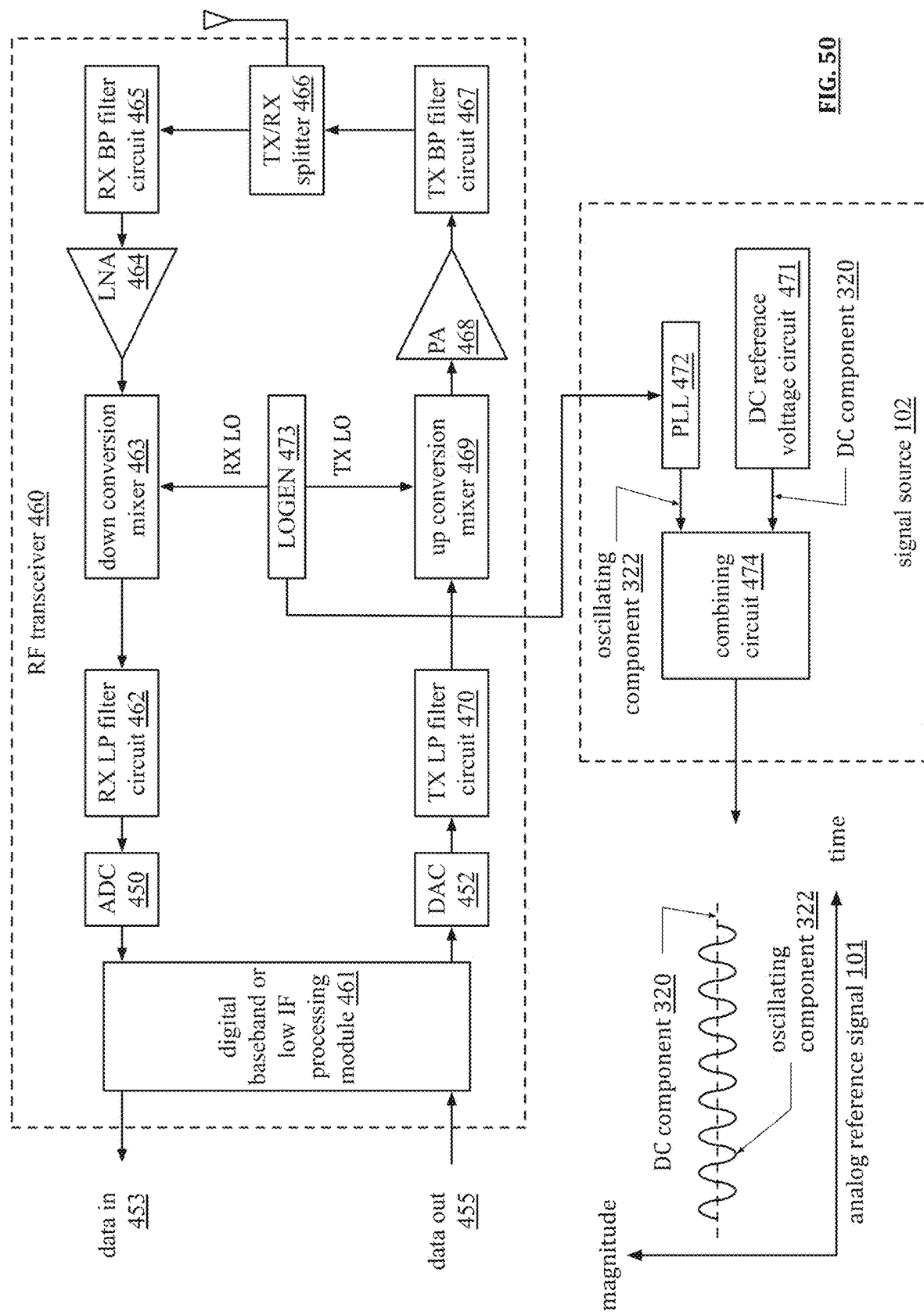
Figure 53:
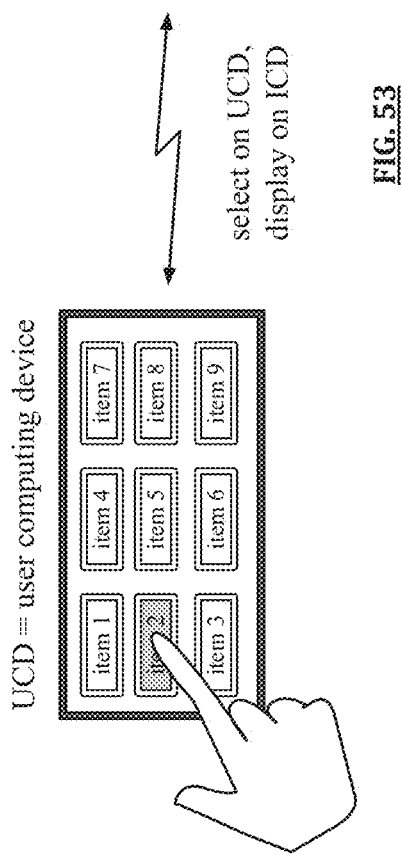
Figure 54:
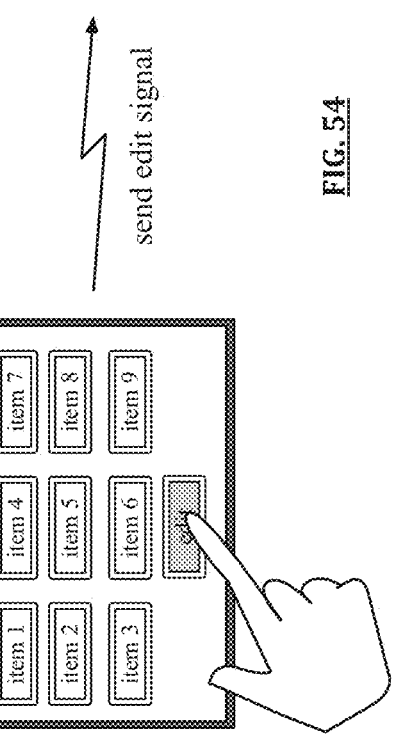
Figure 55:
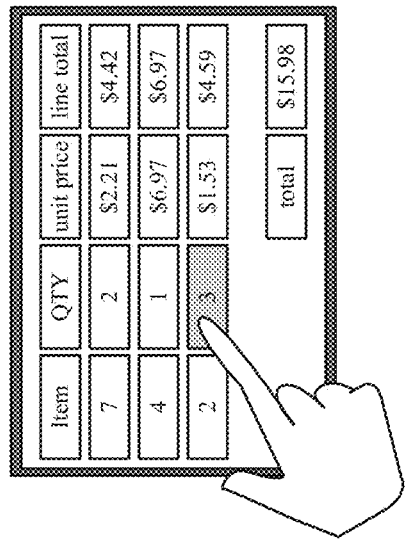
Figure 56:
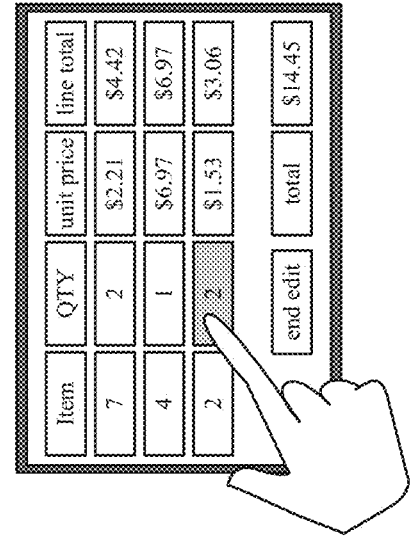
Figure 57:
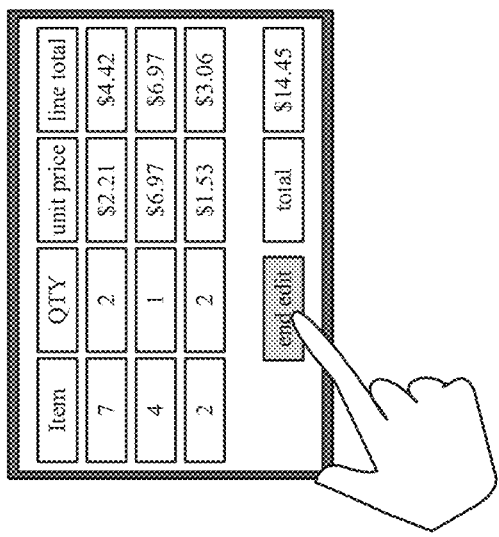
Figure 58:
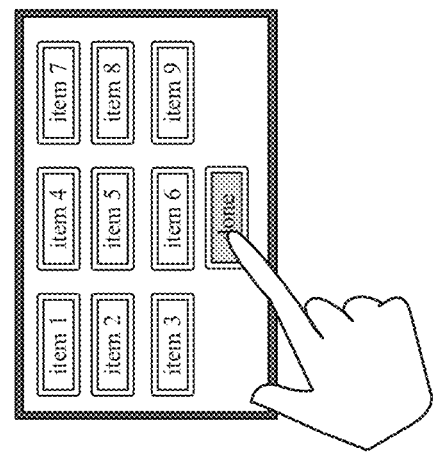
Figure 59:
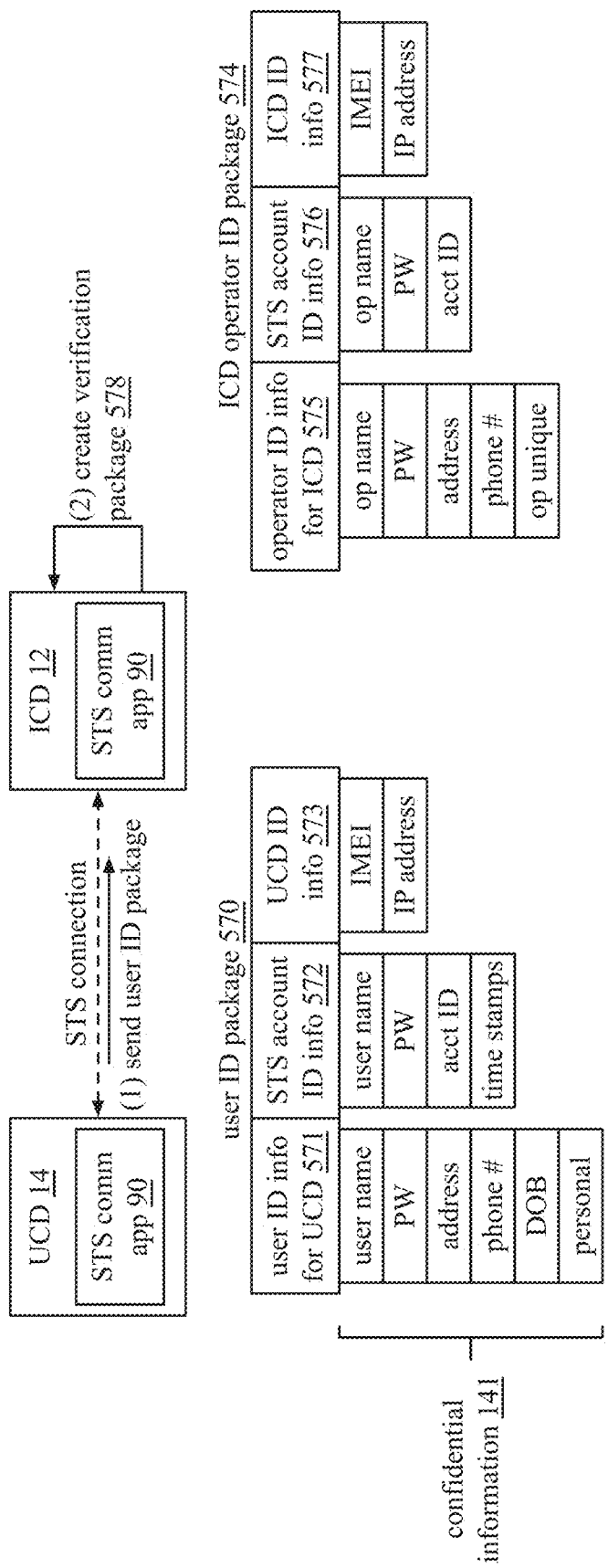
Figure 60:
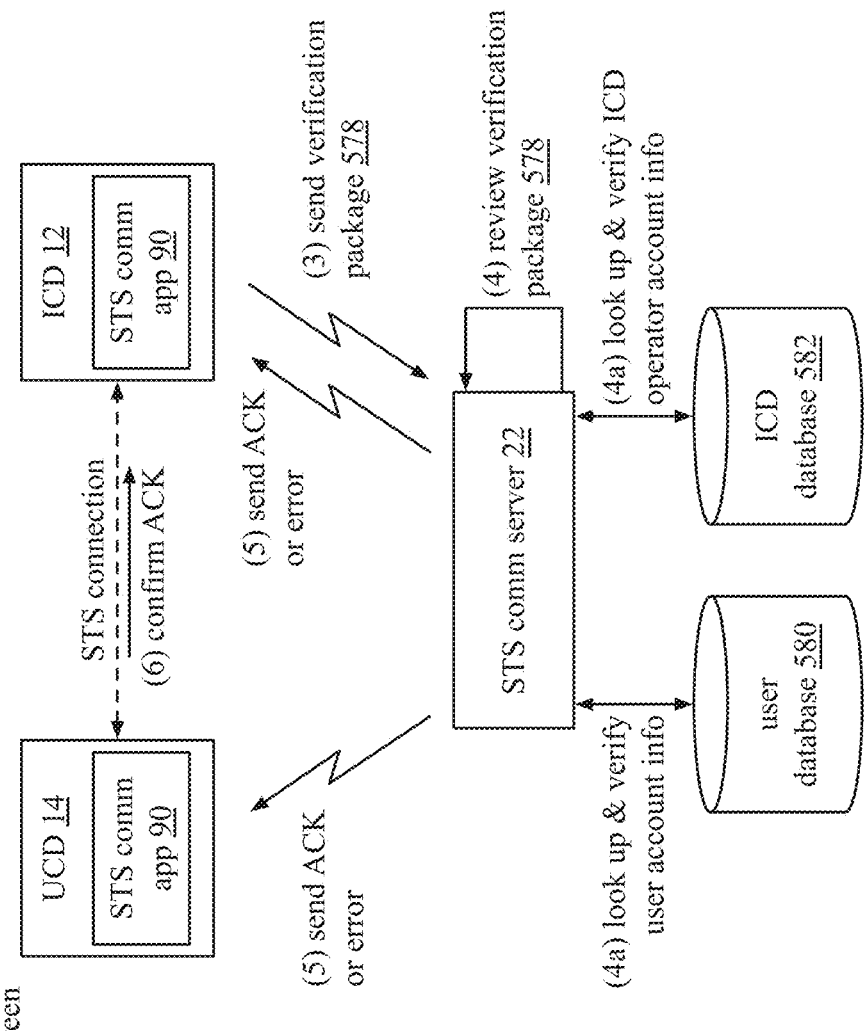
Figure 64:
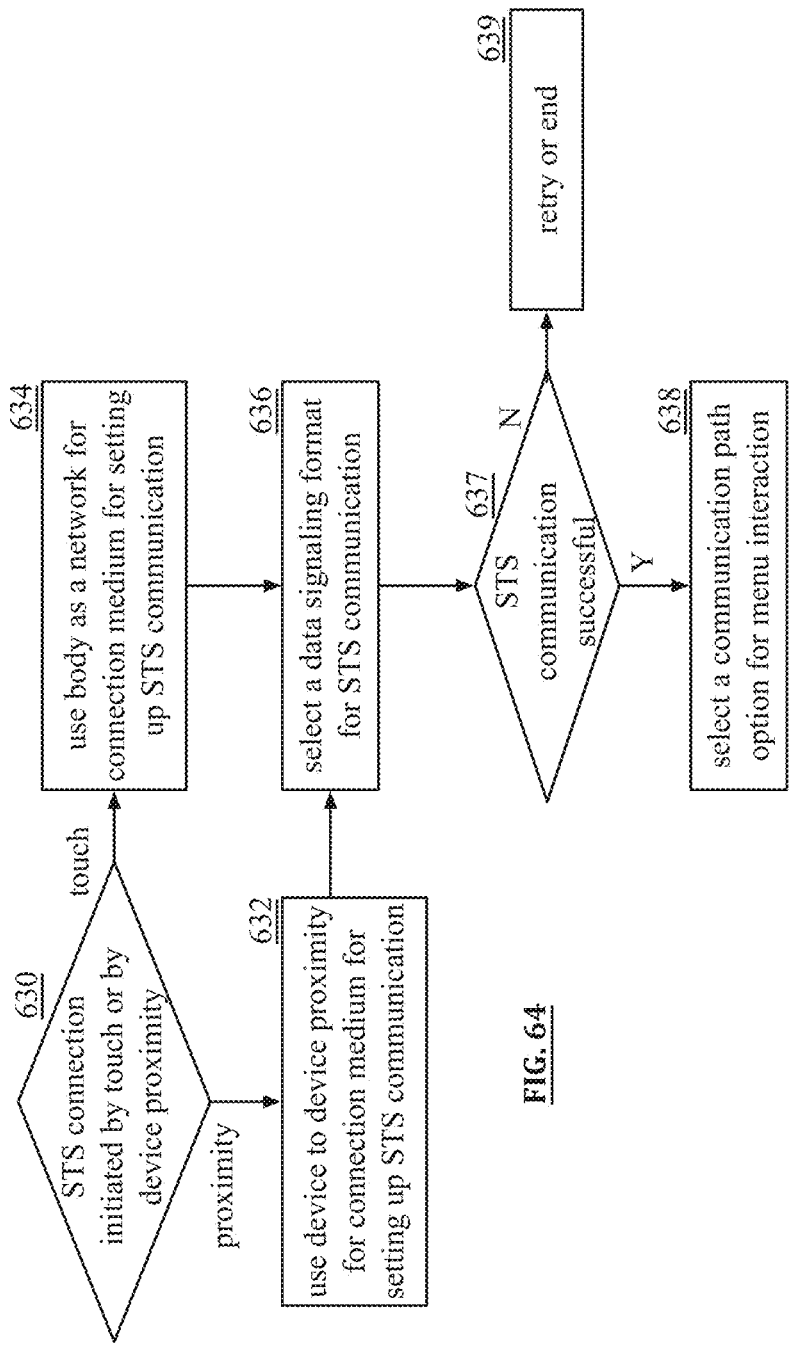
Figure 65:
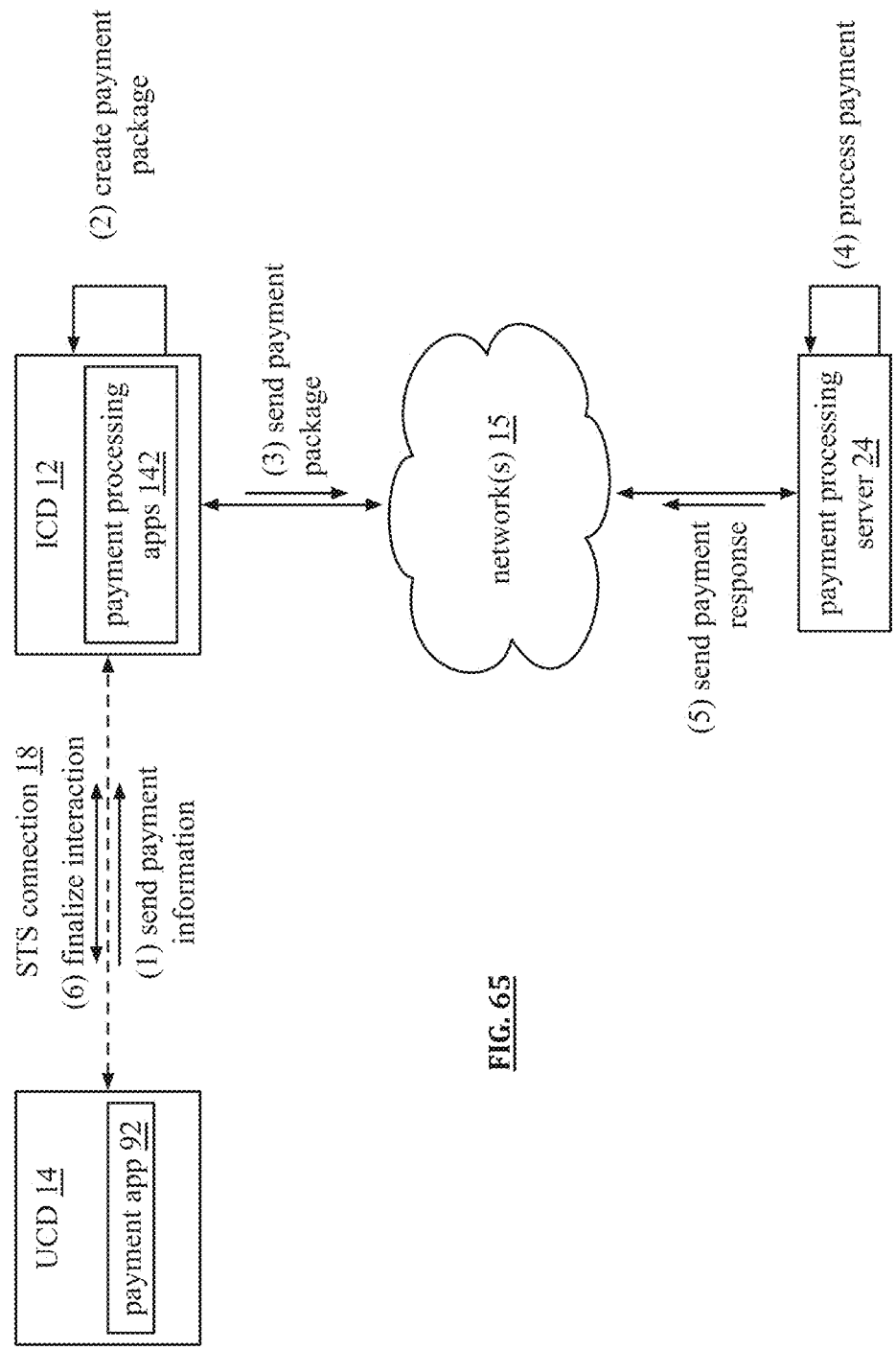
Figure 66:
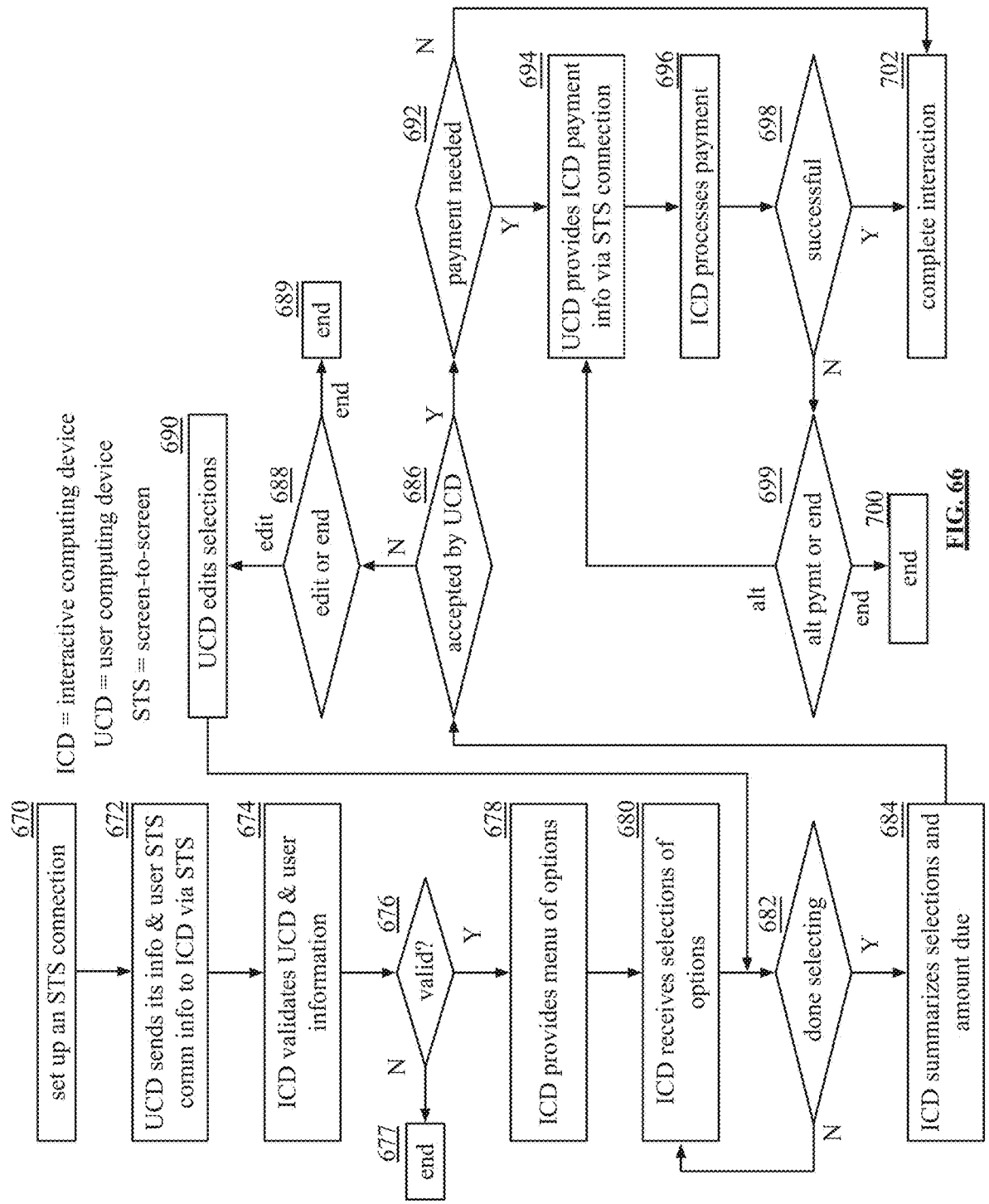
Figure 67:
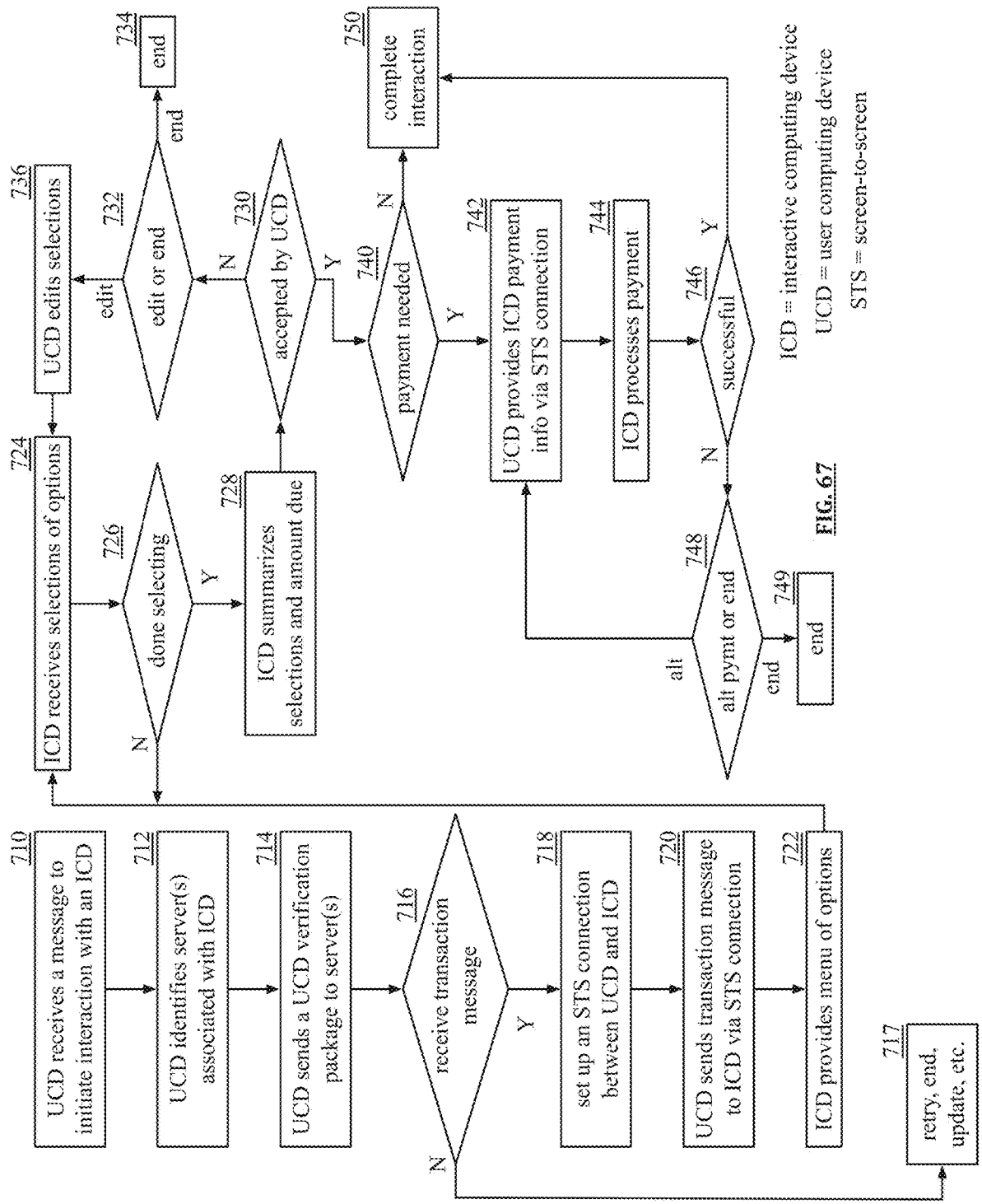
Figure 68:
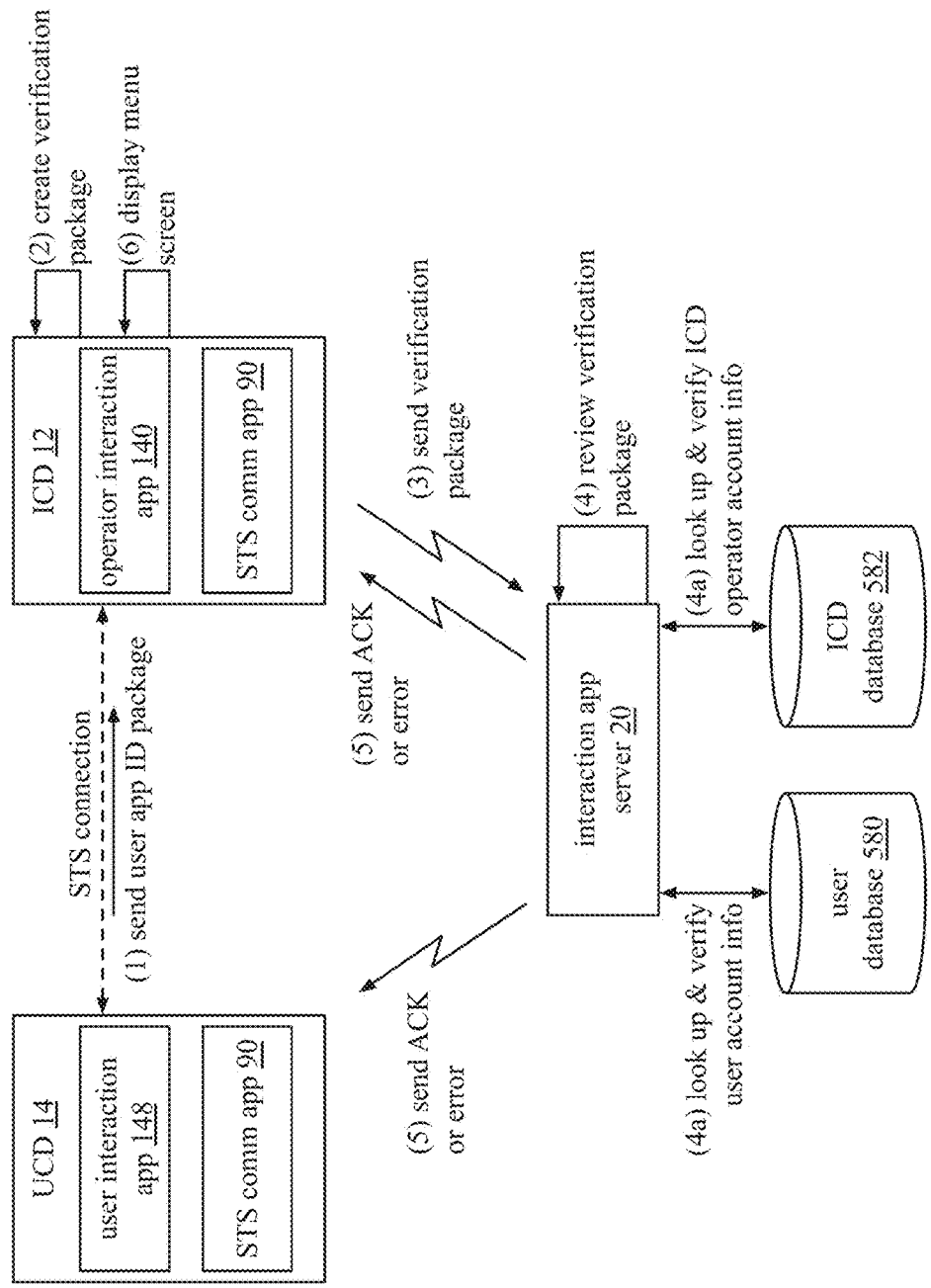
Figure 69:
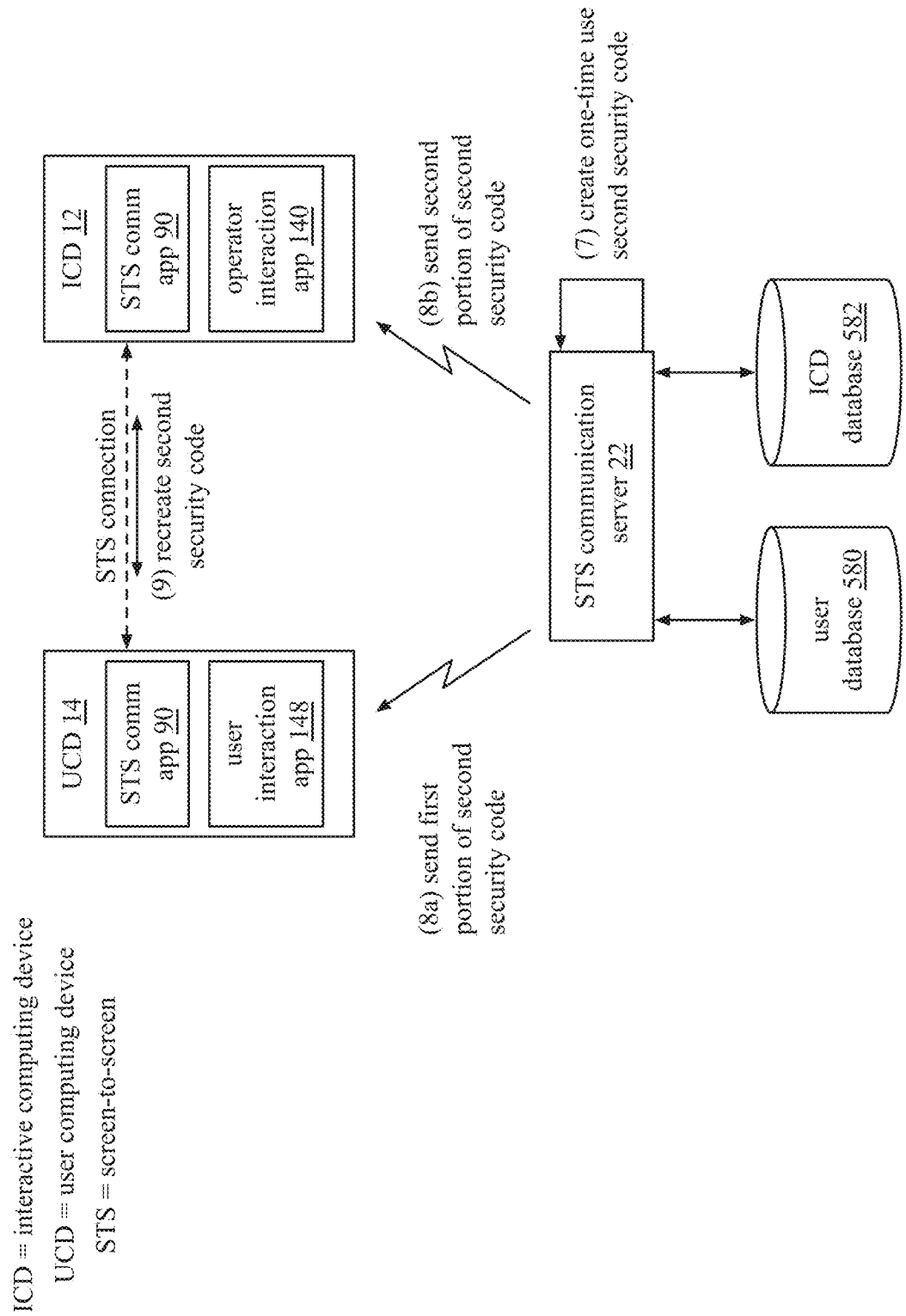
Figure 70:
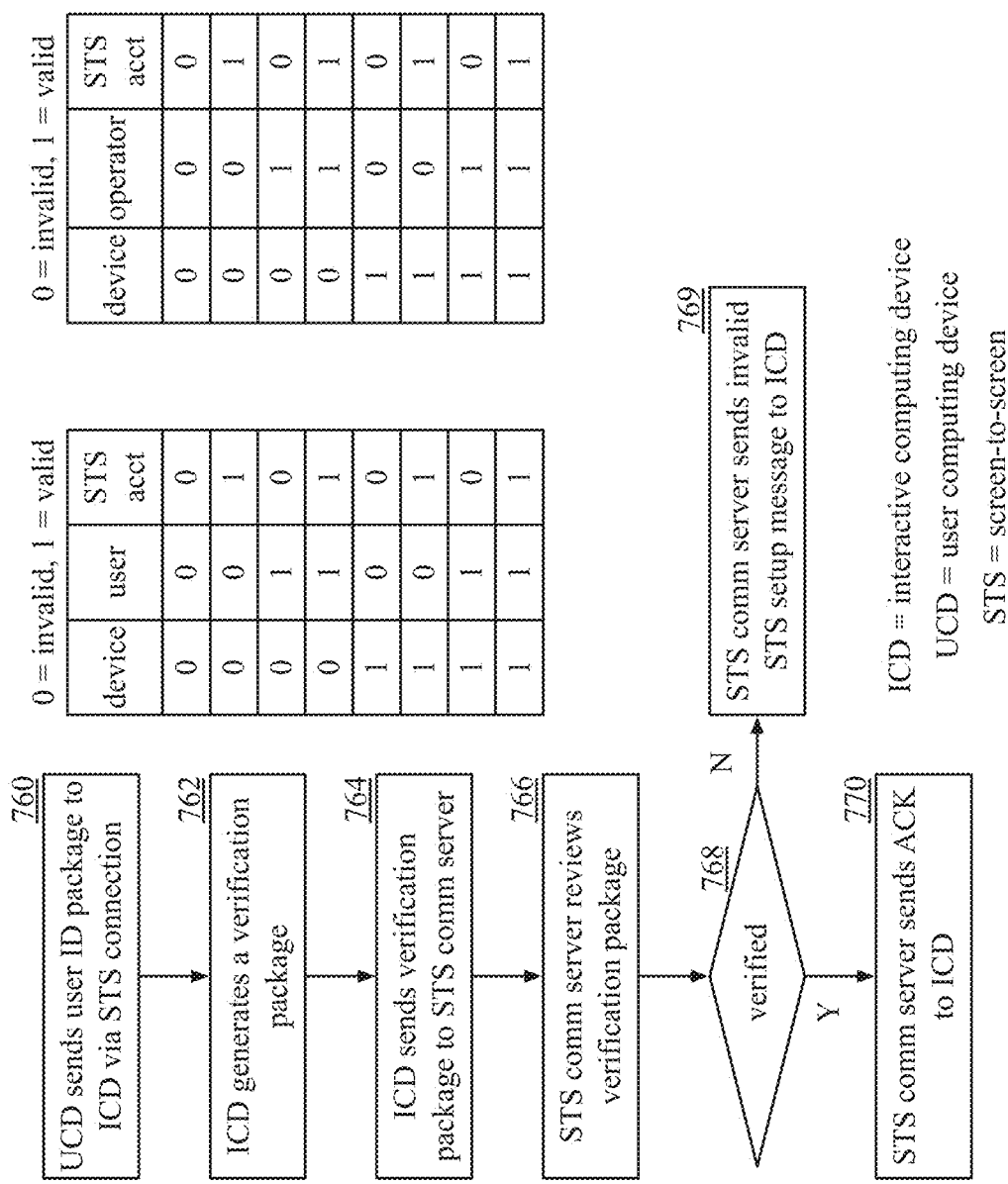
Figure 71:
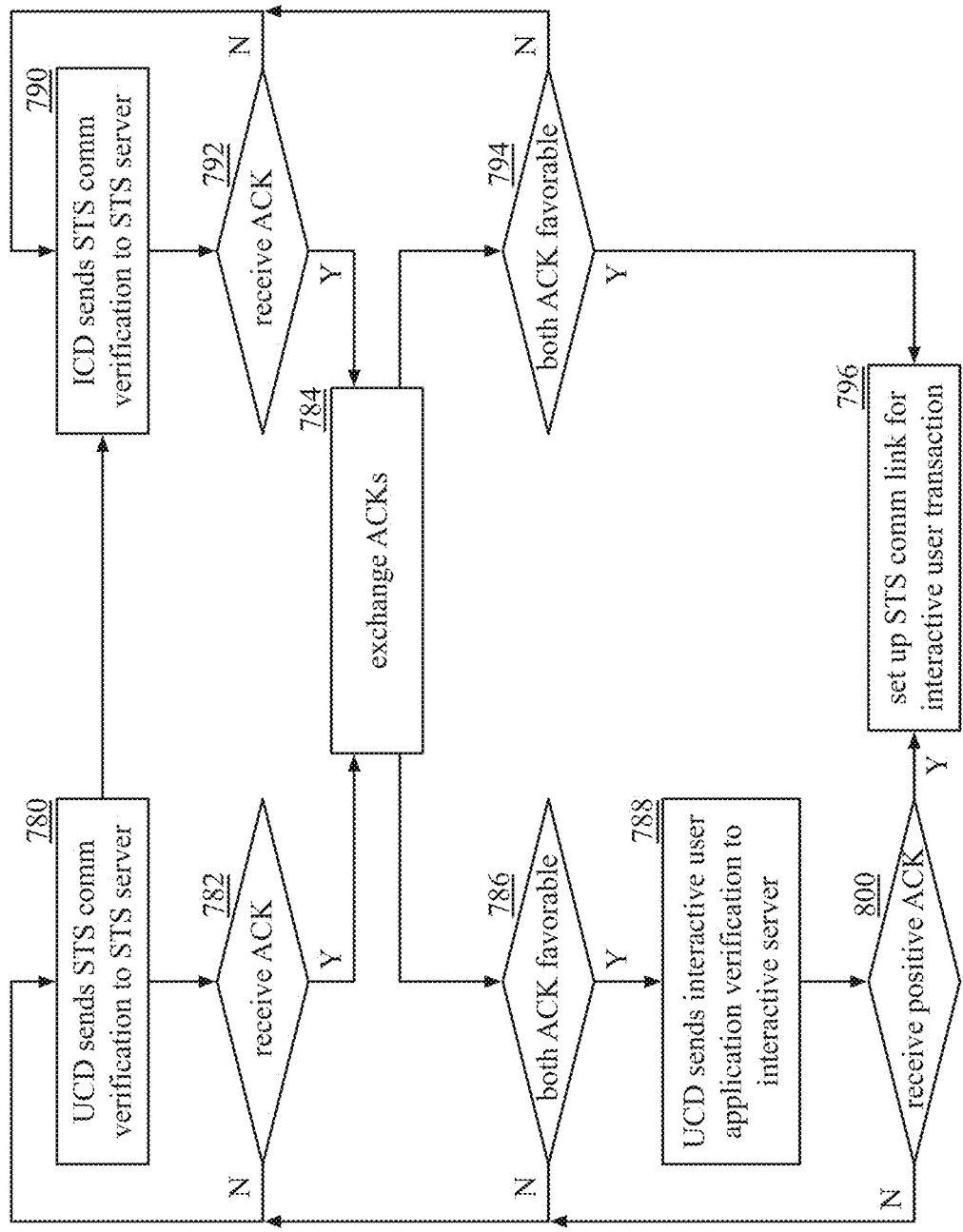

FIG. 34 a logic flow diagram of another example of a method of setting up a screen to screen (STS) communications in accordance with the present invention;

FIG. 35 is a schematic block diagram of an embodiment of an example of transmitting close proximity signals in accordance with the present invention;

FIG. 36 is a schematic block diagram of an embodiment of an example of transmitting ping signals in accordance with the present invention;

FIG. 37 is a schematic block diagram of an embodiment of an example of an interactive computing device (ICD) 12 generating a default ping signal in accordance with the present invention;

FIG. 38 is a schematic block diagram of an embodiment of an example of a default ping signal in accordance with the present invention;

FIG. 39 is a schematic block diagram of an embodiment of an example of a default ping signal in accordance with the present invention;

FIG. 40 is a schematic block diagram of another embodiment of an example of transmitting a default ping signal in accordance with the present invention;

FIG. 41 is a logic flow diagram of an example of a method for setting up a screen to screen connection in accordance with the present invention;

FIG. 42 is a schematic block diagram of an embodiment of affected electrodes of an interactive computing device in accordance with the present invention;

FIG. 43 is a schematic block diagram of an example of receiving a default ping signal in accordance with the present invention;

FIG. 44 is a schematic block diagram of another embodiment of receiving a ping signal in accordance with the present invention;

FIG. 45 is a schematic block diagram of an embodiment of an example of generating a ping back signal in accordance with the present invention;

FIG. 46 is a schematic block diagram of an embodiment of an example of producing a ping back signal in accordance with the present invention;

FIG. 47 is a logic flow diagram of an example of a method of setting up a screen to screen (STS) connection in accordance with the present invention;

FIG. 48 is a logic flow diagram of another example of a method for use in setting up a screen to screen (STS) connection in accordance with the present invention;

FIG. 49 is a logic flow diagram of another example of a method of setting up a screen to screen (STS) connection in accordance with the present invention;

FIG. 50 is a schematic block diagram of an embodiment of an example of a radio frequency (RF) transceiver and a signal source in accordance with the present invention;

FIG. 51 is a schematic block diagram of an embodiment of an interactive computing device (ICD) interacting with a user computing device (UCD) to select items in accordance with the present invention;

FIG. 52 is a schematic block diagram of an embodiment of an example of an interactive computing device (ICD) interacting with a user computing device (UCD) to mirror a menu of items in accordance with the present invention;

FIG. 53 is a schematic block diagram of an embodiment of an example of an interactive computing device (ICD) interacting with a user computing device (UCD) to select items of a menu in accordance with the present invention;

FIG. 54 is a schematic block diagram of another embodiment of an example of an interactive computing device (ICD) interacting with a user computing device (UCD) to edit a menu selection in accordance with the present invention;

FIG. 55 is a logic flow diagram of an example of an interactive computing device (ICD) interacting with a user computing device (UCD) to edit a menu selection in accordance with the present invention;

FIG. 56 is a schematic block diagram of an example of an interactive computing device (ICD) interacting with a user computing device (UCD) to edit a menu selection in accordance with the present invention;

FIG. 57 is a schematic block diagram of an example of an interactive computing device (ICD) interacting with a user computing device (UCD) to edit a menu selection in accordance with the present invention;

FIG. 58 is a schematic block diagram of an example of an interactive computing device (ICD) interacting with a user computing device (UCD) to edit a menu selection in accordance with the present invention;

FIG. 59 is a schematic block diagram of an embodiment of setting up screen to screen (STS) communications in accordance with the present invention;

FIG. 60 is a schematic block diagram of an embodiment of the setting up screen to screen communications in accordance with the present invention;

FIG. 61 is a schematic block diagram of the example of the setting up the screen to screen (STS) communications in accordance with the present invention;

FIG. 62 is a schematic block diagram of an embodiment of the example of the setting up screen to screen (STS) communications in accordance with the present invention;

FIG. 63 is a logic flow diagram of an example of a method of determining a menu interaction modality in accordance with the present invention;

FIG. 64 is a logic flow diagram of an example of a method of setting up a screen to screen (STS) communication in accordance with the present invention;

FIG. 65 is a schematic block diagram of an embodiment of processing a screen to screen transaction in accordance with the present invention;

FIG. 66 is a logic flow diagram of an example of a method of processing a screen to screen transaction in accordance with the present invention;

FIG. 67 is a logic flow diagram of another example of a method of processing a screen to screen transaction in accordance with the present invention;

FIG. 68 is a schematic block diagram of an embodiment of processing a screen to screen transaction in accordance with the present invention;

FIG. 69 is a schematic block diagram of an embodiment of the processing a screen to screen transaction in accordance with the present invention;

FIG. 70 is a logic flow diagram of an example of a method of setting up a screen to screen connection in accordance with the present invention; and FIG. 71 is a logic flow diagram of an example of a method of setting up a screen to screen connection in accordance with the present invention.

DETAILED DESCRIPTION OF THE INVENTION

Figure 1:
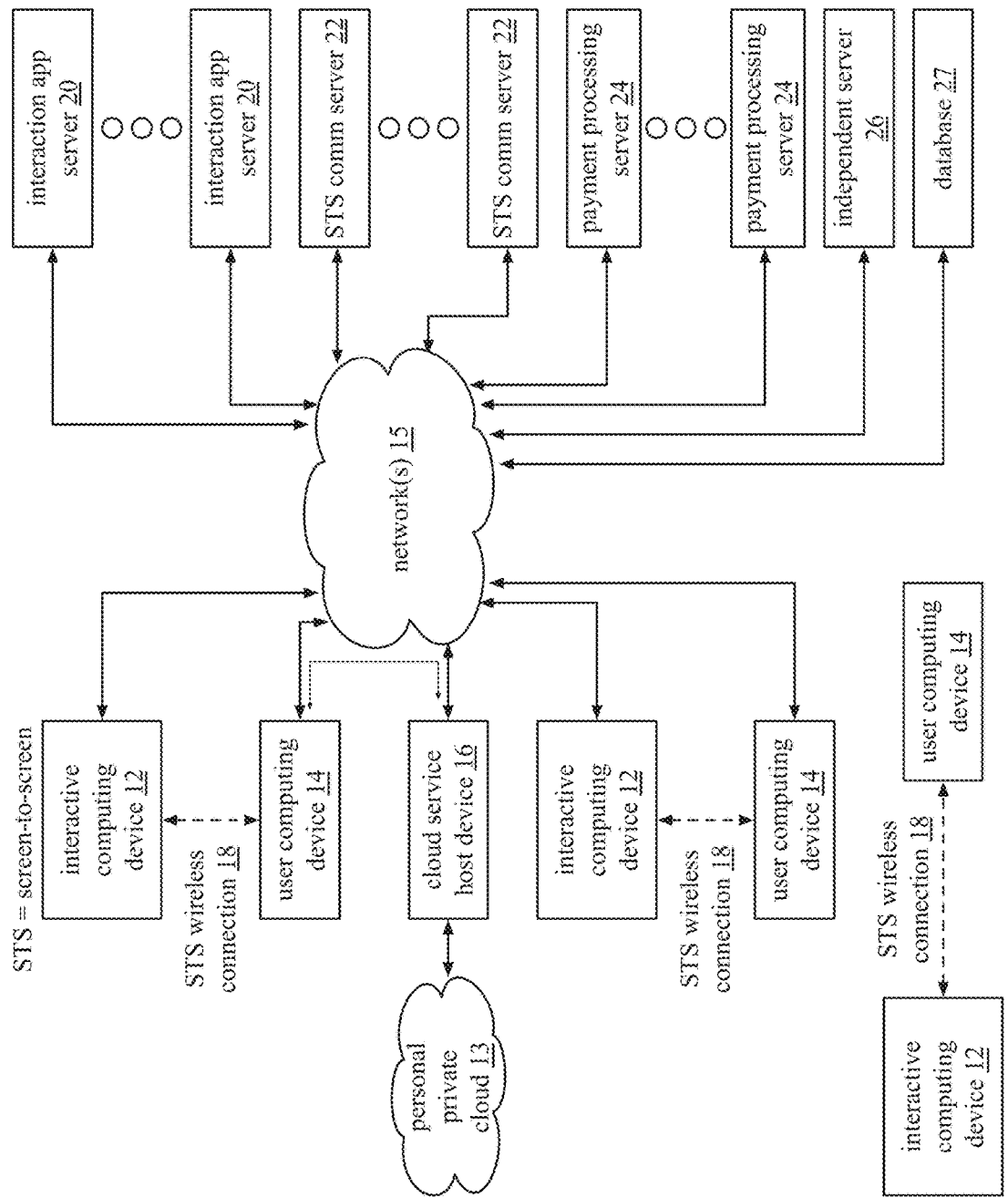
FIG. 1 is a schematic block diagram of an embodiment of a communication system in accordance with the present invention.

FIG. 1 is a schematic block diagram of an embodiment of a communication system 10 that includes a plurality of interactive computing devices 12, a personal private cloud 13, a plurality of user computing devices 14, networks 15, a cloud service host device 16, a plurality of interaction application servers 20, a plurality of screen-to-screen (STS) communication servers 22, a plurality of payment processing servers 24, an independent server 26 and a database 27. In an embodiment, computing devices 12-14 include a touch screen with sensors and drive-sense modules. In another embodiment, computing devices 12-14 include a touch & tactic screen that includes sensors, actuators, and drive sense modules. In yet another embodiment, computing devices 12-14 include a touch sensor with a display and/or a display without a touch screen.

The computing devices 12 and 14 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a point-of-sale equipment, interactive touch screens, a satellite receiver, a television set, a printer, a fax machine, home entertainment equipment, a video game console, and/or any type of home or office computing equipment.

An interactive computing device 12 performs screen-to-screen (STS) communications with a user computing device 14 via an STS wireless connection 18. Although not explicitly shown, the STS wireless connection may be formed between two or more ICDs and/or two or more UCDs. The term wireless indicates the communication is performed at least in part without a wire. For example, the STS wireless connection is via a transmission medium (e.g., one or more of a human body, close proximity (e.g., within a few inches), a surface (for vibration encoding, etc.). In an embodiment, the STS wireless connection 18 is performed via a local direct communication (e.g., not performed via network 15). The STS wireless connection 18 may be in accordance with a data protocol (e.g., data format, encoding parameters, frequency range, etc.), which will be discussed in further detail with reference to one or more subsequent figures.

The interactive computing device 12 also stores data that enables a user and/or a user computing device to use and/or interact with the interactive computing device in a variety of ways. For example, the stored data includes system applications (e.g. operation system, etc.), user applications (e.g., restaurant menus, etc.), payment processing applications, etc. The data may be stored locally (e.g., within the interactive computing device) and/or externally (e.g., within one or more interaction application servers, etc.).

A user computing device 14 is also operable to perform screen-to-screen (STS) communications with one or more other user computing devices 14 and/or interactive computing devices 12 via an STS wireless connection 18. The user computing device 14 also stores data to enable a user to use the computing device in a variety of ways. For example, the stored data includes system applications (e.g., operating system, etc.), user applications (e.g., word processing, email, web browser, etc.), personal information (e.g., contact list, personal data), and/or payment information (e.g., credit card information etc.). The data may be stored locally (e.g., within the computing device) and/or externally. For instance, at least some of the data is stored in a personal private cloud 13, which is hosted by a cloud service host device 16. As a specific example, a word processing application is stored in a personal account hosted by the vendor of the word processing application. As another specific example, payment information for a credit card is stored in a private account hosted by the credit card company and/or by the vendor of the computing device. The computing devices 12-14 will be discussed in greater detail with reference to one or more subsequent figures.

A server 20-26 is a type of computing device that processes large amounts of data requests in parallel. A server 20-26 includes similar components to that of the computing devices 12 and 14 with more robust processing modules, more main memory, and/or more hard drive memory (e.g., solid state, hard drives, etc.). Further, a server 20-26 is typically accessed remotely; as such it does not generally include user input devices and/or user output devices. In addition, a server 20-26 may be a standalone separate computing device and/or may be a cloud computing device.

The screen-to-screen (STS) communication server 22 supports and administers STS communications between UCDs and ICDs. For instance, the STS communication server 22 stores an STS communication application that may be installed and/or run on the user computing device 14 and the interactive computing device 12. As a specific example, the STS communication server is a cellular provider server (e.g., Verizon, T-Mobile, etc.). In an example, a user of a user computing device 14 registers with the STS communication server 22 to install and/or run the STS communication application on the user computing device 14. The UCD and/or the ICD may utilize a cellular connection (e.g., network 15) to download the STS communication application. In an embodiment, the STS communication server 22 functions to perform a patch distribution of the STS application for the interactive computing device 12 via an agreement between the interactive application server 20 and STS communication server 22.

The interaction application server 20 supports transactions between a UCD and an ICD that are communicating via an STS wireless connection. For example, the UCD using its user interaction application to interface with the ICD to buy items at a coffee shop and the ICD accesses its operator interaction application to support the purchase. In addition, the UCD (e.g., cell phone of a user) and/or ICD (e.g., POS device of a coffee shop) accesses the interaction application server to retrieve personal preferences of the user. (e.g., likes weather information, likes headlines news, ordering preferences, etc.). The transaction is completed via the STS wireless connection.

The payment processing server 24 stores information on one or more of cardholders, merchants, acquirers, credit card networks and issuing banks in order to process transactions in the communication network. For example, a payment processing server 24 is a bank server that stores user information (e.g., account information, account balances, personal information (e.g., social security number, birthday, address, etc.), etc.) and user card information for use in a transaction. As another example, a payment processing server is a merchant server that stores good information (e.g., price, quantity, etc.) and may also store certain user information (e.g., credit card information, billing address, shipping address, etc.) acquired from the user.

The independent server 26 stores publicly available data (e.g., weather reports, stock market information, traffic information, public social media information, etc.). The publicly available data may be free or may be for a fee (e.g., subscription, one-time payment, etc.). In an example, the publicly available data is used in setting up an STS communication. For example, a tag in a social media post associated with a user of the UCD initiates an update check to interactive applications installed on the UCD that are associated with nearby companies. This ensures STS communications are enabled on the UCD for a more seamless STS transaction when the user is ready to transmit data via an STS connection. As another example, when a user is en route to a restaurant, weather information and traffic information are utilized to determine an estimated time to place a pre-order for one or more menu items from the restaurant that is to be completed (e.g., paid for, authorize a payment, etc.) utilizing an STS wireless connection.

A database 27 is a special type of computing device that is optimized for large scale data storage and retrieval. A database 27 includes similar components to that of the computing devices 12 and 14 with more hard drive memory (e.g., solid state, hard drives, etc.) and potentially with more processing modules and/or main memory. Further, a database 27 is typically accessed remotely; as such it does not generally include user input devices and/or user output devices. In addition, a database 27 may be a standalone separate computing device and/or may be a cloud computing device.

The network 15 includes one more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired network (e.g., Firewire, Ethernet, etc.). A WAN may be a wired and/or wireless WAN. For example, a WAN may be a personal home or business's wireless network and a WAN is the Internet, cellular telephone infrastructure, and/or satellite communication infrastructure.

Figure 2:
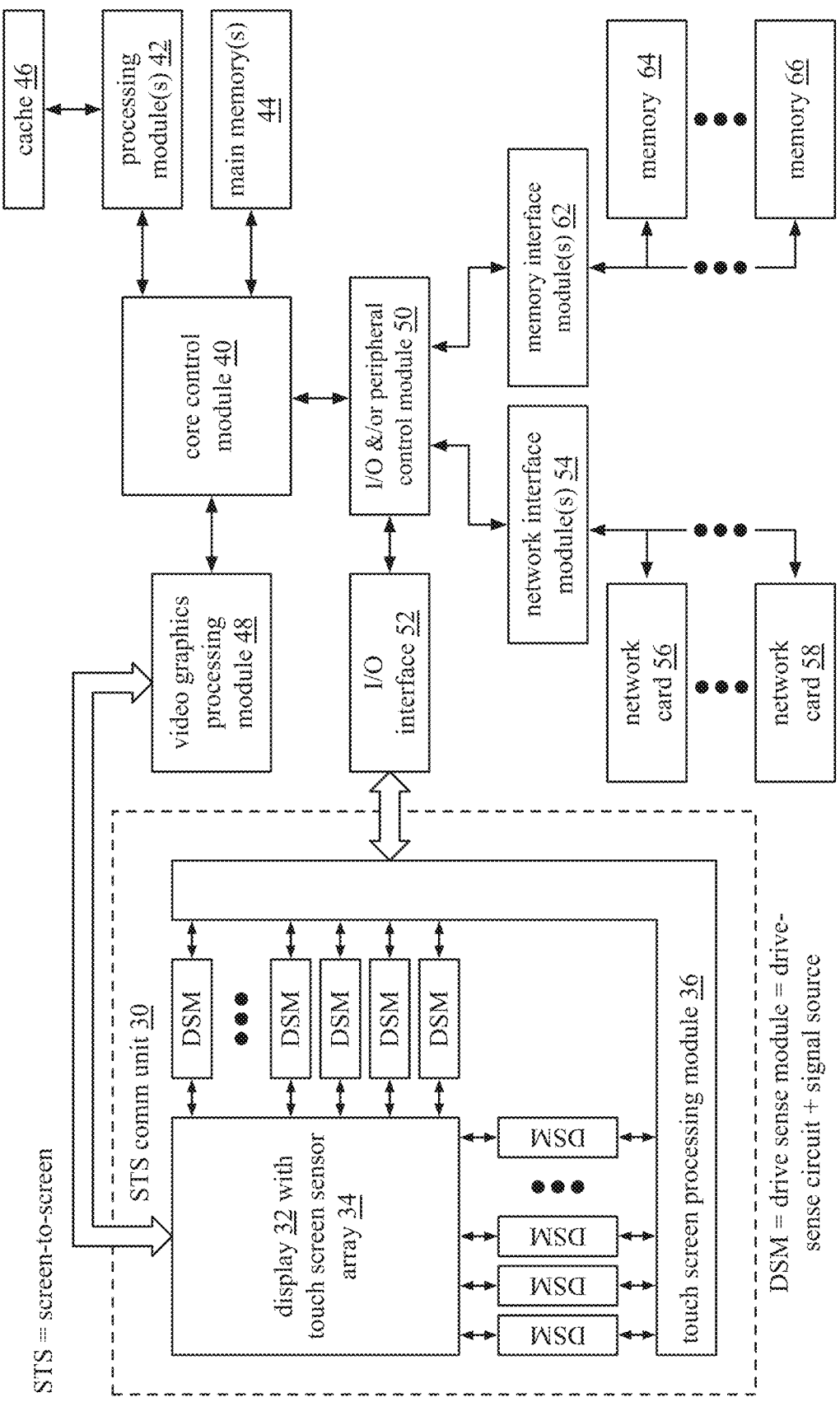
FIG. 2 is a schematic block diagram of an embodiment of a computing device in accordance with the present invention.

FIG. 2 is a schematic block diagram of an embodiment of a computing device 12-14. The computing device 12-14 includes a screen-to-screen (STS) communication unit 30, a core control module 40, one or more processing modules 42, one or more main memories 44, cache memory 46, a video graphics processing module 48, an input/output (I/O) peripheral control module 50, one or more input/output (I/O) interfaces 52, one or more network interface modules 54, one or more network cards 56-58, one or more memory interface modules 62 and one or more memories 64-66. A processing module 42 is described in greater detail at the end of the detailed description of the invention section and, in an alternative embodiment, has a direction connection to the main memory(s) 44. In an alternate embodiment, the core control module 40 and the I/O and/or peripheral control module 50 are one module, such as a chipset, a quick path interconnect (QPI), and/or an ultra-path interconnect (UPI).

The STS communication unit 30 includes a display 32 with a touch screen sensor array 34, a plurality of drive-sense modules (DSM), and a touch screen processing module 36. In general, the sensors (e.g., electrodes, capacitor sensing cells, capacitor sensors, inductive sensors, etc.) of the touch screen sensor array 34 detect a proximal touch of the screen. For example, when one or more fingers touches (e.g., direct contact or very close (e.g., a few millimeters to a centimeter)) the screen, capacitance of sensors proximal to the touch(es) are affected (e.g., impedance changes). The drive-sense modules (DSM) coupled to the affected sensors detect the change and provide a representation of the change to the touch screen processing module 36, which may be a separate processing module or integrated into the processing module 42.

The touch screen processing module 36 processes the representative signals from the drive-sense modules (DSM) to determine the location of the touch(es). This information is inputted to the processing module 42 for processing as an input. For example, a touch represents a selection of a button on screen, a scroll function, a zoom in-out function, an unlock function, a signature function, etc. In an example, a DSM includes a drive sense circuit (DSC) and a signal source. In a further example, one signal source is utilized for more than one DSM. The DSM allows for communication with a better signal to noise ratio (SNR) (e.g., >100 dB) due at least in part to the low voltage required to drive the DSM. The drive sense module is discussed in greater detail with reference to one or more subsequent figures.

Each of the main memories 44 includes one or more Random Access Memory (RAM) integrated circuits, or chips. For example, a main memory 44 includes four DDR4 (4th generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memory 64-66 is coupled to the core control module 40 via the I/O and/or peripheral control module 50 and via one or more memory interface modules 62. In an embodiment, the I/O and/or peripheral control module 50 includes one or more Peripheral Component Interface (PCI) buses to which peripheral components connect to the core control module 40. A memory interface module 62 includes a software driver and a hardware connector for coupling a memory device to the I/O and/or peripheral control module 50. For example, a memory interface module 62 is in accordance with a Serial Advanced Technology Attachment (SATA) port.

The core control module 40 coordinates data communications between the processing module(s) 42 and the network(s) 15 via the I/O and/or peripheral control module 50, the network interface module(s) 54, and network cards 56 and/or 58. A network card 56-58 includes a wireless communication unit or a wired communication unit. A wireless communication unit includes a wireless local area network (WLAN) communication device, a cellular communication device, a Bluetooth device, and/or a ZigBee communication device. A wired communication unit includes a Gigabit LAN connection, a Firewire connection, and/or a proprietary computer wired connection. A network interface module 54 includes a software driver and a hardware connector for coupling the network card to the I/O and/or peripheral control module 50. For example, the network interface module 54 is in accordance with one or more versions of IEEE 802.11, cellular telephone protocols, 10/100/1000 Gigabit LAN protocols, etc.

The core control module 40 coordinates data communications between the processing module(s) 42 and the STS communication unit 30 via the video graphics processing module 48, and the I/O interface module(s) 52 and the I/O and/or peripheral control module 50. In an embodiment, the STS communication unit 30 includes or is connected (e.g., operably coupled) to a keypad, a keyboard, control switches, a touchpad, a microphone, a camera, speaker, etc. An I/O interface 52 includes a software driver and a hardware connector for coupling the STS communications unit 30 to the I/O and/or peripheral control module 50. In an embodiment, an input/output interface 52 is in accordance with one or more Universal Serial Bus (USB) protocols. In another embodiment, input/output interface 52 is in accordance with one or more audio codec protocols.

The processing module 42 communicates with a video graphics processing module 48 to display data on the display 32. The display 32 includes an LED (light emitting diode) display, an LCD (liquid crystal display), and/or other type of display technology. The display 32 has a resolution, an aspect ratio, and other features that affect the quality of the display. The video graphics processing module 48 receives data from the processing module 42, processes the data to produce rendered data in accordance with the characteristics of the display, and provides the rendered data to the display 32.

Figure 3:
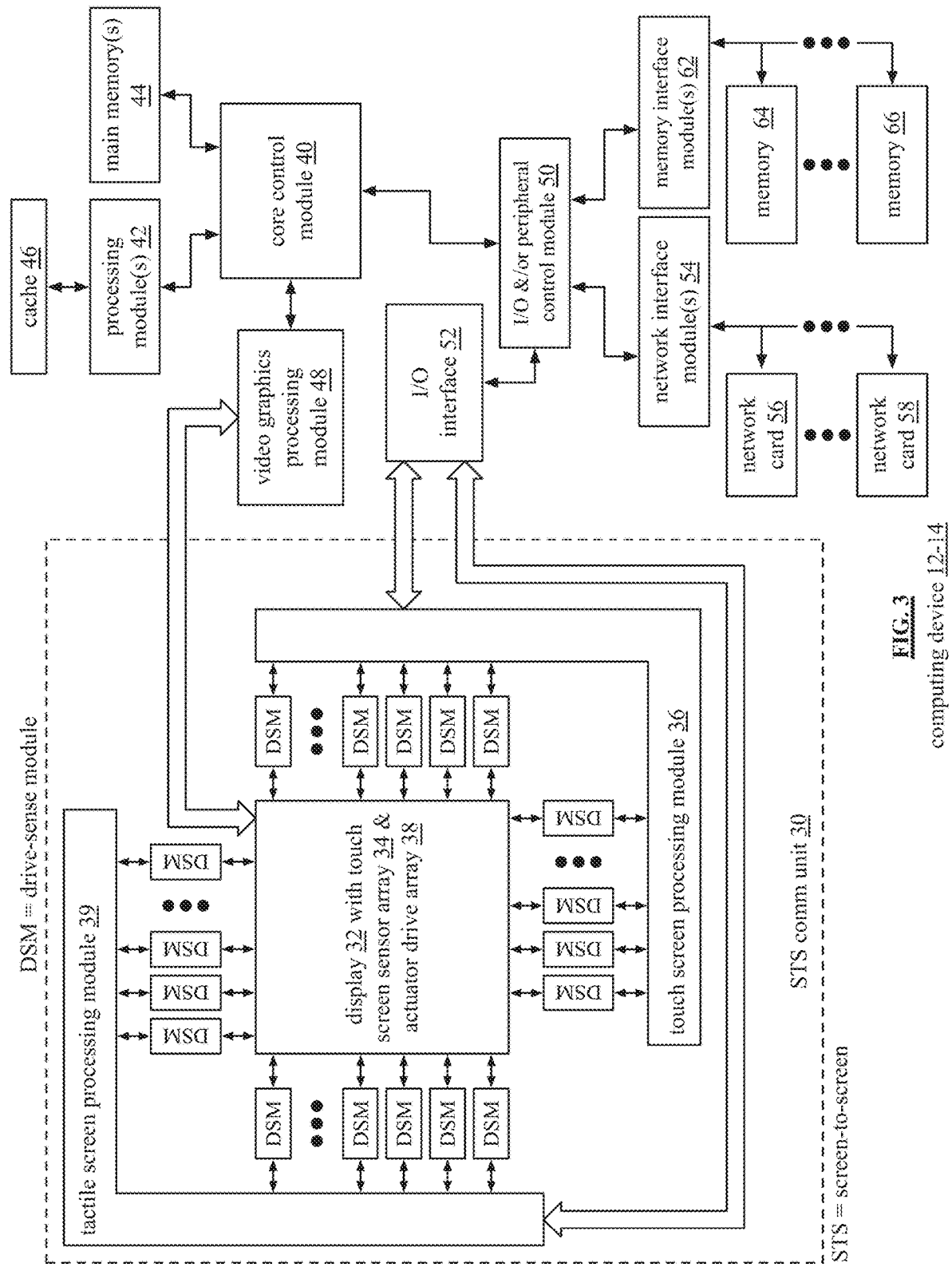
FIG. 3 is a schematic block diagram of another embodiment of a computing device in accordance with the present invention.

FIG. 3 is a schematic block diagram of another embodiment of a computing device 12-14 that includes a screen-to-screen (STS) communication unit 30, a core control module 40, one or more processing modules 42, one or more main memories 44, cache memory 46, a video graphics processing module 48, one or more input/output (I/O) peripheral control modules 50, one or more input/output (I/O) interface modules 52, one or more network interface modules 54, one or more memory interface modules 62, network cards 56-58 and memories 64-66. The STS communication unit 30 includes a display 32 with touch screen sensor array 34 and actuator drive array 38, a touch screen processing module 36, a tactile screen processing module 39, and a plurality of drive-sense modules (DSM).

Computing device 12-14 operates similarly to computing device 12-14 of FIG. 2 with the addition of a tactile aspect to the screen 20 as an output device. The tactile portion of the display 32 includes a plurality of actuators (e.g., piezoelectric transducers to create vibrations, solenoids to create movement, etc.) to provide a tactile feel to the display 32. To do so, the processing module creates tactile data, which is provided to the appropriate drive-sense modules (DSM) via the tactile screen processing module 39 which may be a stand-alone processing module or integrated into processing module 42. The drive-sense modules (DSM) convert the tactile data into drive-actuate signals and provide them to the appropriate actuators to create the desired tactile feel on the display 32. In an example, the actuators also may encode data into a vibration to produce a vibration encoded data signal. For example, a binary 1 is represented as a first vibration frequency and a binary 0 is represented as a second vibration frequency. In an instance, the vibration data encoded signal is transmitted to another computing device via a screen to screen (STS) connection.

A sensor 34 functions to convert a physical input into an electrical output and/or an optical output. The physical input of a sensor may be one of a variety of physical input conditions. For example, the physical condition includes one or more of, but is not limited to, acoustic waves (e.g., amplitude, phase, polarization, spectrum, and/or wave velocity); a biological and/or chemical condition (e.g., fluid concentration, level, composition, etc.); an electric condition (e.g., charge, voltage, current, conductivity, permittivity, eclectic field, which includes amplitude, phase, and/or polarization); a magnetic condition (e.g., flux, permeability, magnetic field, which amplitude, phase, and/or polarization); an optical condition (e.g., refractive index, reflectivity, absorption, etc.); a thermal condition (e.g., temperature, flux, specific heat, thermal conductivity, etc.); and a mechanical condition (e.g., position, velocity, acceleration, force, strain, stress, pressure, torque, vibration, etc.). For example, piezoelectric sensor converts force or pressure into an eclectic signal. As another example, a microphone converts audible acoustic waves into electrical signals.

There are a variety of types of sensors to sense the various types of physical conditions. Sensor types include, but are not limited to, capacitor sensors, inductive sensors, accelerometers, piezoelectric sensors, light sensors, magnetic field sensors, ultrasonic sensors, temperature sensors, infrared (IR) sensors, touch sensors, proximity sensors, pressure sensors, level sensors, smoke sensors, and gas sensors. In many ways, sensors function as the interface between the physical world and the digital world by converting real world conditions into digital signals that are then processed by computing devices for a vast number of applications including, but not limited to, medical applications, production automation applications, home environment control, public safety, and so on.

The various types of sensors have a variety of sensor characteristics that are factors in providing power to the sensors, receiving signals from the sensors, and/or interpreting the signals from the sensors. The sensor characteristics include resistance, reactance, power requirements, sensitivity, range, stability, repeatability, linearity, error, response time, and/or frequency response. For example, the resistance, reactance, and/or power requirements are factors in determining drive circuit requirements. As another example, sensitivity, stability, and/or linearity are factors for interpreting the measure of the physical condition based on the received electrical and/or optical signal (e.g., measure of temperature, pressure, etc.).

An actuator 38 converts an electrical input into a physical output. The physical output of an actuator may be one of a variety of physical output conditions. For example, the physical output condition includes one or more of, but is not limited to, acoustic waves (e.g., amplitude, phase, polarization, spectrum, and/or wave velocity); a magnetic condition (e.g., flux, permeability, magnetic field, which amplitude, phase, and/or polarization); a thermal condition (e.g., temperature, flux, specific heat, thermal conductivity, etc.); and a mechanical condition (e.g., position, velocity, acceleration, force, strain, stress, pressure, torque, etc.). As an example, a piezoelectric actuator converts voltage into force or pressure. As another example, a speaker converts electrical signals into audible acoustic waves.

An actuator 38 may be one of a variety of actuators. For example, an actuator is one of a comb drive, a digital micro-mirror device, an electric motor, an electroactive polymer, a hydraulic cylinder, a piezoelectric actuator, a pneumatic actuator, a screw jack, a servomechanism, a solenoid, a stepper motor, a shape-memory allow, a thermal bimorph, and a hydraulic actuator.

The various types of actuators have a variety of actuators characteristics that are factors in providing power to the actuator and sending signals to the actuators for desired performance. The actuator characteristics include resistance, reactance, power requirements, sensitivity, range, stability, repeatability, linearity, error, response time, and/or frequency response. For example, the resistance, reactance, and power requirements are factors in determining drive circuit requirements. As another example, sensitivity, stability, and/or linear are factors for generating the signaling to send to the actuator to obtain the desired physical output condition.

As a specific example of operation, the actuators 38 generate a vibration encoded signal based on digital data as part of a screen to screen (STS) communication with another computing device 12-14. The vibration encoded signal vibrates through and/or across a transmission medium (e.g., surface (e.g., of table, of a body, etc.) from a computing 12-14 to another computing device 12-14. The other computing device 12-14 receives the vibration encoded signal via its sensors 34 (e.g., transducers) and decodes the vibration encoded data signal to recover the digital data.

Figure 4:
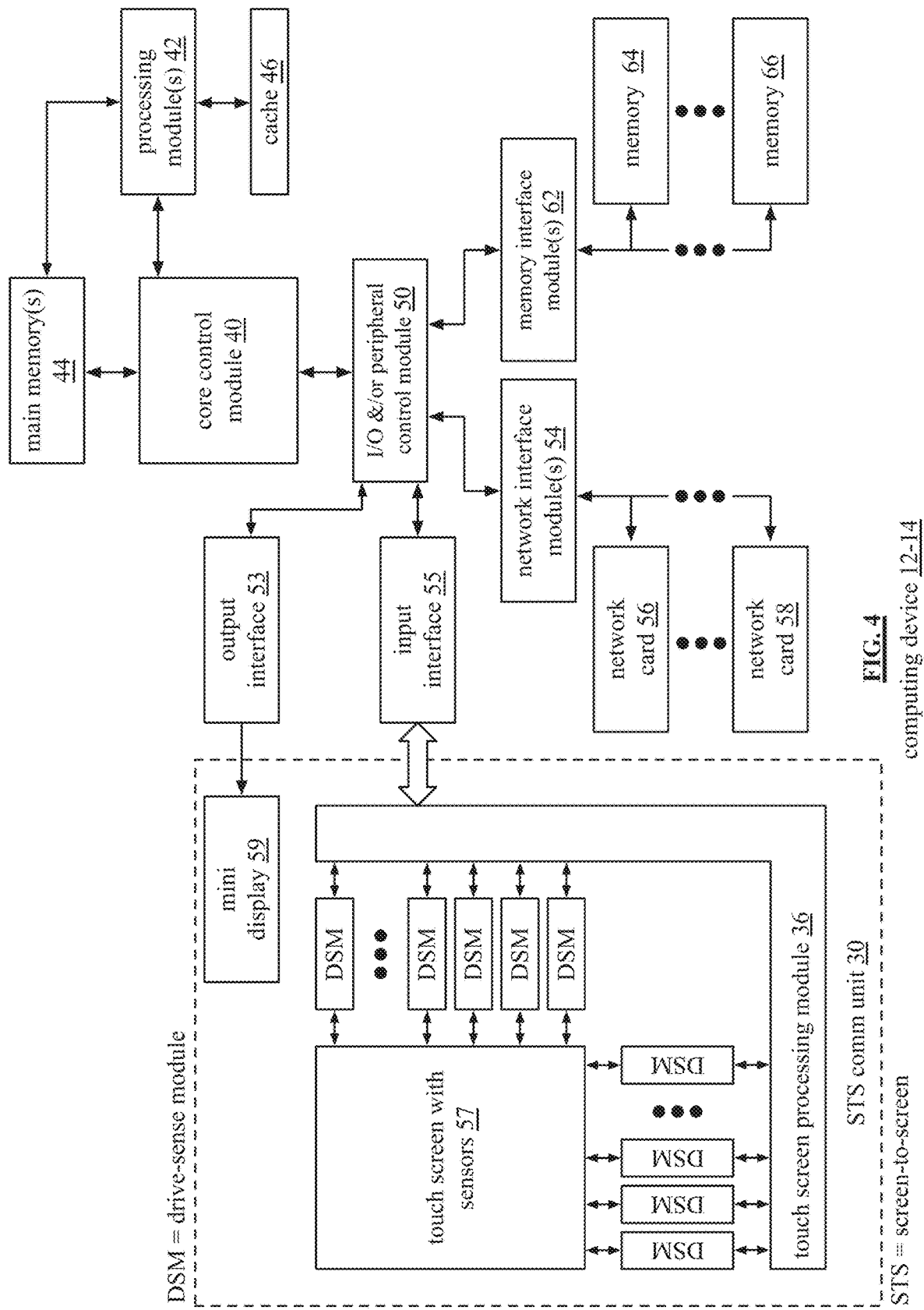
FIG. 4 is a schematic block diagram of another embodiment of a computing device in accordance with the present invention.

FIG. 4 is a schematic block diagram of another embodiment of a computing device 12-14 that includes a screen-to-screen (STS) communication unit 30, a core control module 40, one or more processing modules 42, one or more main memories 44, cache memory 46, one or more input/output (I/O) peripheral control modules 50, an output interface module 53, an input interface module 55, one or more network interface modules 54, and one or more memory interface modules 62, network cards 56-58 and memories 64-66. In this embodiment, the STS communication unit 30 includes a mini display 59, a touch screen processing module 36, a touch screen with sensors 57, and a plurality of drive sense modules.

Figure 5:
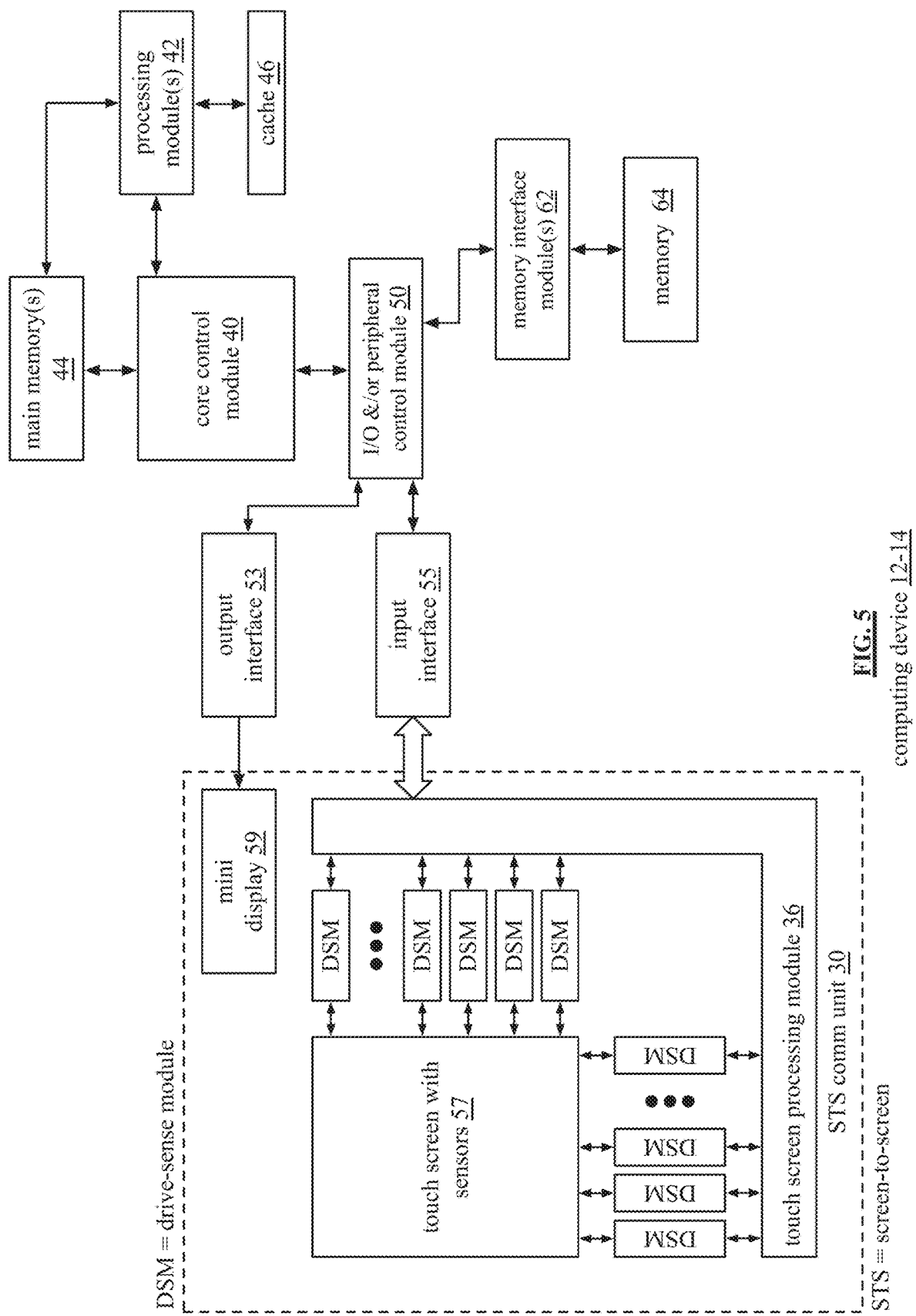
FIG. 5 is a schematic block diagram of another embodiment of a computing device in accordance with the present invention.

FIG. 5 is a schematic block diagram of another embodiment of a computing device 12-14 that includes a screen-to-screen (STS) communication unit 30, a core control module 40, one or more processing modules 42, one or more main memories 44, cache memory 46, one or more input/output (I/O) peripheral control modules 50, an output interface module 53, an input interface module 55, one or more memory interface modules 62, and memory 64. The STS communication unit 30 includes mini display 59, a touch screen with sensors 57, a touch screen processing module 36 and a plurality of drive sense modules (DSM).

Figure 6:
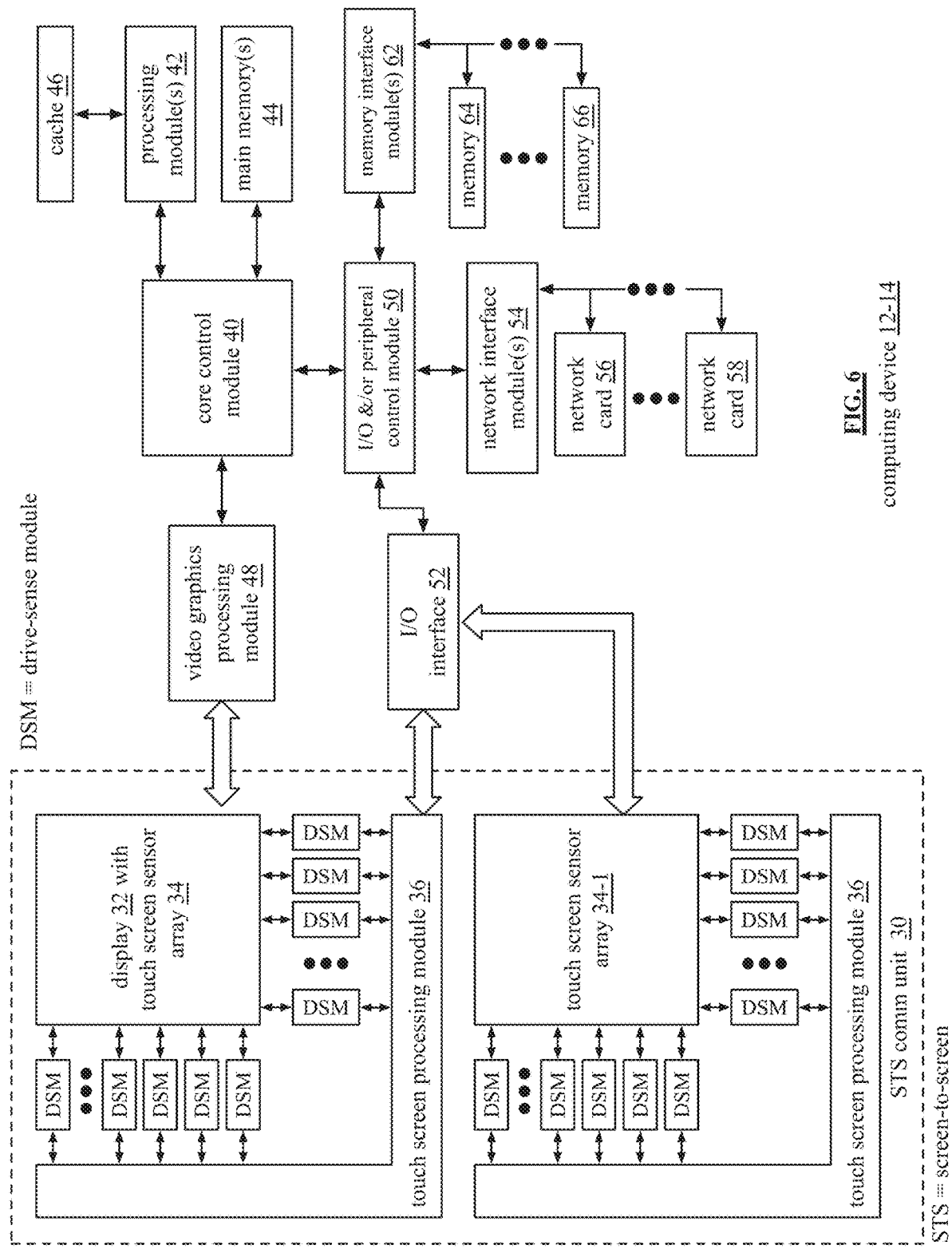
FIG. 6 is a schematic block diagram of another embodiment of a computing device in accordance with the present invention.

FIG. 6 is a schematic block diagram of another embodiment of a computing device 12-14 that includes a screen-to-screen (STS) communication unit 30, a core control module 40, one or more processing modules 42, one or more main memories 44, cache memory 46, a video graphics processing module 48, one or more input/output (I/O) peripheral control modules 50, one or more input/output (I/O) interface modules 52, one or more network interface modules 54, one or more memory interface modules 62, network cards 56-58 and memories 64-66.

In this embodiment, the STS communication unit has a display 32 with touch screen sensor array 34 and a separate touch screen sensor array 34-1. Each of the display 32 with touch screen sensor array 34 and touch screen sensor array 34-1 are connected to a touch screen processing module 36 via a plurality of drive sense modules (DSM). In a specific example, the touch screen sensor array 34-1 is a single electrode or sensor (e.g., button, control point, etc.).

There is a variety of locations for which to locate the display 32 and the touch screen senor array 34-1 on the computing device 12-14. Some example include, but are not limited to the following. In a first example, the display 32 with touch screen sensor array 34 is located on a front the computing device and the touch screen with sensor array 34-1 is located on a side of the computing device. In a second example, the display 32 with touch screen sensor array 34 is located on a front the computing device and the touch screen with sensor array 34-1 is located on a back of the computing device. In a third example, the display 32 with touch screen sensor array 34 is located on a front and/or side the computing device and the touch screen with sensor array 34-1 is located on a front of the computing device.

Figure 7:
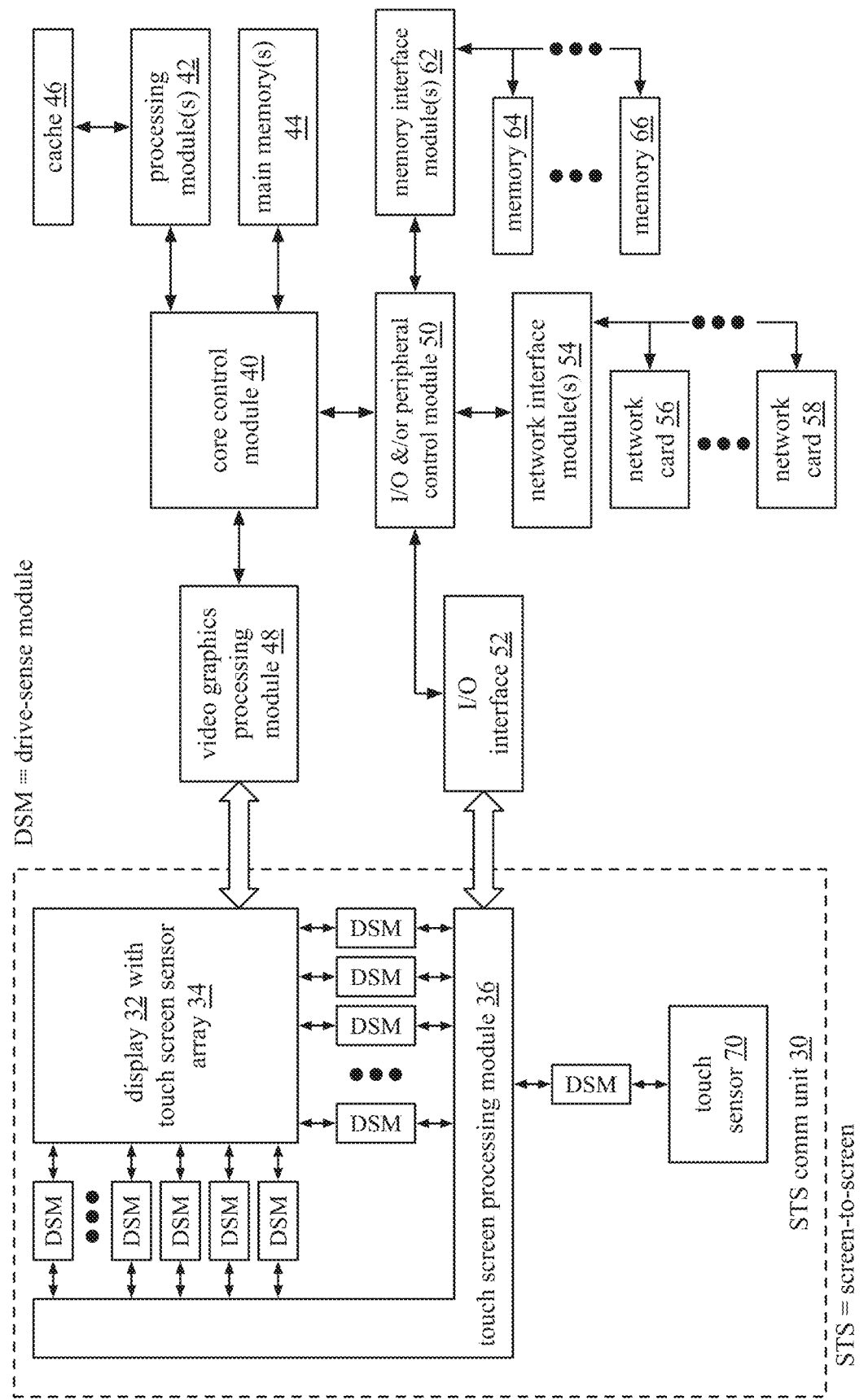
FIG. 7 is a schematic block diagram of another embodiment of a computing device in accordance with the present invention.

FIG. 7 is a schematic block diagram of another embodiment of a computing device 12-14 that includes a screen-to-screen (STS) communication unit 30, a core control module 40, one or more processing modules 42, one or more main memories 44, cache memory 46, a video graphics processing module 48, one or more input/output (I/O) peripheral control modules 50, one or more input/output (I/O) interface modules 52, one or more network interface modules 54, one or more memory interface modules 62, network cards 56-58 and memories 64-66.

In this embodiment, the STS communication unit 30 has a display 32 with touch screen sensor array 34 and touch sensor 70. The display 32 with touch screen sensor array 34 and touch screen sensor array 34 are connected to a touch screen processing module 36 via a plurality of drive sense modules (DSM) and the touch sensor 70 is also operable coupled to the touch screen processing module 36 via another DSM.

In an example, the touch sensor 70 is a single electrode. In another example, the touch sensor is a capacitive sensor. The touch sensor 70 may be on the front of computing device 12-14, may be on the back of computing device 12-14 and/or may be on one or more sides of the computing device 12-14. As a specific embodiment, the computing device is a cell phone with a display on the front and the touch sensor on the side.

Figure 8:
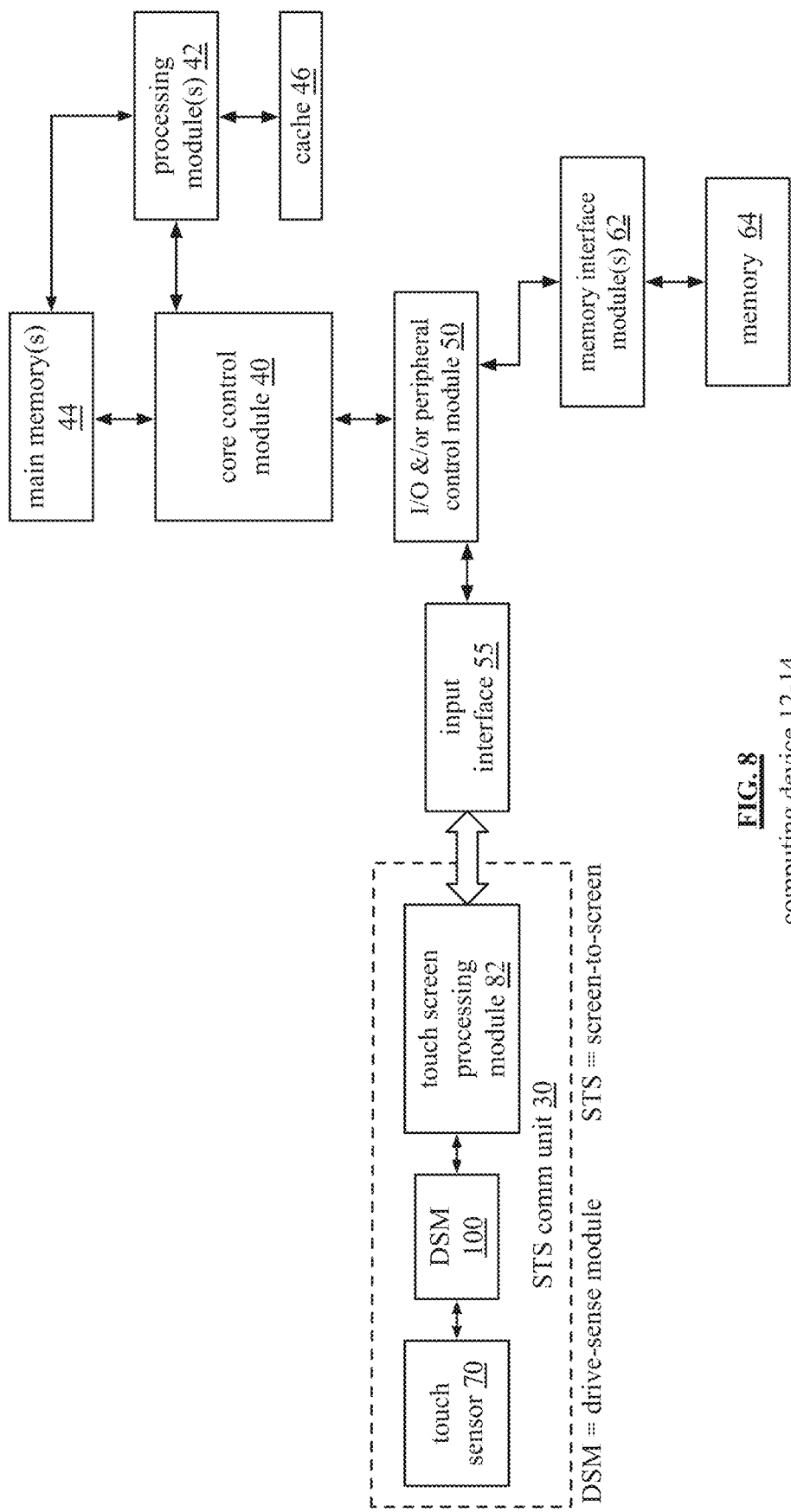
FIG. 8 is a schematic block diagram of another embodiment of a computing device in accordance with the present invention.

FIG. 8 is a schematic block diagram of another embodiment of a computing device 12-14 that includes a screen-to-screen (STS) communication unit 30, a core control module 40, one or more processing modules 42, one or more main memories 44, cache memory 46, one or more input/output (I/O) peripheral control modules 50, an output interface 53, an input interface 55, one or more memory interface modules 62, and a memory 64. The STS communication unit 30 includes a touch screen processing module 82, a drive sense module 100 (e.g., the drive sense module (DSM) of FIG. 1), and a touch sensor 70. In an example, the touch sensor 70 is a single electrode. In another example, the touch sensor is a capacitive sensor.

Figure 9:
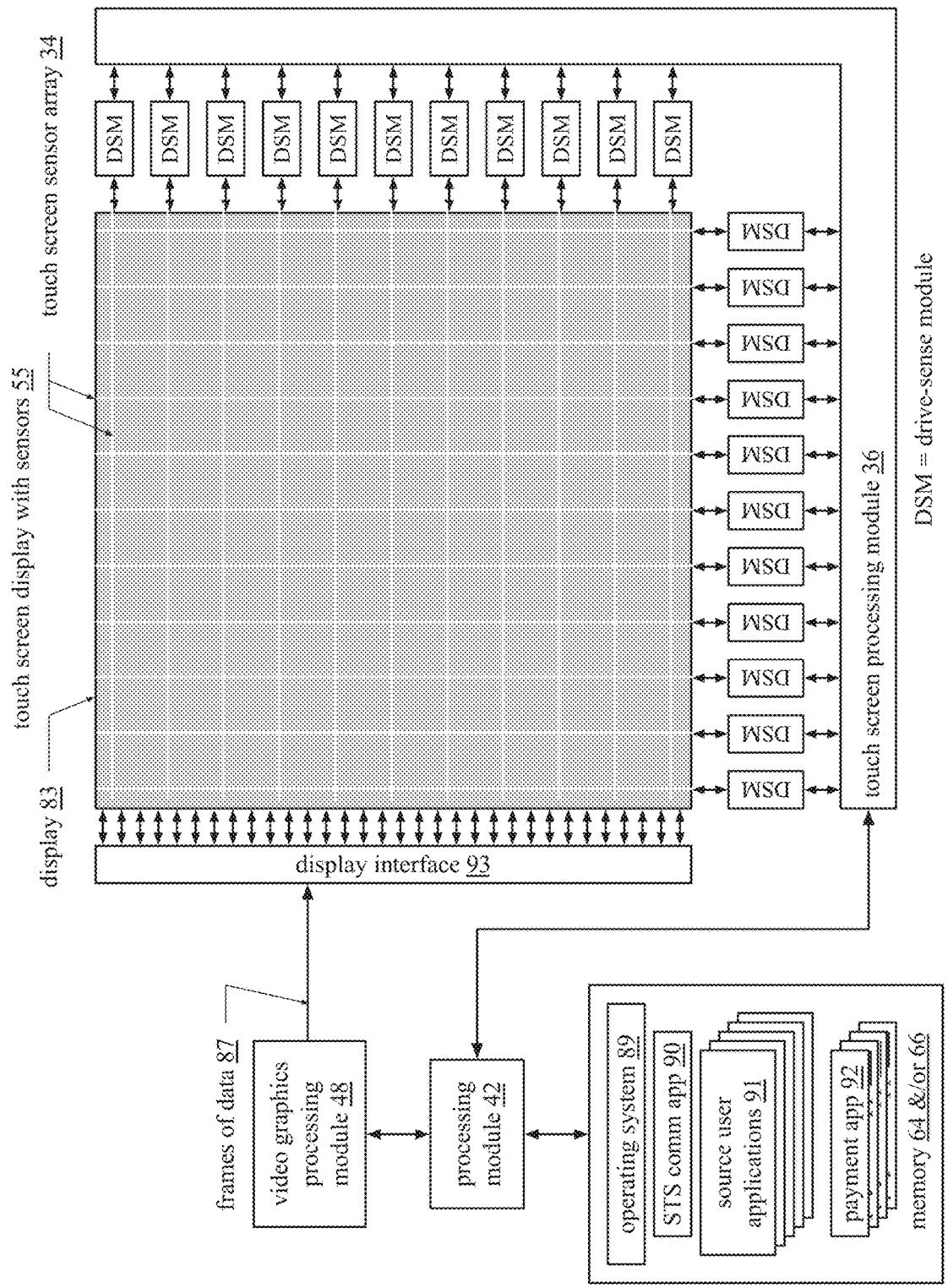
FIG. 9 is a schematic block diagram of an embodiment of a touch screen display in accordance with the present invention.

FIG. 9 is a schematic block diagram of an embodiment of a touch screen display with sensors 55 that includes a plurality of drive-sense modules (DSM), a touch screen processing module 36, a display 83, and a touch screen sensor array 34. The touch screen display with sensors 55 is coupled to a processing module 42, a video graphics processing module 48, and memory 64 and/or 66, which are components of a computing device (e.g., 12-14), an interactive display, or other device that includes a touch screen display. An interactive display functions to provide users with an interactive experience (e.g., touch the screen to obtain information, to input information, to be entertained, to complete a transaction, etc.). For example, a store provides interactive displays for customers to order products, to find certain products, to obtain coupons, to enter contests, to sign up for store rewards, to learn information associated with a product, and many other functions.

There are a variety of other devices that include a touch screen display. For example, a vending machine includes a touch screen display to select and/or pay for an item. As another example of a device having a touch screen display is an Automated Teller Machine (ATM). As yet another example, an automobile includes a touch screen display for entertainment media control, navigation, climate control, vehicle information (e.g., tire air pressure, gas levels, etc.), etc. As a still further example, a smart device (e.g., light switch, home security control hub, thermostat, etc.) within a home includes a touch screen.

In an example, the touch screen display with sensors 55 includes a large display 83 that has a resolution equal to or greater than full high-definition (HD), an aspect ratio of a set of aspect ratios, and a screen size equal to or greater than thirty-two inches. The following table lists various combinations of resolution, aspect ratio, and screen size for the display 83, but it is not an exhaustive list.

emitting diode (OLED) display, a digital light processing (DLP) display, a surface conductive electron emitter (SED) display, a field emission display (FED), a laser TV display, a carbon nanotubes display, a quantum dot display, an interferometric modulator display (IMOD), and a digital microshutter display (DMS). The display is active in a full display mode or a multiplexed display mode (i.e., only part of the display is active at a time).

The display 83 further includes touch screen sensor array 34 that provide the sensors 34 for the touch sense part of the touch screen display. The sensor array 34 is distributed throughout the display area or where touch screen functionality is desired. For example, a first group of sensors of the sensor array 34 are arranged in rows and a second group of sensors of the sensor array 34 are arranged in columns. Note the row sensors may be separated from the column sensors by a dielectric material.

The sensor array 34 is comprised of a transparent conductive material and are in-cell or on-cell with respect to layers of the display. For example, a conductive trace is placed in-cell or on-cell of a layer of the touch screen display. The transparent conductive material, which is substantially transparent and has negligible effect on video quality of the display with respect to the human eye. For instance, a sensor of the sensor array 34 is an electrode and is constructed from one or more of: Indium Tin Oxide, Graphene, Carbon Nanotubes, Thin Metal Films, Silver Nanowires Hybrid Materials, Aluminum-doped Zinc Oxide (AZO), Amorphous Indium-Zinc Oxide, Gallium-doped Zinc Oxide (GZO), and poly polystyrene sulfonate (PEDOT).

In an example, the sensors are electrodes. As such, the rows of electrodes intersecting with the column of electrodes form a capacitive grid. For each intersection of a row and column electrode, a mutual capacitance (Cm) exists. In addition, each electrode (row and column) has a self-capacitance (Cs) with respect to a ground reference of the touch screen. As such, the touch screen senor array includes

| Resolution | Width (lines) | Height (lines) | pixel aspect ratio | screen aspect ratio | screen size (inches) |
|---|---|---|---|---|---|
| HD (high definition) | 1280 | 720 | 1:1 | 16:9 | 32, 40, 43, 50, 55, 60, 65, 70, 75, &/or >80 |
| Full HD | 1920 | 1080 | 1:1 | 16:9 | 32, 40, 43, 50, 55, 60, 65, 70, 75, &/or >80 |
| HD | 960 | 720 | 4:3 | 16:9 | 32, 40, 43, 50, 55, 60, 65, 70, 75, &/or >80 |
| HD | 1440 | 1080 | 4:3 | 16:9 | 32, 40, 43, 50, 55, 60, 65, 70, 75, &/or >80 |
| HD | 1280 | 1080 | 3:2 | 16:9 | 32, 40, 43, 50, 55, 60, 65, 70, 75, &/or >80 |
| QHD (quad HD) | 2560 | 1440 | 1:1 | 16:9 | 32, 40, 43, 50, 55, 60, 65, 70, 75, &/or >80 |
| UHD (Ultra HD) or 4K | 3840 | 2160 | 1:1 | 16:9 | 32, 40, 43, 50, 55, 60, 65, 70, 75, &/or >80 |
| 8K | 7680 | 4320 | 1:1 | 16:9 | 32, 40, 43, 50, 55, 60, 65, 70, 75, &/or >80 |
| HD and above | 1280->=7680 | 720->=4320 | 1:1, 2:3, etc. | 2:3 | 50, 55, 60, 65, 70, 75, &/or >80 |

The display 83 is one of a variety of types of displays that is operable to render frames of data into visible images. For example, the display is one or more of: a light emitting diode (LED) display, an electroluminescent display (ELD), a plasma display panel (PDP), a liquid crystal display (LCD), an LCD high performance addressing (HPA) display, an LCD thin film transistor (TFT) display, an organic light a plurality of mutual capacitances (Cm) and a plurality of self-capacitances (Cs), where the number of mutual capacitances equals the number of rows multiplied by the number of columns and the number self-capacitances equals the number of rows plus the number of columns.

In general, changes to the self and/or mutual capacitances result from changes in the dielectric properties of the capacitances. For example, when a human touches the touch screen, self-capacitance increases and mutual capacitance decreases due the dielectric properties of the person and the coupling of the person to the ground reference of the computing device. In another example, when an object is placed on the touch screen without a connection to ground, the mutual capacitances will increase or decrease depending on the dielectric properties of the object. This allows for different types of objects to be identified (e.g., touch screen pen, finger, another computing device proximal to touch screen for setting up an STS connection, etc.).

The memory 64 and/or 66 store an operating system 89, a screen-to-screen (STS) communication application 90, one or more STS source user applications 91 and one or more payment applications 92. The STS communication application 90 functions to allow STS communications from one computing device to another. For example, the STS communication application 90 works with an STS communication application on the other device to establish an STS communication protocol for the STS wireless connection 18. As a further example, the STS communication application stores and/or has access to verify personal data (e.g., biometric data, password, etc.) of an authorized user of the device before enabling the STS communication.

The source user applications 91 includes, but are not limited to, a video playback application, a spreadsheet application, a word processing application, a computer aided drawing application, a photo display application, an image processing application, a database application, and a plurality of interactive user applications, etc. While executing a source user application 91, the processing module generates data for display (e.g., video data, image data, text data, etc.). The payment applications 92 includes, but are not limited to, a bank application, a peer-to-peer payment application, a credit card payment application, a debit card payment application, a gift card payment application, etc. Note the STS communication applications 90 and source user applications 91 are OS agnostic (e.g., are operable to function on a variety of operating systems (e.g., Mac OS, Window OS, Linux OS, etc.)).

In an example of operation of an STS communication, the touch screen processing module 36 sends display data to the video graphics processing module 48, which converts the data into frames of video 87. The video graphics processing module 48 sends the frames of video 87 (e.g., frames of a video file, refresh rate for a word processing document, a series of images, etc.) to the display interface 93. The display interface 93 provides the frames of video to the display 83, which renders the frames of video into visible images.

While the display 83 is rendering the frames of video into visible images, the drive-sense modules (DSM) provide outbound signals of the STS communication to the sensors of the touch screen sensor array 34 and receive inbound signals of the STS communication from the sensors. When the screen is proximal to another screen or receiving signals via body as a network (BaaN), capacitance of the sensors are changed by the signals from the other screen. The DSMs detect the capacitance change for affected sensors and provide the detected change to the touch screen processing module 36.

The touch screen processing module 36 processes the capacitance change of the affected sensors to determine one or more specific elements (e.g., bit, byte, data word, symbol, etc.) of the STS communication and provides this information to the processing module 36. Processing module 36 processes the one or more specific elements to determine a portion of the STS communication. For example, the specific element indicates one or more of a purchase, a quantity, an edit, an identity of an item, a purchase price, a digital signature, a security code, and an acknowledgement.

Figure 10:
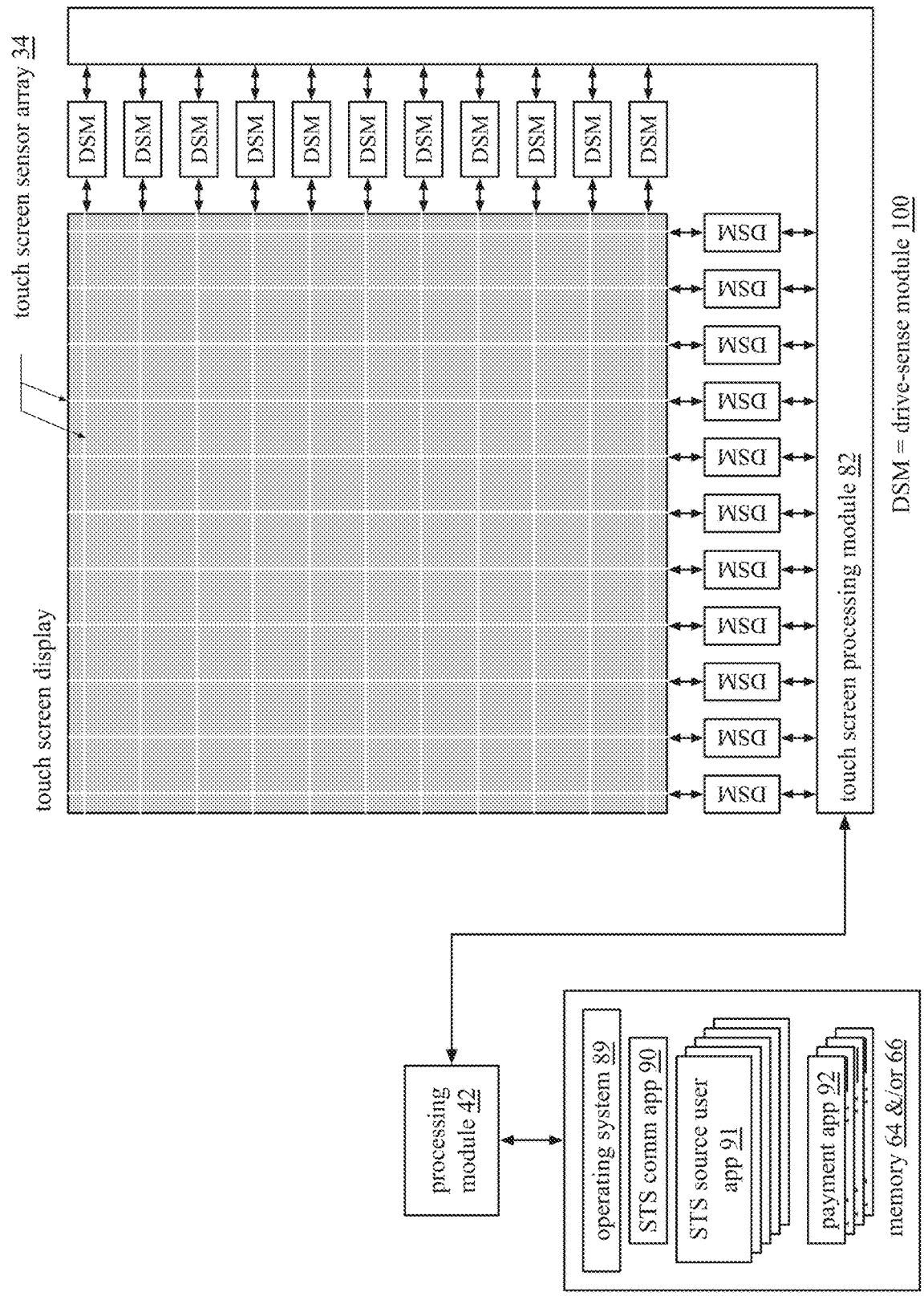
FIG. 10 is a schematic block diagram of an embodiment of a touch screen in accordance with the present invention.

FIG. 10 is a schematic block diagram of another embodiment of a touch screen sensor array 34 that includes a plurality of drive-sense modules (DSM), the processing module 42, and memory 64 and/or 66. The touch screen display operates similarly to the touch screen display 55 of FIG. 9 without the display 83, display interface 93 and video graphics processing module 48.

Figure 11:
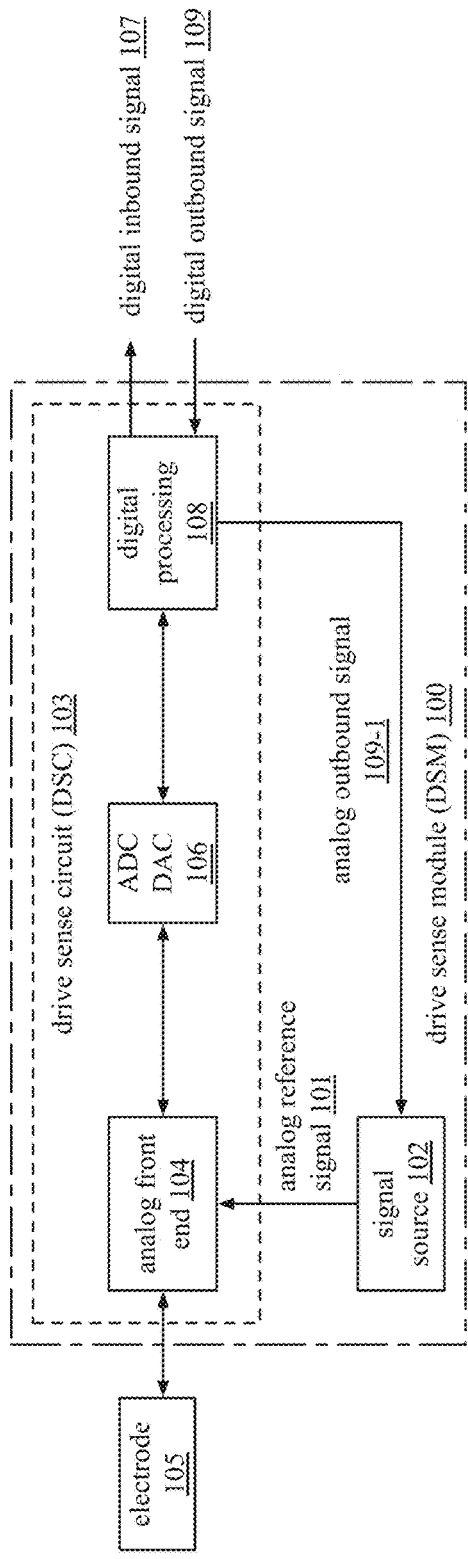
FIG. 11 is a schematic block diagram of an embodiment of a drive sense module in accordance with the present invention.

FIG. 11 is a schematic block diagram of an embodiment of a drive sense module (DSM) 100 connected to an electrode 105. The DSM 100 includes a signal source circuit 102 and a drive sense circuit (DSC) 103. The signal source 102 includes an alternate current (AC) signal generator, an existing element of computing device 12-14, display data that is emanated from a display, and/or another signal source.

The DSC 103 includes an analog front end 104, an analog to digital converter (ADC) & digital to analog converter (DAC) 106, and a digital processing circuit 108. The analog front end includes one or more amplifiers, filters, mixers, oscillators, converters, voltage sources, current sources, etc. For example, the analog front end 104 includes a current source, an ADC, a DAC and a comparator.

The analog to digital converter (ADC) 106 may be implemented in a variety of ways. For example, the (ADC) 106 is one of: a flash ADC, a successive approximation ADC, a ramp-compare ADC, a Wilkinson ADC, an integrating ADC, a delta encoded ADC, and/or a sigma-delta ADC. The digital to analog converter (DAC) 106 be implemented in a variety of ways. For example, the DAC 106 is one of: a sigma-delta DAC, a pulse width modulator DAC, a binary weighted DAC, a successive approximation DAC, and/or a thermometer-coded DAC. The digital processing circuit 108 includes one or more of digital filtering (e.g., decimation and/or bandpass filtering), format shifting, buffering, etc. Note in an embodiment, the digital processing circuit includes the ADC DAC 106.

In an example of operation, the DSM produces a digital inbound signal 107 that is representative of changes to an electrical characteristic (e.g., an impedance, a current, a reactance, a voltage, a frequency response, etc.) of the electrode 105 due to an STS communication. In particular, the analog front end 104 receives an analog reference signal 101 from the signal source 102 and utilizes it to determine the change in the electrical characteristic of the electrode. The analog front end 104 outputs a representation of the change to the ADC DAC 106, which converts it into a digital signal. The digital processing 108 processes the digital signal to produce digital inbound signal 107, which represents an element of the STS communication.

To transmit an element of the STS communication, the digital processing converts digital outbound signal 109 (e.g., representation of the element) into an analog outbound signal 109-1. The signal source 102 generates an analog reference signal 101 based on the analog outbound signal 109-1. For example, the analog outbound signal 109-1 indicates whether an analog reference signal is to be generated, and if so, at what frequency. As another example, the signal source 102 modulates a carrier signal with the analog outbound signal 109-1 to produce the analog reference signal 101. The analog front end 104 processes the analog reference signal to drive an analog signal representing the element onto electrode 105. Further examples of the operation of the drive sense circuit (DSC) 103 are discussed in patent pending application Ser. No. 16/113,379, entitled Drive Sense Circuit With Drive-Sense Line, filed Aug. 27, 2018.

Figure 12B:
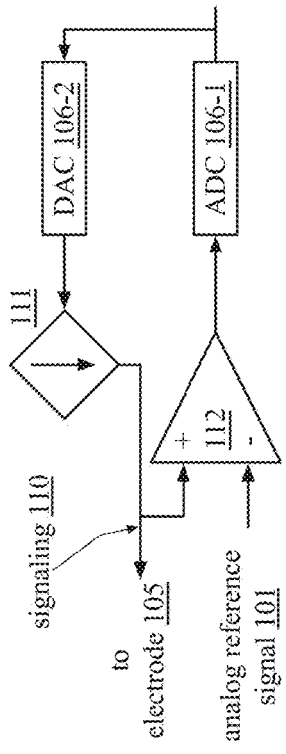
FIG. 12B is a schematic block diagram of another embodiment of a drive sense circuit in accordance with the present invention.
Figure 12A:
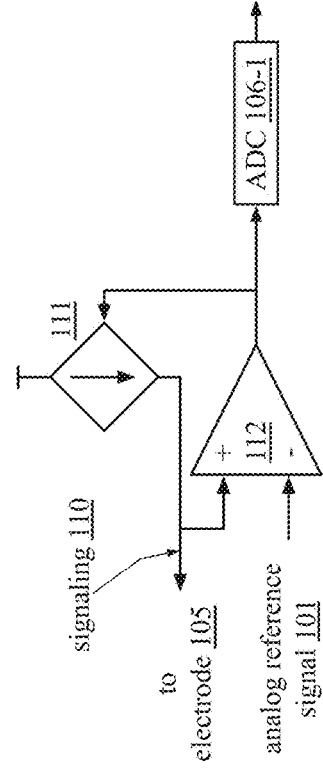
FIG. 12A is a schematic block diagram of an embodiment of a drive sense circuit in accordance with the present invention.

FIG. 12A is an embodiment of a portion (e.g., the analog front end 104, and an ADC 106-1 of the ADC DAC 106) of the drive sense circuit 103. In this embodiment, the analog front end 104 includes a current source 111 and a comparator 112.

In the example of receiving an element (e.g., bit, byte, data word, symbol, etc.) of an STS communication, the comparator 112 produces an analog compensation signal/ analog feedback signal based on comparing an analog reference signal 101 to signaling 110, which is indicative of an electrical characteristic (e.g., impedance (Z)) change to electrode 105. The ADC 106-1 converts the analog compensation signal to produce a digital inbound signal that represents the element of the STS communication. The dependent current source 111 modifies a current (I) on the output line (e.g., connected to electrode 105) based on the analog feedback signal so that a voltage (V) on the electrode remains substantially constant. For example, when an impedance (Z) decreases on electrode 105, according to the formula V=I*Z, the current is increased such that the voltage on the electrode remains substantially constant.

FIG. 12B is a schematic block diagram of another embodiment of a portion the drive sense circuit 103 that includes a, ADC 106-1, a DAC 106-2a current source 111, and a comparator 112. This example is similar to FIG. 12A, except the feedback loop to the current source 111 is through the ADC 106-1 and the DAC 106-2, instead of directly from the comparator 112.

Figure 13:
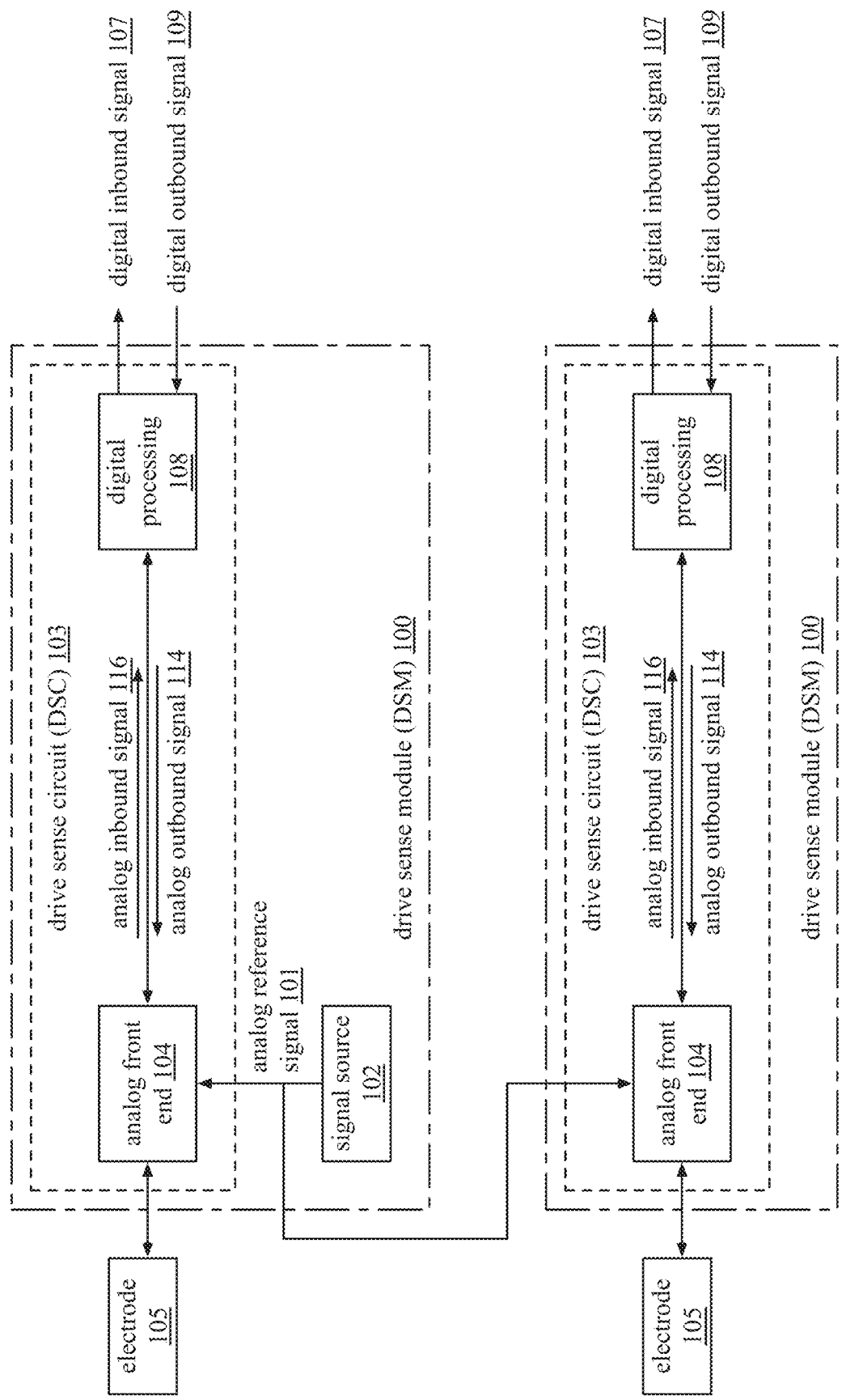
FIG. 13 is a schematic block diagram of an embodiment of drive sense modules in accordance with the present invention.

FIG. 13 is a schematic block diagram of a plurality of drive sense modules 100. The drive sense modules are configured similar to FIG. 12, except that the digital processing 108 includes an analog to digital converter and a digital to analog converter and one signal source 102 provides the analog reference signal 101 to more than one drive sense module (DSM) 100. Further, analog outbound signal 114 is sent directly to analog front end 104. The analog front end 104 also provides analogy inbound signal 116 to digital processing 108.

Figure 14:
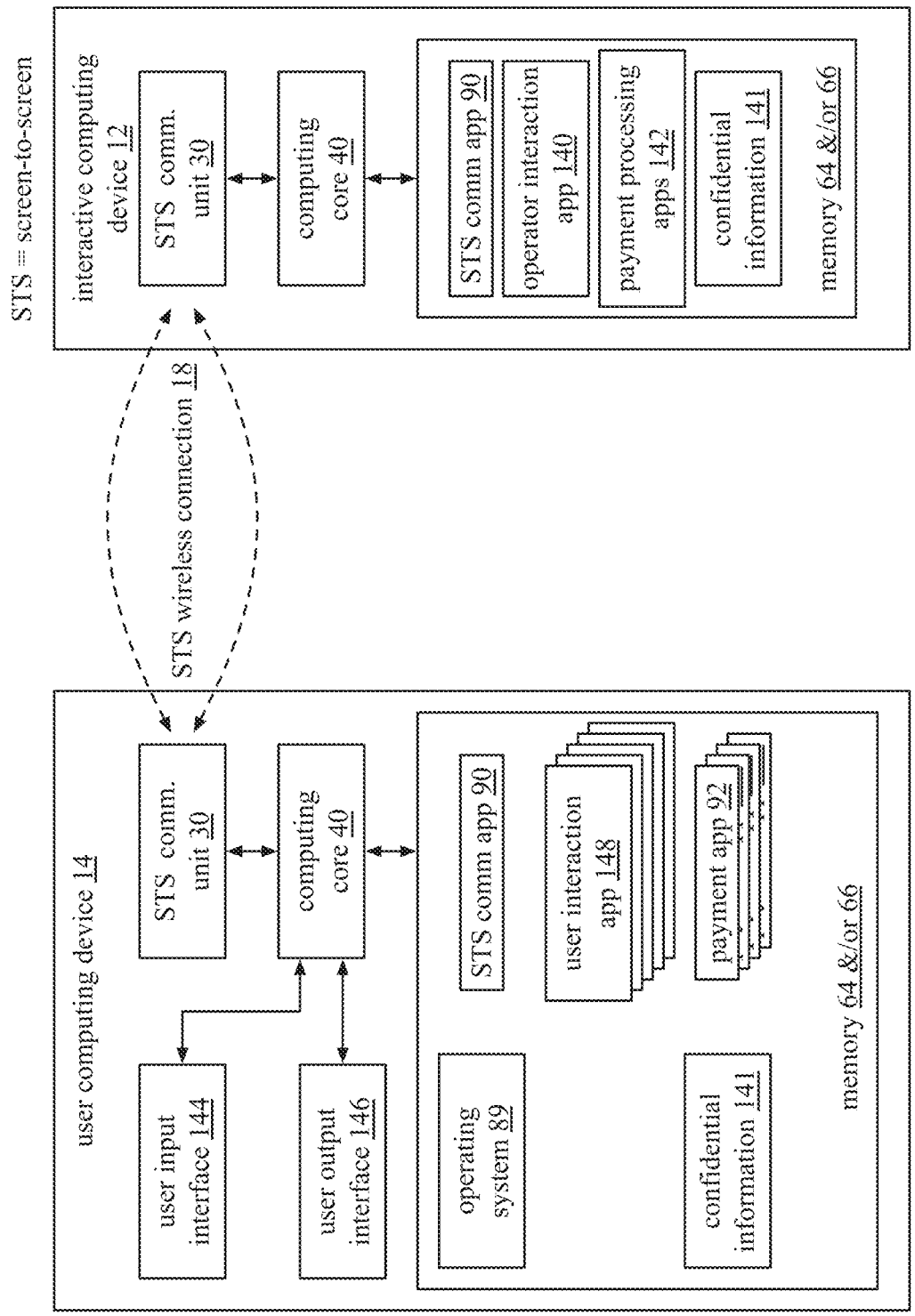
FIG. 14 is a schematic block diagram of another embodiment of a user computing device and an interactive computing device in accordance with the present invention.

FIG. 14 is a schematic block diagram of an example of a user computing device (UCD) 14 communicating with an interactive computing device (ICD) 12 via a screen-to-screen (STS) wireless connection 18. The user computing device (UCD) 14 may be implemented by a combination of two or more devices. For example, the user computing device 14 is a cell phone and a fob (e.g., small security hardware device with built-in authentication (e.g., keyless entry device, remote car starter, garage door opener, etc.)). As another example, the user computing device 14 is a cell phone and a car. Alternatively, the user computing device 14 is an individual device such as a cell phone, a tablet, a personal touch screen device (e.g., fob), a car, etc. The user computing device 14 includes a computing core 40 connected to a user input interface 144, a user output interface 146, an STS communication unit 30, and a memory 64 and/or 66.

The memory 64 and/or 66 of UCD 14 includes an operating system 89, an STS communication application 90, a set (e.g., one or more) of user interaction applications 148, a set of payment applications 92, and confidential information 141. The confidential information 141 includes, but is not limited to, user's personal information, user computing device identification (ID), user's payment information, security information (e.g., passwords, biometric data, etc.) and user's personal preferences per user application (e.g., preference for coffee orders, fast food orders, transportation tickets, event tickets, etc.).

As some limited examples, the set of user interaction applications 148 includes a fast food drive ordering application, a transportation ticket purchase application, an event ticket purchase application, a banking application, a point of sale payment application, a rental car enable and checkout application, an airline application, a sales information application, an interactive screen information application, a data transfer application, a meeting data exchange application, a hotel check in application, and a cell phone is hotel room key application.

The STS communication application 90 functions as previously described to assist the UCD 14 in setting up the communication between devices. For example, the STS communication application 90 determines (e.g., selects a default, receives a command, etc.) one or more of a communication medium (e.g., close proximity, body as a network, surface, etc.), a communication method (e.g., cellular data, STS communication link, Bluetooth, etc.), a signaling and/or pattern protocol (e.g., amplitude shift keying (ASK) modulation, etc.), and security mechanisms (e.g., security codes, encryption, data transmission of particular data types restrictions, etc.) for which the devices utilize for the communication. The payment applications 92 include, but are not limited to, one or more of a bank application, a credit card application, peer-to-peer payment application, and a cryptocurrency exchange application.

The interactive computing device (ICD) 12 includes a screen to screen (STS) communication unit 30, a computing core 40, and a memory 64 and/or 66. The memory 64 and/or 66 of the ICD 12 includes an STS communication application 90, an operator interaction application 140, a set of payment processing applications 142, and confidential information 141.

The STS communication application 90 of the ICD 12 functions similarly as the STS communication application 90 of the UCD 14 to setup the STS communications from an operator of the ICD's perspective. As an example in setting up communication between the devices, the STS communication application of the ICD is a leader (controls communication settings) and the STS communication application of the UCD is a follower (e.g., uses settings selected by the ICD STS communication app 90). In another example, the STS communication application 90 of both the UCD 14 and the ICD 12 need to agree on and/or have control over various settings. For example, the UCD 14 and ICD 12 agree to use a cellular data connection (e.g., 5G) to transmit transactional data. However, the UCD will only transmit certain confidential information via an STS wireless connection 18 and the ICD will only accept connections with a minimum bit rate over a wireless local area network (WLAN) connection with the UCD. Thus, the ICD needs to agree to receive the certain confidential information via the STS wireless connection 18 and the UCD needs to agree to transmit at the minimum bit rate over the WLAN to successfully perform the setup.

The operator interaction application 140 includes an operator version of a fast food drive ordering application, a transportation ticket purchase application, an event ticket purchase application, a banking application, a point of sale payment application, a rental car enable and checkout application, an airline application, a sales information application, an interactive screen information application, a data transfer application, a meeting data exchange application, a hotel check in application, a cell phone is hotel room key application. The payment processing application 142 includes one or more of a bank operator application, a credit card operator application, peer-to-peer payment operator application, a cryptocurrency exchange operator application, and an automated clearing house application.

Once the STS communication settings are agreed upon, the UCD 14 and ICD 12 may utilize the STS wireless connection 18 to transmit data of a transaction. The STS wireless connection 18 includes one or more connection types. For example, a first connection type is a body as a network (BaaN) connection. As another example, a second connection type is a touch screen to touch screen close proximity connection. As yet another example, a third connection type is a connective surface between the touch screen to touch screen (e.g., in order to transmit an encoded vibration signal). In an example, the user computing device 14 and the interactive computing device 12 exchange confidential information (e.g., confidential information 141), or a portion thereof via the STS wireless connection 18.

By using the STS wireless connection, the UCD 14 and ICD 12 exchange data in a secure manner and also reduce the amount of steps a user of the UCD needs to manually complete to perform a transaction. For example, using a BaaN connection, the signal is difficult for any device other than then UCD and ICD to detect. Further, when transmitting payment information during touching a screen to confirm an order of items, a user does not have to perform one or more of the steps of locating a credit card, swiping the card, verifying the amount, signing a screen or physical receipt, and returning card to a safe location.

Figure 15:
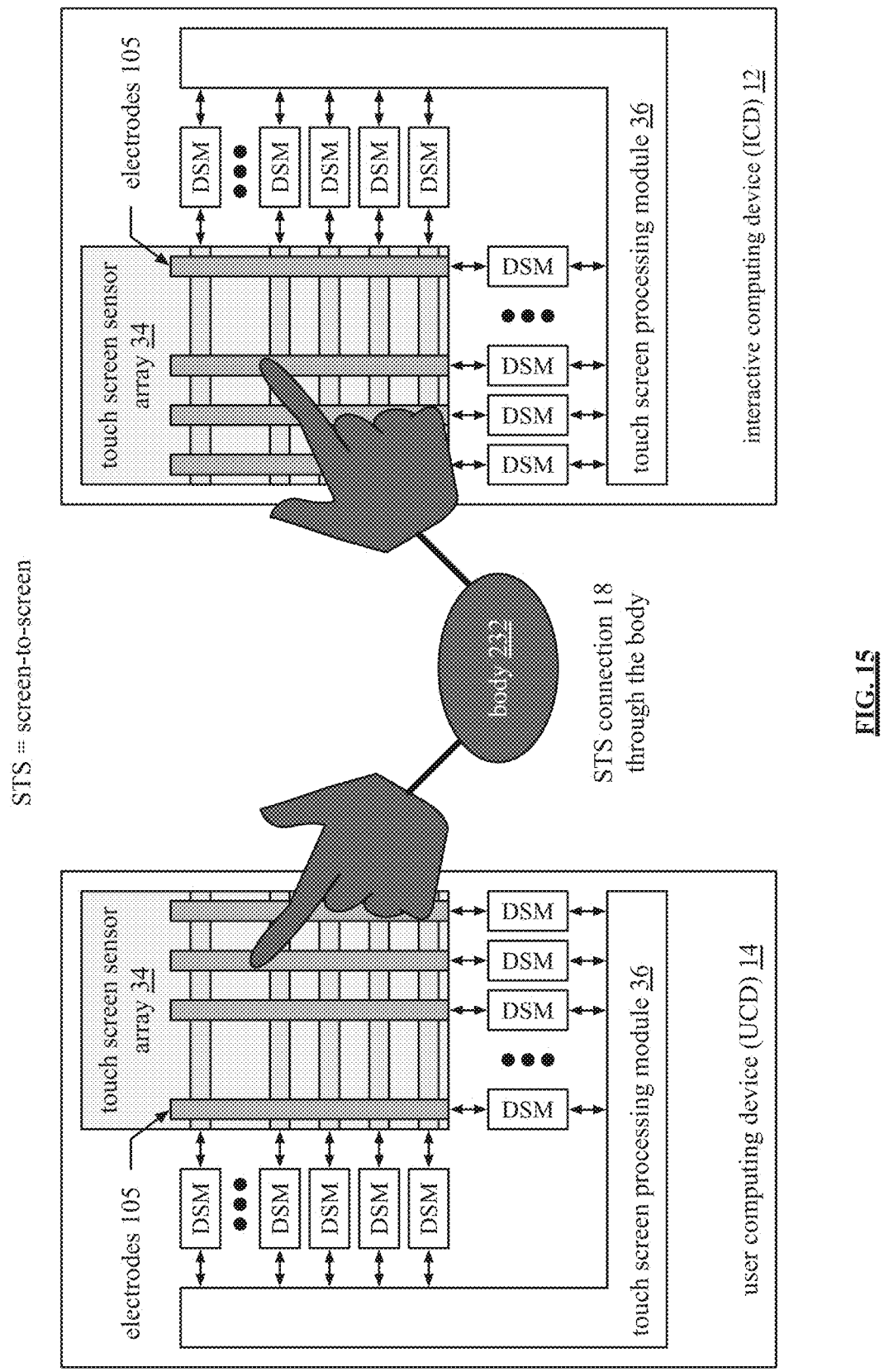
FIG. 15 is a schematic block diagram of an embodiment of a screen-to-screen (STS) connection in accordance with the present invention.

FIG. 15 is a schematic block diagram of an embodiment of a screen-to-screen (STS) connection 18 between a user computing device (UCD) 14 and an interactive computing device (ICD) 12 through a body 232 (e.g., human body for a body as a network (BaaN) STS connection). The UCD 14 and ICD 12 include a touch screen sensor array 34, drive sense modules, and a touch screen processing module 36. The touch screen sensor array 34 includes rows of electrodes 105 (shown in yellow) and columns of electrodes 105 (shown in blue).

In an example of operation, a drive sense module generates a signal having an oscillation component based on a command from the touch screen processing module 36. The drive sense module drives the signal onto a touch sense element (e.g., one or more electrodes 105) of the touch screen sensor array 34. When a part of the body (e.g., finger, hand, arm, foot, etc.) touches the first touch sense element or is in close proximity (e.g., within a few millimeters to tens of millimeters), the signal on the touch sense element propagates through the body 232. The ICD 12 receives the signal through another part of the body 232 (e.g., another finger) via a second touch (or close proximity connection) on the touch screen sensor array 34 of the ICD 12.

As such, data is securely transmitted from one device to another. The transmit of data is also more efficient for a user (e.g., body 232) as the data can be transmitted more seamlessly than other communication types. For example, with STS communications enabled on both the UCD and the ICD, when a user of the UCD presses (e.g. touches) a payment button on the ICD, payment information may be security transmitted from the UCD to the ICD via the STS connection 18 during the pressing without other steps (e.g., inputting payment information, selecting a payment option, scanning a bar code, swiping a card, etc.).

In a specific embodiment, the touch screen processing module may adjust the current of a signal driven onto the touch sense element based on a composition of the body in the BaaN. For example, a user's body impedance lowers as total body water of the user (e.g., stored in the user's tissues) increases. Thus, as the users' impedance changes, the touch screen processing module may adjust the current accordingly. This allows the current usage to be minimized, which may save power. This further allows for the signal to be modified to achieve desired signal characteristics (e.g., signal to noise ratio, signal strength, etc.).

Figure 16:
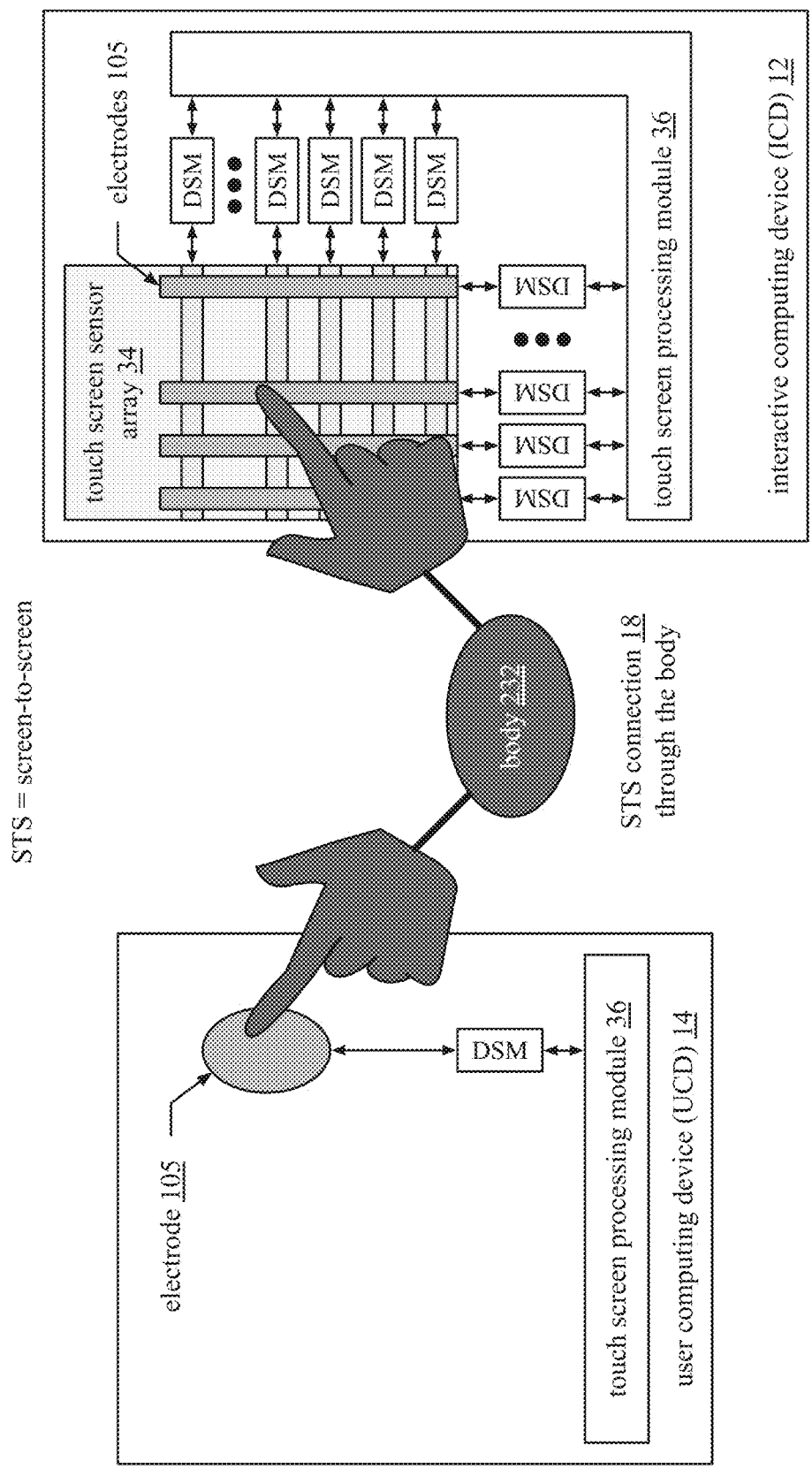
FIG. 16 is a schematic block diagram of another embodiment of a screen-to-screen (STS) connection in accordance with the present invention.

FIG. 16 is a schematic block diagram of an embodiment of a screen-to-screen (STS) connection 18 between a user computing device (UCD) 14 and an interactive computing device (ICD) 12 through a human body 232. The UCD 14 includes an electrode 105 (e.g., of a touch screen), a drive sense module, and a touch screen processing module 36. The ICD 12 includes a touch screen sensor array 34 that includes electrodes 105, drive sense modules (DSMs), and a touch screen processing module 36.

In an example of operation, the STS connection 18 is formed between an electrode 105 of the UCD 14 and a touch sense element (e.g., one or more electrodes) of the touch screen sensor array 34 of the ICD 12. The DSMs sense an impedance change of a corresponding electrode(s) 105, which is interpreted by a touch screen processing module 36 as a command. As a specific example, the command is a user signature. While the user is signing an area of the touch screen sensor array 34, an STS connection 18 is formed and data (e.g., payment data) can be exchanged between the UCD and the ICD over the STS connection. Thus, during the signature, data transmitted via the STS connection 18 assist in completing a transaction.

Figure 17:
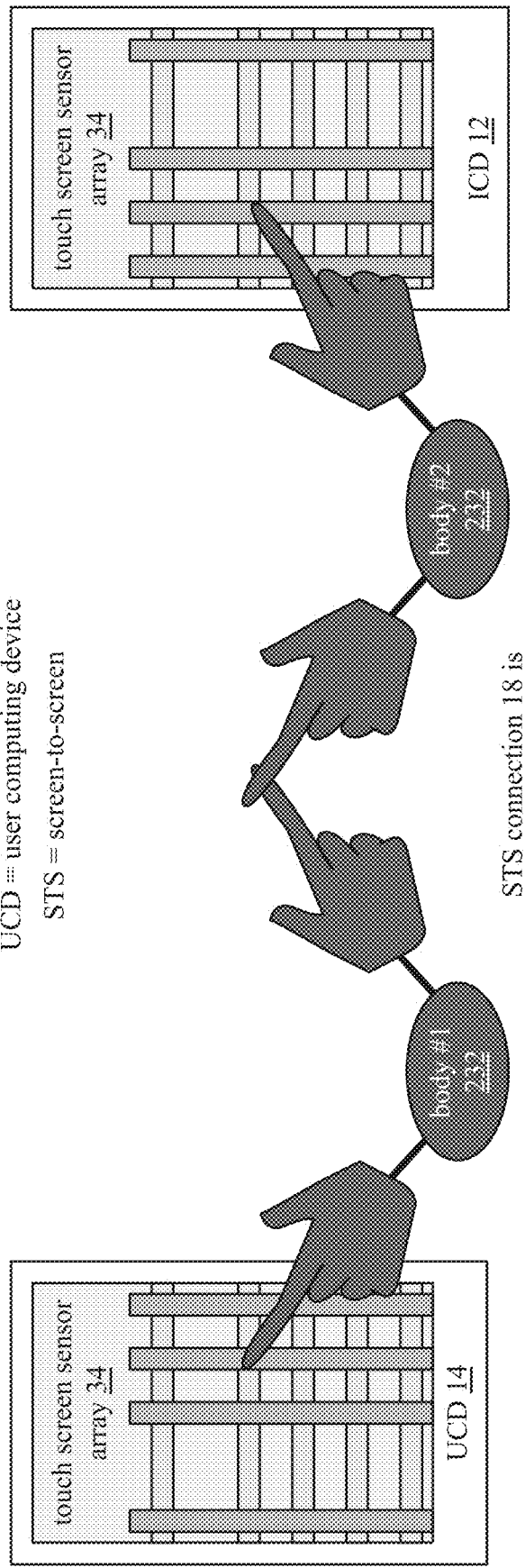
FIG. 17 is a schematic block diagram of an embodiment of another example a screen-to-screen (STS) connection in accordance with the present invention.

FIG. 17 is a schematic block diagram of an example of a screen-to-screen (STS) connection 18 between a user computing device (UCD) 14 and an interactive computing device (ICD) 12 through multiple bodies 232. The UCD 14 includes a first touch screen sensor array 34 and the ICD 12 includes a second touch screen sensor array 34.

In an example of operation, the STS connection 18 is formed from the first touch sensor array 34 through a first body 232 and a second body 232 to a second touch screen sensor array 34 of ICD 12, or vice versa. There are various ways a connection between the bodies can occur. For example, the connection occurs when user 1 and user 2 first bump, shake hands or otherwise have skin-to-skin contact that allows the signal (e.g., driven onto a touch sense element of the touch screen) to propagate. In a specific example, the STS connection 18 is formed between the UCD 14 and the ICD 12 when the body #1 232 is in contact with the body #2 232 for a certain time period (e.g., 20 milliseconds, 0.2 seconds, 3 seconds, etc.).

In an embodiment, the computing device 12-14 includes a touch button or other specific area on the computing device 12-14 used to ensure purposeful engagement of a user in sharing data via the STS connection 18. For example, a portion of a side of the computing device is selected (e.g., clicked, swiped, etc.) 3 times as a command to purposefully engage. As another example, a portion of a display on the computing device 12-14 displays a share "button" for a user to select in order to purposefully engage. As yet another example, "shaking" the computing device 12-14 indicates the user's intent to purposefully engage.

Figure 18:
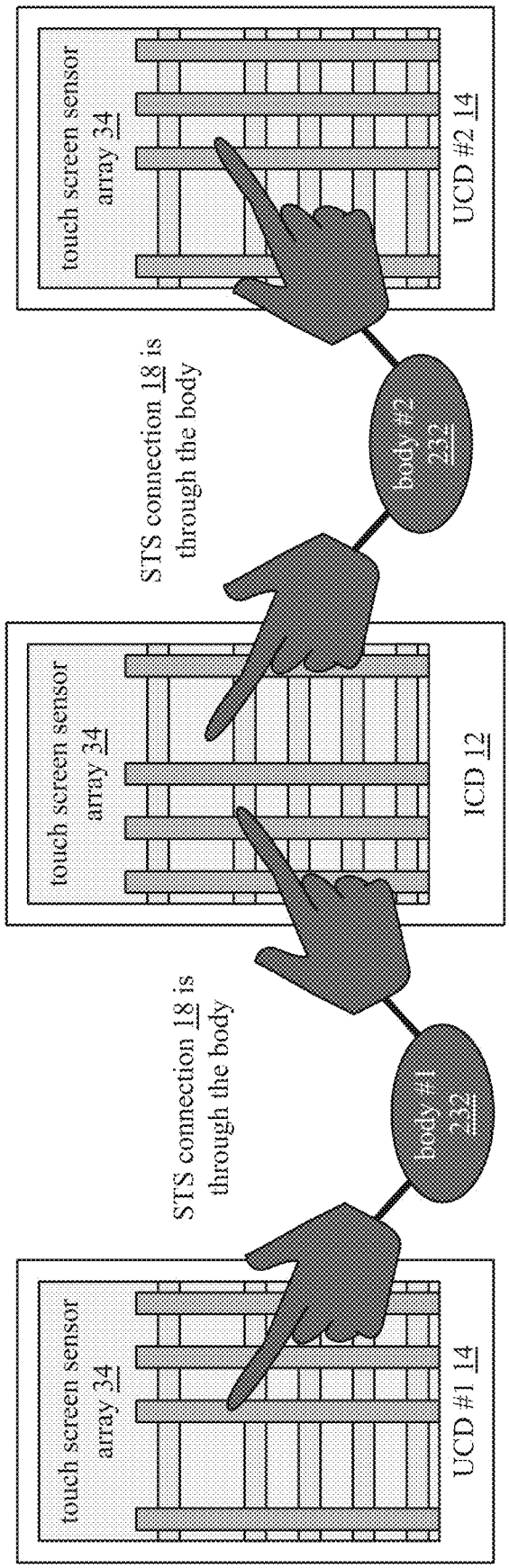
FIG. 18 is a schematic block diagram of an embodiment of an example of forming multiple screen to screen (STS) connections in accordance with the present invention.

FIG. 18 is a schematic block diagram of an example of forming multiple screen to screen (STS) connections 18 for a transaction between an interactive computing device (ICD) 12 and multiple user computing devices (UCDs) 14. In an example, a first STS connection 18 is formed between the UCD #1 and the ICD 12 via a first body 232 and a second STS connection 18 is formed between the ICD 12 and the UCD #2 via a second body 232. In an example, this allows the UCD #1 and the UCD #2 to share data via the first and second STS connections 18 and the ICD 12.

As a specific example, multiple users determine to split a dinner bill at restaurant. For example, a user #1 of UCD #1 (a first cell phone operable to perform STS communications) and user #2 of UCD #2 (a second cell phone operable to perform STS communications) determine to split the dinner bill. The ICD 12, which is a point-of-sale device that includes a touch screen sensor array 34 and is operable to perform STS communications. User #1 and #2 both activate a payment transaction via a payment application on their cell phone and touch the touch screen sensor array 34 of the point of sale device, which forms an STS connection 18 from each cell phone to the point of sale device.

The point of sale device prompts the users to select items for which they will provide payment or prompts the users to select a percentage of the bill they will pay. For example, user #1 indicates they will pay 60% of the bill amount and user #2 indicates they will pay 40% of the bill amount. In a specific embodiment, the users must touch the touch screen sensor array during the same time period (e.g., simultaneously, within 1 sec, etc.) to properly validate the transaction.

Figure 19:
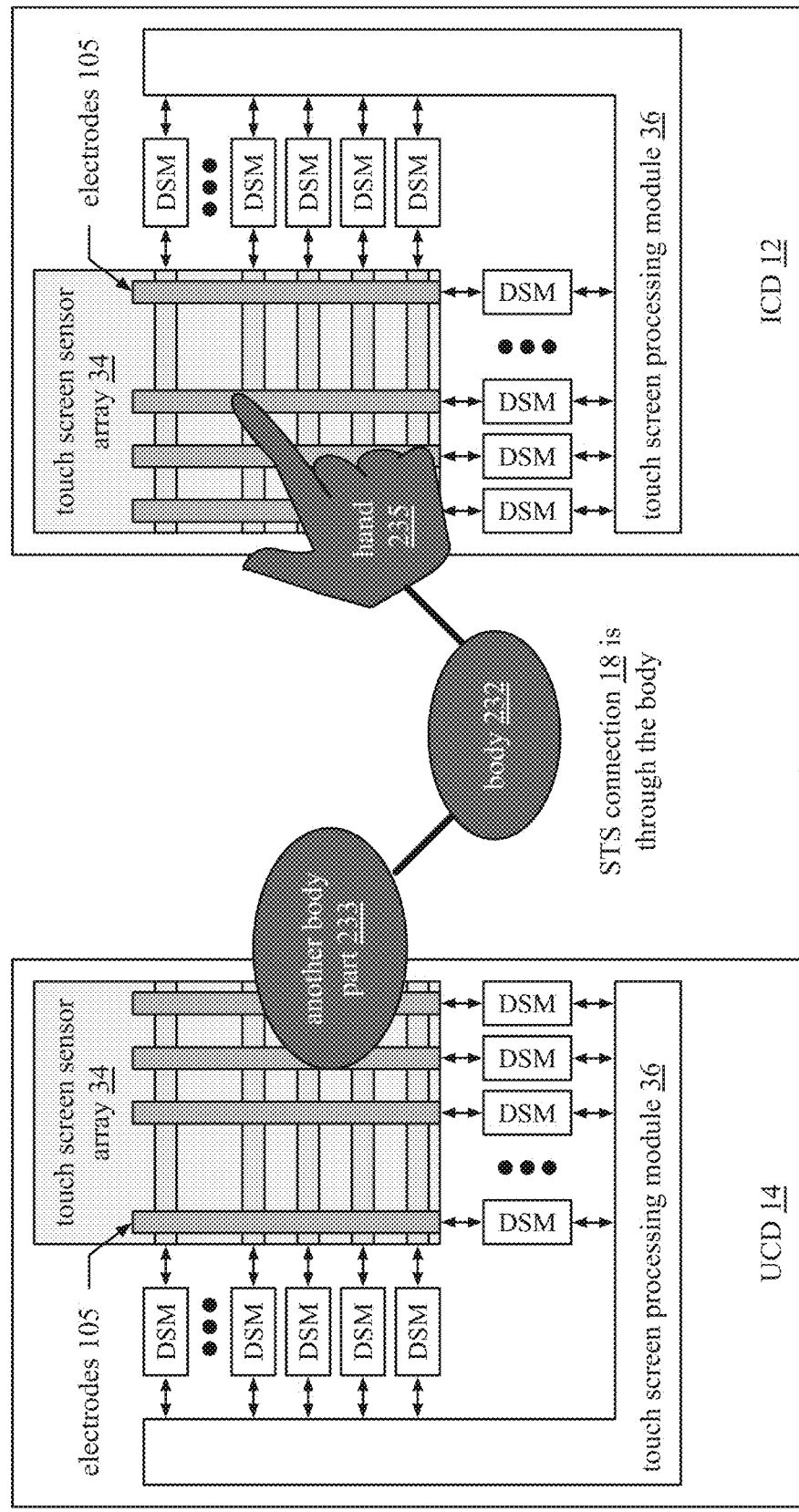
FIG. 19 is a schematic block diagram of an embodiment of another example an example of forming multiple screen to screen (STS) connections in accordance with the present invention.

FIG. 19 is a schematic block diagram of an example of a screen-to-screen (STS) connection 18 between a user computing device (UCD) 14 and an interactive computing device (ICD) 12. In this example, another body part 233 (e.g., leg, arm, chest, wrist, etc.) in is contact with the UCD 14 and operates to transmit a signal between the UCD 14 and the ICD 12 via the STS connection 18 that includes the other body part 233, the body 232, and hand 235. As a specific example, the UCD 14 is a cell phone in a user's pants pocket and the other body part is a leg proximal to the pants pocket, allowing the user to transmit STS communications without removing the cell phone from their pocket.

Figure 20:
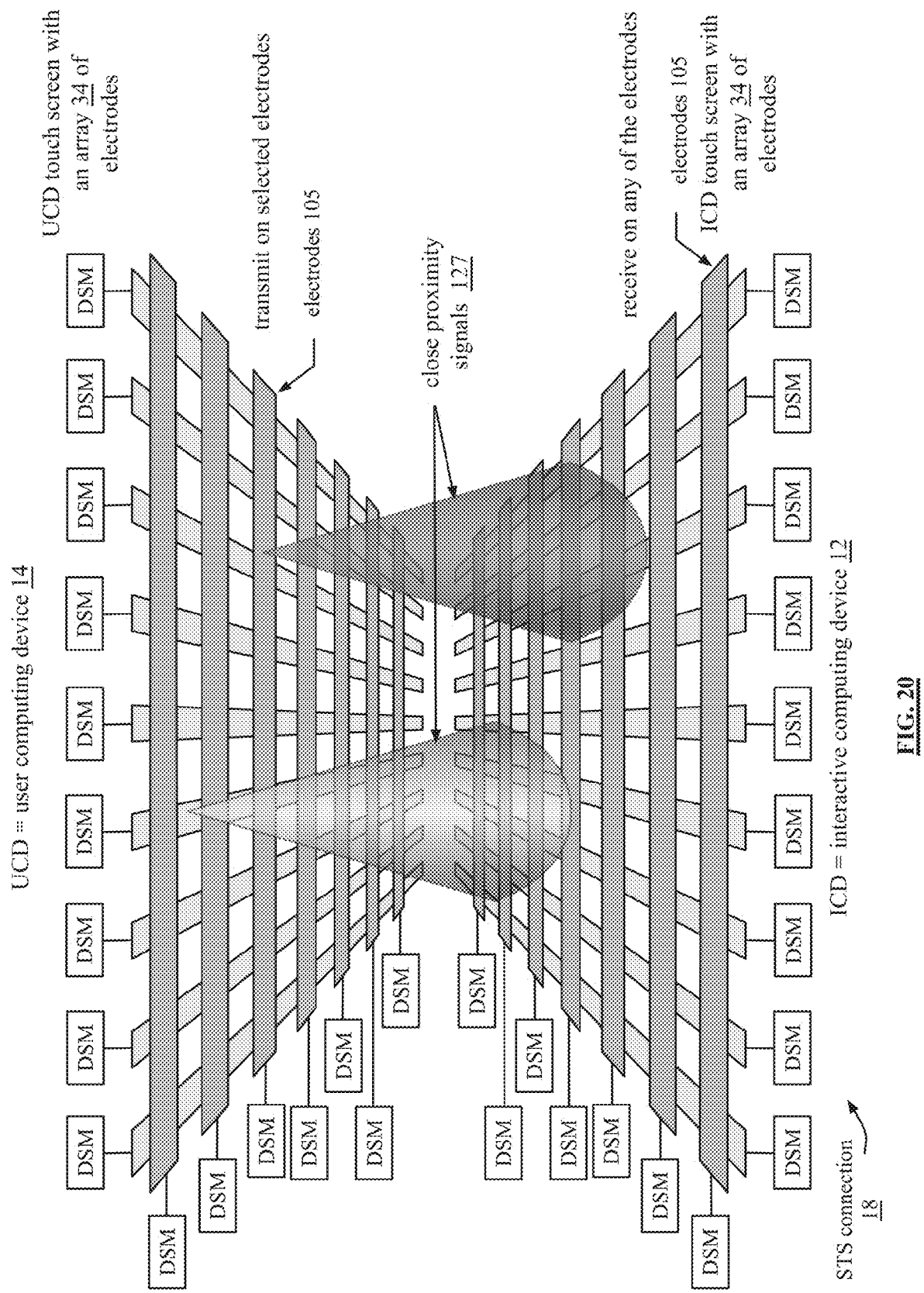
FIG. 20 is a schematic block diagram of an embodiment of an example of transmitting close proximity signals in accordance with the present invention.

FIG. 20 is a schematic block diagram of an example of transmitting close proximity signals 127 from a user computing device 14 to an interactive computing device 12 to form a screen to screen (STS) connection 18. The user computing device 14 includes drive sense modules (DSMs) and a touch screen array 34 of electrodes 105. The interactive computing device 14 includes drive sense modules (DSMs) and a touch screen array 34 of electrodes 105.

In an example of operation, data is transmitted in close proximity signals 127 via one or more electrodes 105 of the user computing device (UCD) 14 touch screen with an array 34 of electrodes 105. The electrodes 105 are shaped and designed for capacitance sensing (e.g., not radio frequency (RF) transmission). In an example, the electrodes of the computing device generate and shape an electric field. At close proximity (e.g., a few centimeters (cm) to 10's of cm (e.g., 70 cm), electrodes in another computing device will detect the electric field. In this example, the signaling is very low power and the radiated energy from the signal drops off very rapidly (e.g., less than few feet before signal to noise ratio is too low).

In an example, the UCD 14 selects one or more of the electrodes 105 to transmit the close proximity signals 127. For example, the UCD 14 determines an optimal area (e.g., which contains one or more electrodes) of the touch screen sensor array 34 to transmit to produce the selected electrodes 105. As another example, the UCD 14 selects electrodes for receiving close proximity signals 127 to be transmitted from the IDC 12. Note the UCD may select one or more different electrodes for receiving and transmitting the close proximity signals 127.

Figure 21:
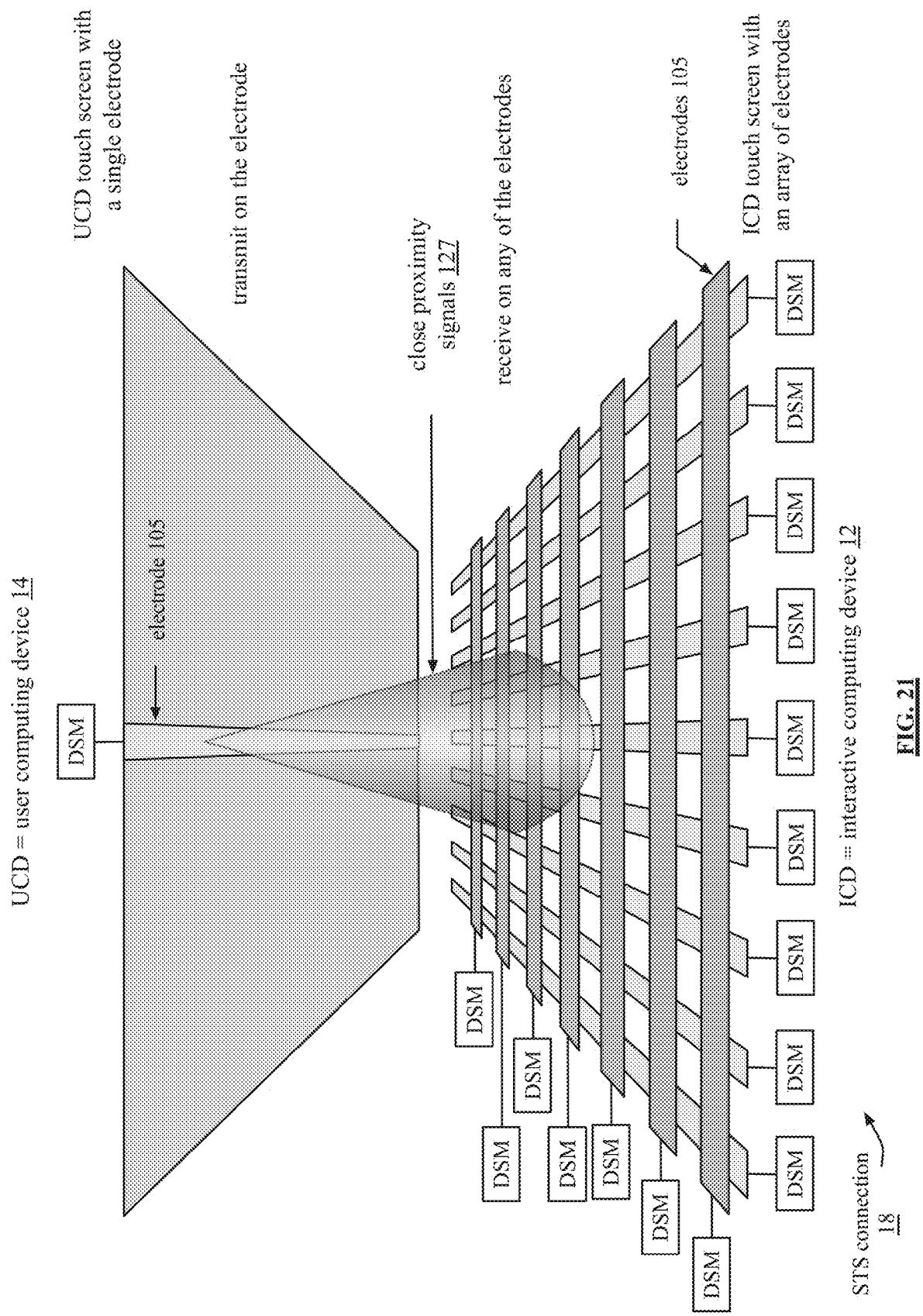
FIG. 21 is a schematic block diagram of an embodiment of another example of transmitting close proximity signals in accordance with the present invention.

FIG. 21 is a schematic block diagram of another example of transmitting close proximity signals 127 between a user computing device (UCD) 14 and an interactive computing device 12 to form a screen to screen (STS) connection 18. The UCD includes a single electrode 105. The ICD 12 includes an array of electrodes 105 and is enabled to receive the close proximity signal 127 on one or more of any of the electrodes 105. The electrode 105 of the UCD may be one of a variety of shapes. For example, the electrode shape is one or more of a rectangle, a polygon, circular, a meandering trace, and a square.

Figure 22:
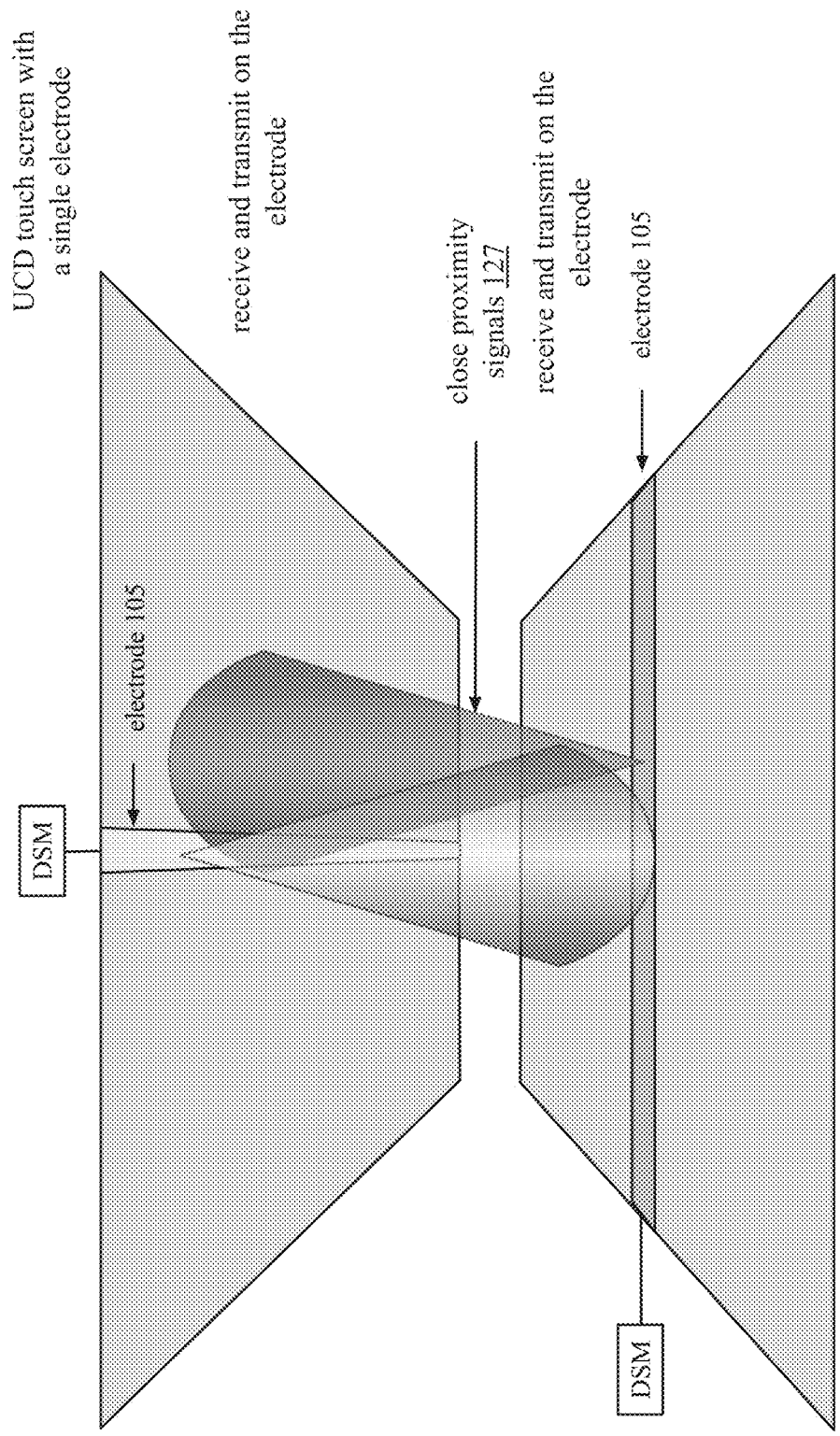
FIG. 22 is a logic flow diagram of an example of a method for determining which type of communication to use in accordance with the present invention.

FIG. 22 is a schematic block diagram of another example of transmitting close proximity signals 127 between a user computing device (UCD) 14 and an interactive computing device (ICD) 12 to form a screen to screen (STS) connection. In this example, each touch screen (e.g., of the user computing device, of the interactive computing device) includes a single electrode 105. The orientation of an electrode of one device can vary with an electrode of another device. For example, the electrodes may be oriented perpendicular to each other, parallel to each other, offset (e.g., from a horizontal center, from a vertical center, etc.) with respect each other, and/or a rotated a certain number of degrees with respect to each other. In this example, the electrode 105 (shown in yellow) of the UCD 14 transmits close proximity signals 127 (shown as the yellow signal) to the electrode 105 (shown in blue) of the ICD 12. The electrode 105 (shown in blue) of the ICD 12 transmits close proximity signals 127 (shown as the blue signal) to the electrode 105 of the UCD 14.

Figure 23:
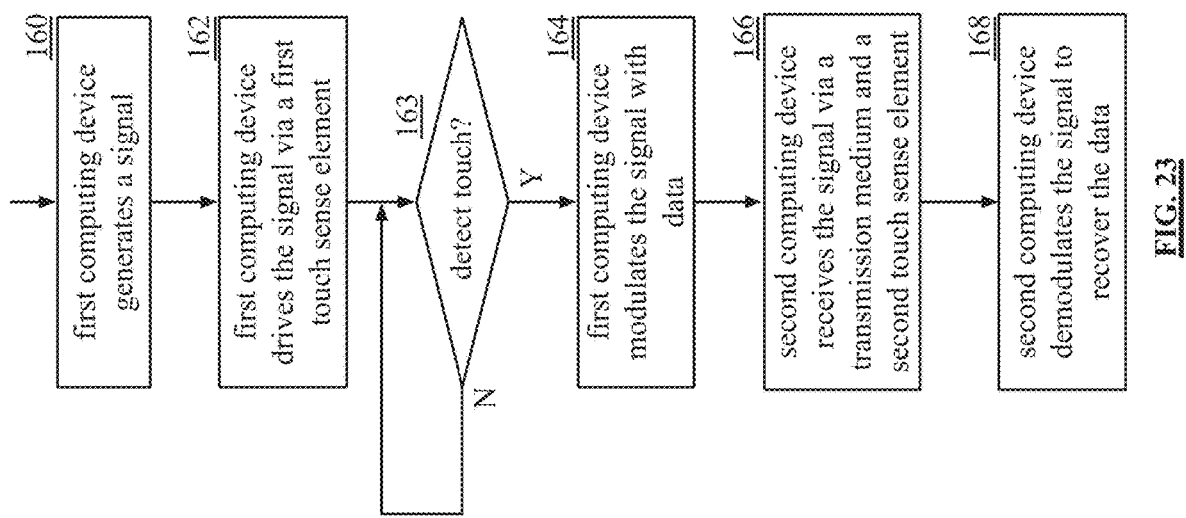
FIG. 23 is a logic flow diagram of an example of a method of a first and second computing device communicating via a screen to screen (STS) connection in accordance with the present invention.

FIG. 23 is a logic flow diagram of an example of a method of a first and second computing device (e.g., a user computing device, an interactive computing device, another computing device, etc.) communicating via a screen to screen (STS) connection. The method begins or continues with step 160, where a first computing device generates a signal. For example, the signal has one or more of a direct current (DC) component and an oscillating component. The method continues with step 162, where the first computing device drives the signal on to a first touch sense element (e.g., one or more electrodes) of the first computing device.

The method continues with step 163, where the first computing device determines whether it detects a touch (e.g., pen, human finger, etc) on the first touch sense element based on the signal. For example, the first computing device detects the touch by determining a capacitance change (e.g., self-capacitance, mutual-capacitance) associated with the first touch sense element. When the touch is not detected, the method continues with back to step 163. Alternatively when the touch is not detected, the method times out or loops back to steps 160 and/or 162.

When the touch is detected, the method continues at step 164, where the first computing device modulates the signal with data to produce a modulated data signal. In an example, the oscillating component of the signal has a first frequency and the first computing device modulating the signal with the data to produce the modulated data signal includes mixing the signal with the data that includes a second oscillating component having a second frequency.

The method continues with step 166, where the second computing device receives the modulated data signal via a transmission medium and a second touch sense element (e.g., one or more second electrodes) of the second computing device. The transmission medium includes at least one of a human body (e.g., body as a network (BaaN)) and a close proximity (e.g., 70 cm or less) between the first and second computing devices. In an example, when the human body is the transmission medium, the second computing device operates to detect a second touch on the second touch sense element.

The method continues with step 168, where the second computing device demodulates the modulated data signal to recover the data. In an example, the second computing device may respond to the data by generating a second signal having a second oscillating component. The second computing device drives the second signal on the second touch sense element and detects a second touch on the second touch sense element based on the second signal. While the second touch is detected, the second computing device modulates the second signal with second data to produce a second modulated data signal. For example, the second computing device backscatters the second data with the modulated data signal to produce the second modulated data signal. As another example, the second computing device mixes the second data with the second signal to include a second oscillating component having a second frequency.

The first computing device may then receive the second modulated data signal via the transmission medium and the first touch sense element and/or another touch sense element (e.g., touch sense element in contact with a user) of the first computing device. The first computing device demodulates the second modulated data signal to recover the second data.

Figure 24:
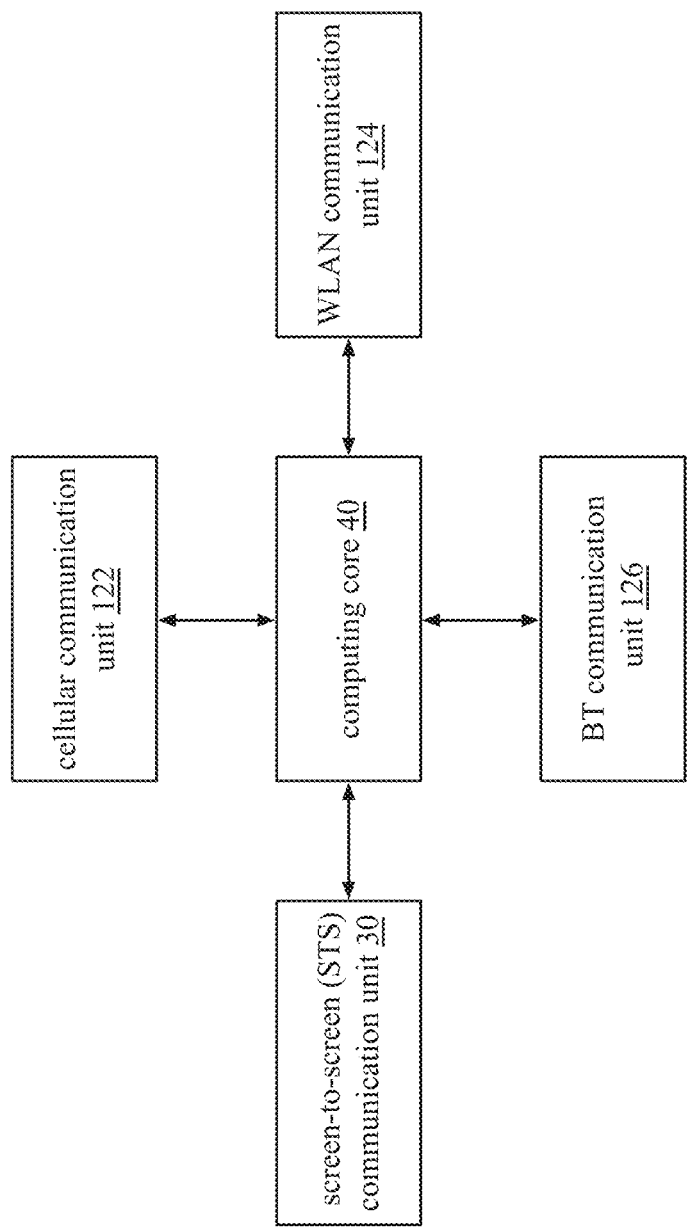
FIG. 24 is a schematic block diagram of an embodiment of a computing device in accordance with the present invention.

FIG. 24 is a schematic block diagram of a computing device 12-14 that includes a computing core 40, a screen-to-screen (STS) communication unit 30, a cellular communication unit 122, a wireless local area network (WLAN) communication unit 124, and a Bluetooth (BT) communication unit 126. As such, a computing device 12-14 can communicate in various forms (e.g., via Bluetooth, via STS, etc.) with other devices (e.g., servers, other computing devices, base stations, etc.) via one or more of the communication units 120-126. For example, a first computing device 12-14 communicates STS data of a transaction to another computing device 12-14 via the STS communication unit 30. As another example, a computing device 12-14 communicates verification data of a transaction to an interactive application server via the cellular communication unit 122.

The computing device determines one or more of the communication options (e.g., screen-to-screen STS, Bluetooth (BT), etc.) to use based on a data type and/or a data communication protocol. For example, the data communication protocol indicates to communicate data of a private personal data type via the STS communication unit 30. As another example, the computing device determines to communicate user computing device location information via the cellular communication unit 122. Further examples of communicating data via the one or more communication units 120-126 is discussed in further detail with reference to one or more subsequent figures.

Figure 25:
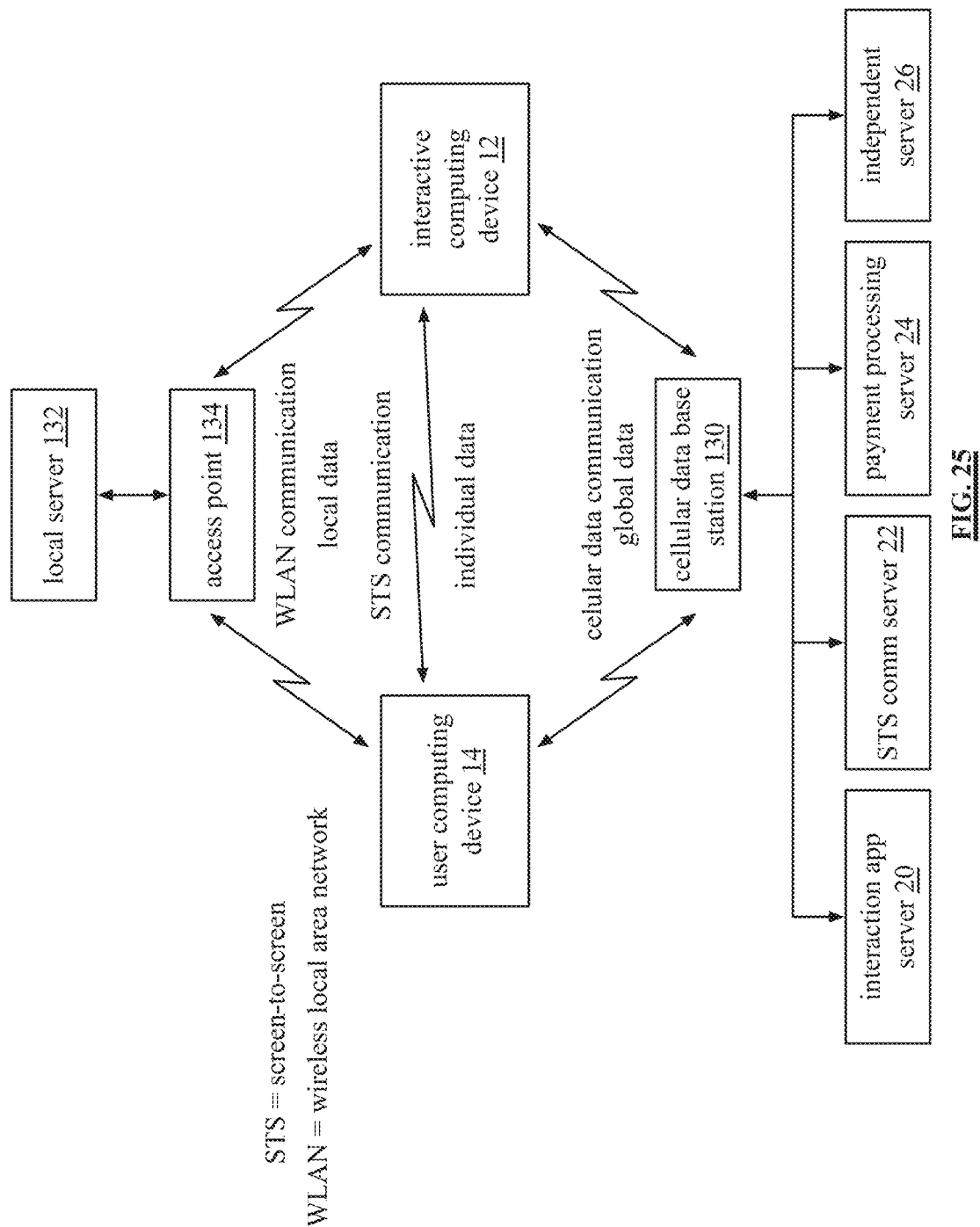
FIG. 25 is a schematic block diagram of an embodiment of a communication in accordance with the present invention.

FIG. 25 is a schematic block diagram of an embodiment of an example of a communication that includes a user computing device (UCD) 14, an interactive computing device (ICD) 12, an interaction application server 20, a screen-to-screen (STS) communication server 22, a payment processing server 24, an independent server 26, a local server 132, an access point 134, and a cellular data base station 130. The local server 132 and the access point 134 may be connected via a wired and/or wireless connection. The user computing device (UCD) 14 may be a cell phone and/or a personal device (e.g., a device that stores personal, private, confidential and/or sensitive information regarding a user).

In this example, the user computing device 14, the interactive computing device 12, the cellular data base station 130 and the access point 134 communicate with each other via one or more particular communication types in accordance with a communication protocol. The communication type is based on one or more of the type of device (e.g., ICD, UCD, server, etc.), the communication requirements (e.g., a minimum signal to noise ratio (SNR), a minimum bit rate, etc.) and the type of data (e.g., local data, individual data, global data, etc.) being communicated. For example, the user computing device 14 and the access point 134 communicate local data via a wireless local area network (WLAN) communication. As another example, the user computing device 14 and the cellular data base station 130 communicate global data via a cellular data communication. As yet another example, the user computing device 14 and the interactive computing device 12 communicate individual data via an STS communication. In an example, individual data is data that is personal, private, sensitive and/or otherwise confidential at the time of the conveyance of the individual data.

By using multiple communication types, data is communicated between the devices more efficiently and securely. For example, the user computing device 14 uses a 5G communication (e.g., fastest connection available) to download global data from the interaction application server 20 and uses an STS communication (e.g., most secure connection available) to send payment data to the interactive computing device 12. Note the two or more of the communications may occur concurrently.

Figure 26:
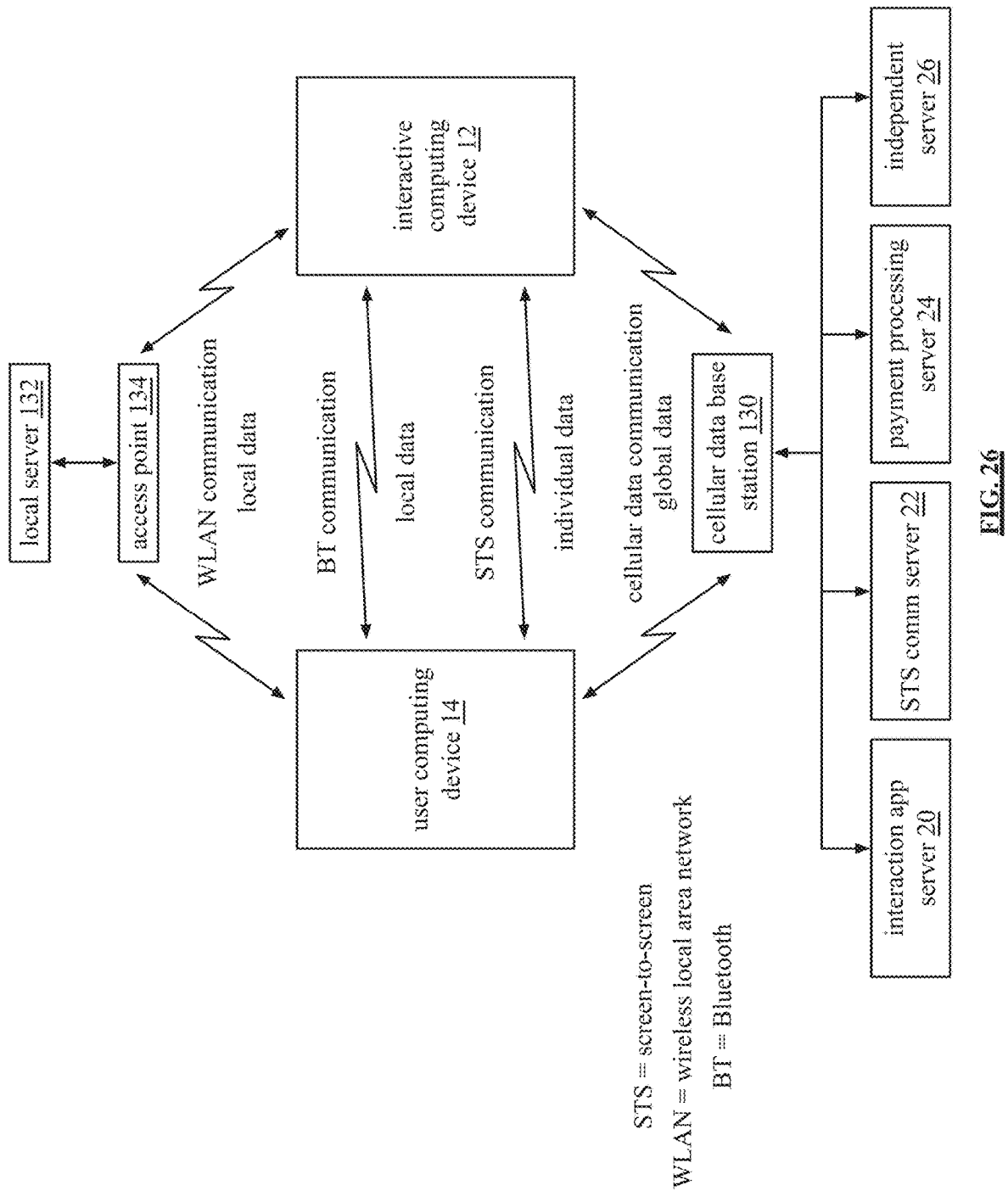
FIG. 26 is a schematic block diagram of another embodiment of an example of a communication in accordance with the present invention.

FIG. 26 is a schematic block diagram of an example of a communication that is similar to FIG. 25, except that user computing device (UCD) 14 and interactive computing device (ICD) 12 also communicate the local data with each other via a Bluetooth (BT) communication. Thus, the UCD 14 and the ICD 12 may communicate data via one or more of a wireless local area network (WLAN) communication, a Bluetooth communication, a screen to screen (STS) communication and a cellular data communication. Note in an example, the various communication paths are utilized concurrently.

Figure 27:
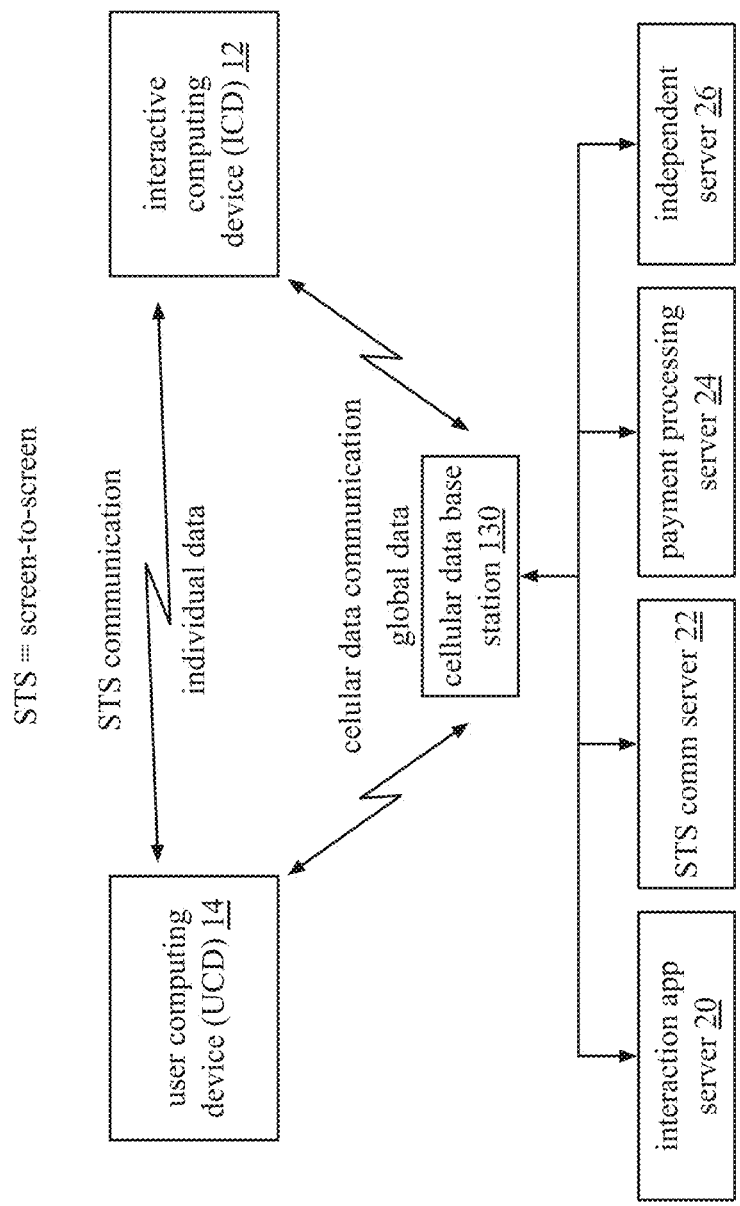
FIG. 27 is a schematic block diagram of another embodiment of an example of a communication in accordance with the present invention.

FIG. 27 is a schematic block diagram of an example of a communication between two or more of a user computing device (UCD) 14, an interactive computing device (ICD) 12, an interaction application server 20, a screen-to-screen (STS) communication server 22, a payment processing server 24, an independent server 26, and a cellular data base station 130. In an example, the cellular data base station 130 is a network portal (e.g., point-of-sale equipment, access point, internet protocol (IP) address, etc.).

In an example of operation, the servers 20-26, the cellular data base station 130, the user computing device (UCD) 14 and the interactive computing device (ICD) 12 work in concert to exchange necessary information to setup and execute a transaction via a screen to screen (STS) communication. For example, the UCD 14 downloads a user interaction application from interaction application server 20 via cellular data base station 130 and the ICD 12 downloads a corresponding operator interaction application from interaction application server 20 via the cellular data base station 130. The UCD and the ICD utilize their respective interaction applications to assist in executing the transaction.

During the transaction, the UCD 14 and the ICD 12 utilize the STS communication path to wirelessly communicate individual data with each other. The individual data includes one or more of personal data (e.g., personal identification information, payment data, etc.), data that is confidential at time of communication (e.g., a security code), data that is particular to a transaction (e.g., payment information, selection of items information, etc.) and data that is meant only to be shared with one of or between the UCD 14 the ICD 12. As a specific example, a user selects items from a coffee shop user interaction application via a touch screen of UCD 14. The UCD 14 sends the selected items and payment information to the ICD 12 via the STS communication.

The STS communication includes a medium for transmission and a data communication protocol. In an example, the medium is through a human body. In another example, the medium is through a close proximity (e.g., <2 ft) of the UCD 14 and ICD 12. In a further example, the medium is through a surface of an object (e.g., store counter top, body, etc.). The data communication protocol indicates how the data is to be communicated. For example the data communication protocol indicates what modulation scheme (e.g., amplitude shift keying, phase shift keying, frequency shift keying, amplitude modulation, 4 quadrature amplitude modulation, etc.) and carrier signal (e.g., a sinusoidal signal having a frequency in the range of 10's of KHz to 10's of GHz) to use for the STS communication.

Continuing with the example of operation of setting up and assisting the transaction, the UCD 14 and ICD 12 each wirelessly communicate global data with the cellular data base station 130. In an example, the global data includes one or more of general data (e.g., account information, user preference information), setup data (e.g., update data, downloading applications), etc.), any data that is not the individual data, and any data communicated between the cellular data base station 130 and the UCD 14 and/or the ICD 12. As a specific example, the ICD 12 communicates with payment processing server 24 to process the payment information.

Figure 28:
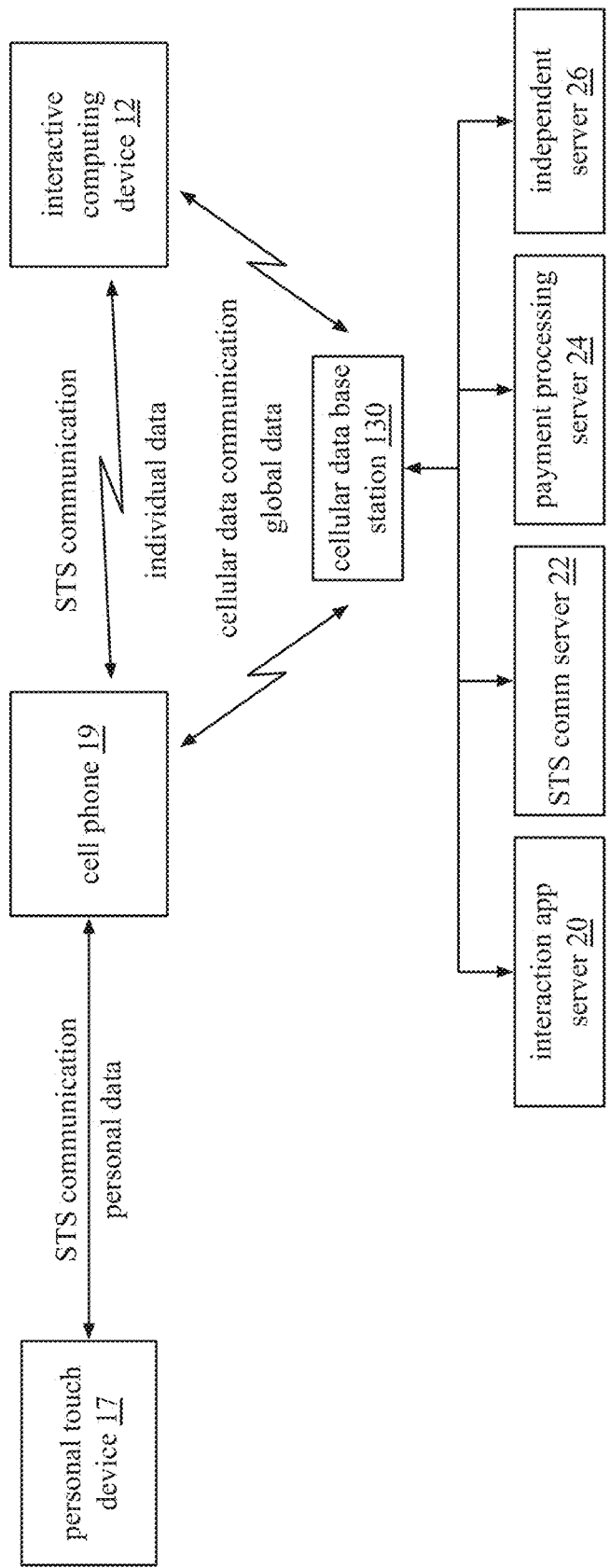
FIG. 28 is a schematic block diagram of another embodiment of an example of a communication in accordance with the present invention.

FIG. 28 is a schematic block diagram of an example of a communication that is similar to FIG. 27, except in this example, a personal touch device 17 and a cell phone 19 is utilized instead of or as the user computing device 14. The personal touch device 17 is one or more of a FOB, a tablet, another cell phone, a car touch screen, a watch, a ring, and any wearable device.

In an example of operation, the personal touch device 17 and the cell phone 19 communicate personal data via a screen-to-screen (STS) communication. In an example, the personal data is the individual data. As another example, the personal data is a subset of the individual data. As yet another example, the personal data is data that is more sensitive, private, and/or confidential than the individual data. As a specific example, the personal data is the social security number (SSN) of a user and the individual data is the last four digits of the user's SSN. As another specific example, the personal data is a password and the individual data is a hash of the password. In another specific example, the personal data is biometric information (facial recognition, fingerprint, voice frequency pattern, etc.) and the individual data is a four digit code (e.g., 7422). Note in this example, as illustrated by the linear connection between the personal touch device 17 and the cell phone 19, the STS communication is a wired and/or wireless connection.

Figure 29:
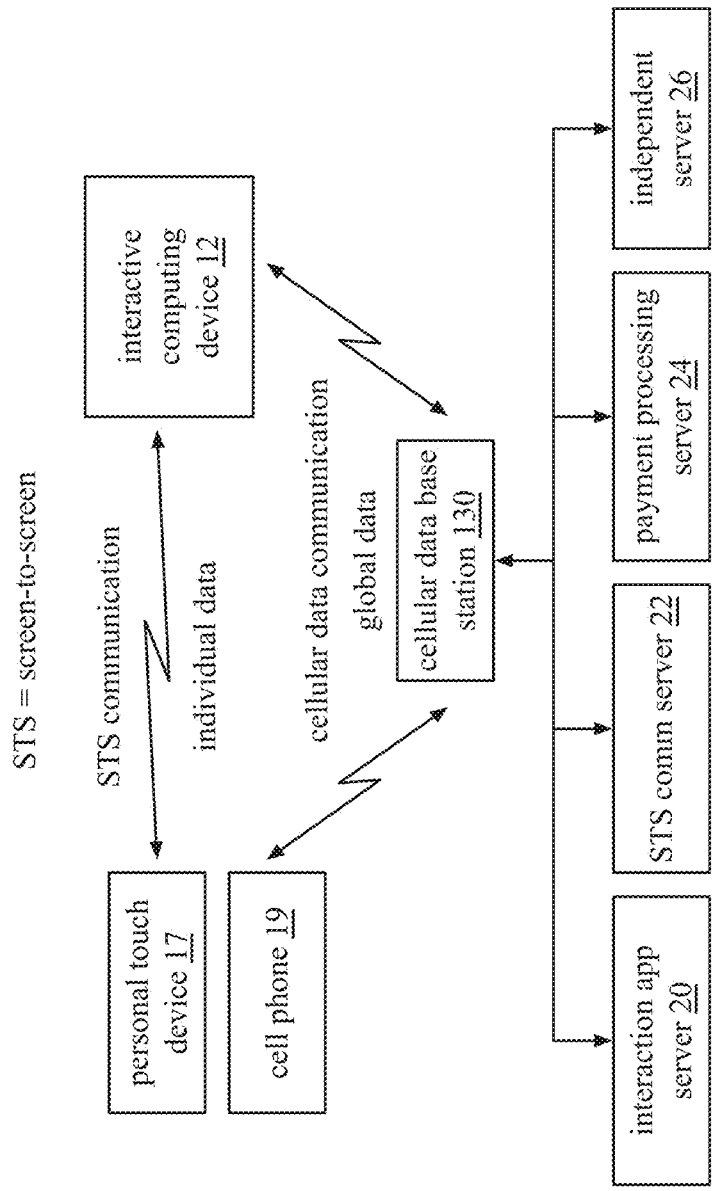
FIG. 29 is a schematic block diagram of another embodiment of an example of a communication in accordance with the present invention.

FIG. 29 is a schematic block diagram of an example of a communication that is similar to FIG. 27, except the personal touch device 17 communicates directly with the interactive computing device (ICD) 12 via a screen-to-screen (STS) communication. Note that although not explicitly shown, the personal touch device 17 may communicate with the cell phone 19 via an STS wired and/or wireless connection. Further note the connection provided by cellular data base station 130 may be implemented by a network portal (e.g., point of sale equipment, access point, internet protocol address, etc.).

In an example of operation, a communication is completed via a combination of an STS communication of individual data (e.g., personal data for the particular transaction) between the personal touch device 17 and the ICD 12 and a cellular data communication of global data (e.g., downloading applications, verifying user (e.g., of cell phone) and operator information (e.g., of ICD 12), etc.) between the cell phone 19 and the cellular data base station 130, and between the ICD 12 and the cellular data base station 130.

Figure 30:
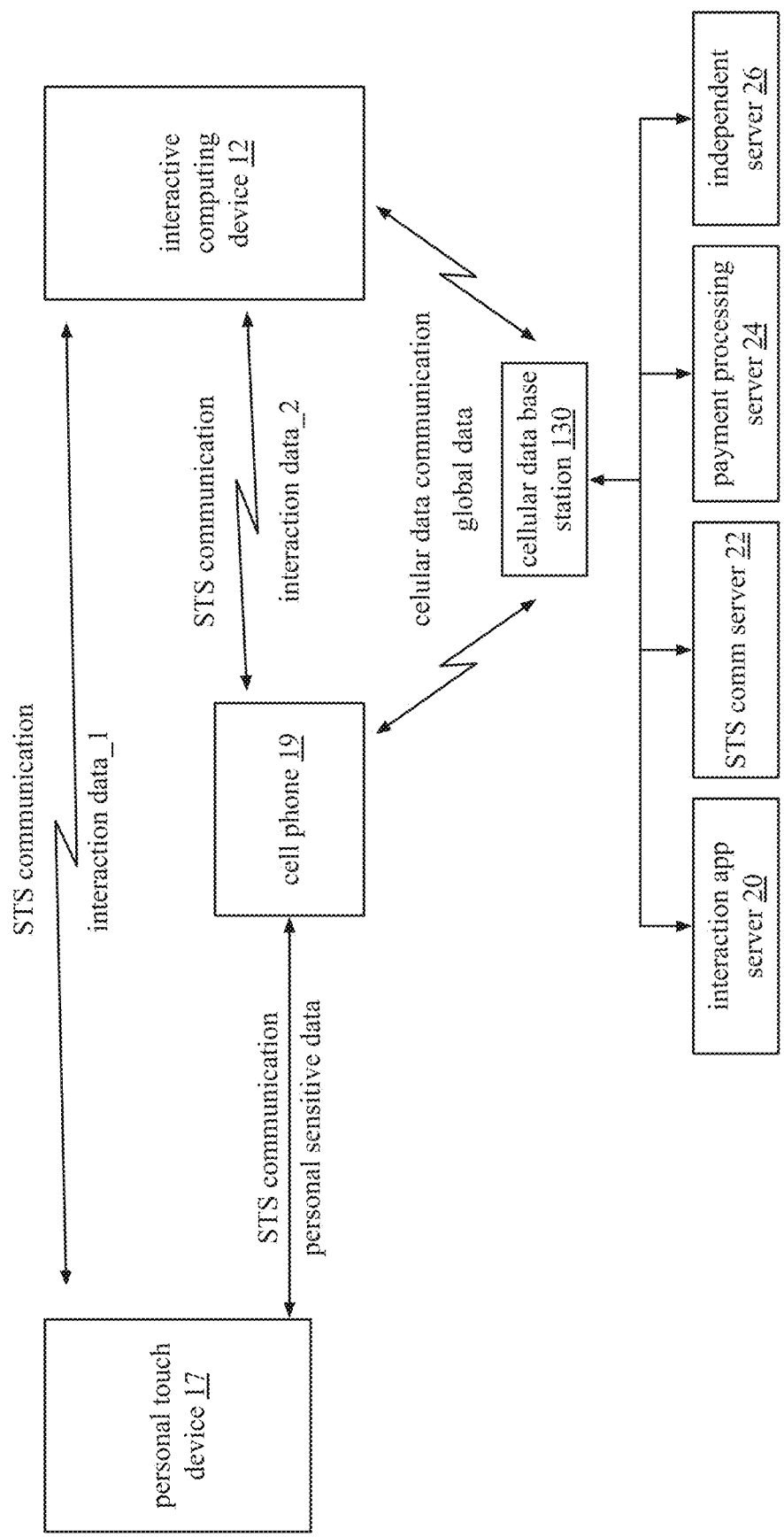
FIG. 30 is a schematic block diagram of another embodiment of an example of a communication in accordance with the present invention.

FIG. 30 is a schematic block diagram an example of a communication that includes an interactive computing device (ICD) 12, an interaction application server 20, a screen-to-screen (STS) communication server 22, a payment processing server 24, an independent server 26, a personal touch device 17, a cell phone 19, and a cellular data base station 130.

In an example of operation, the personal touch device 17 interacts with cell phone 19 using a screen-to-screen (STS) communication (e.g., data communicated via an STS wired and/or wireless connection in accordance with an STS communication protocol). For example, the personal touch device 17 communicates personal sensitive data (e.g., credit card information, personal identity information, etc.) via the STS communication to cell phone 19. The personal touch device 17 also communicates a portion of interaction data (i.e., interaction data_1 of a transaction) via another STS communication with the interactive computing device 12. The cell phone 19 communicates interaction data (i.e., interaction data_2 of the transaction) via another STS communication with the interactive computing device 12.

As a specific example, the personal touch device is a hotel room key card equipped with a radio frequency identification (RFID) tag and the interactive computing device is a lock on a hotel room door. The lock requires interaction data (e.g., interaction data_1 (e.g., first portion of a code) from the hotel room key card and interaction data (e.g., interaction data_2 (e.g., second portion of the code)) from the cell phone 19 to perform an action (e.g., lock, unlock, display do not disturb text, etc.). Note the code may indicate the action to be performed. For example, a code of 7052 indicates an unlock function. As another example, a code of V3BH8 indicates to display a "do not disturb" image on a display of the lock. In a specific instance, the lock receives the interaction data_2 from the cell phone 19 within a timeframe of receiving the interaction data_1 from the hotel room key card to process the request.

As another specific example, the cell phone 19 is programmed (e.g., via an STS communication application) to function a hotel room key (e.g., key for "room 2455") of a hotel. The hotel has numerous rooms that each have a lock on one or more doors that include an interactive computing device. For example, the lock is connected to an interactive computing device (ICD) that includes a touch screen. To unlock/lock the door, a user of the cell phone 19 may form an STS connection (e.g., via the user's body as a network (BaaN)) with a touch screen of a particular interactive computing device. For example, the touch screen of the ICD receives a signal through the body of the user from the cell phone 19. This increases security as the personal touch device and cell phone both must interact with the ICD lock via an STS communication. For example, the user may lose its hotel key, but without cell phone 19, an unauthorized person (e.g., not the user) could not use the hotel key to operable the ICD lock of the hotel room door.

The cell phone 19 subsequently transmits an STS communication that instructs (e.g., as a particular bit pattern and a certain frequency) the hotel room ICD lock to open. The lock may then automatically adjust (e.g., immediately upon closing, within a timeframe (e.g., 2 seconds) after closing, etc.) back to a lock position. Thus, a user is able to operate the hotel room ICD lock more efficiently utilizing the STS communication. For example, the user does not have to carry around an additional "key". As another example, the user can operate the ICD lock without removing the cell phone from their pocket (e.g., when using a body as a network (BaaN) STS connection).

Figure 31:
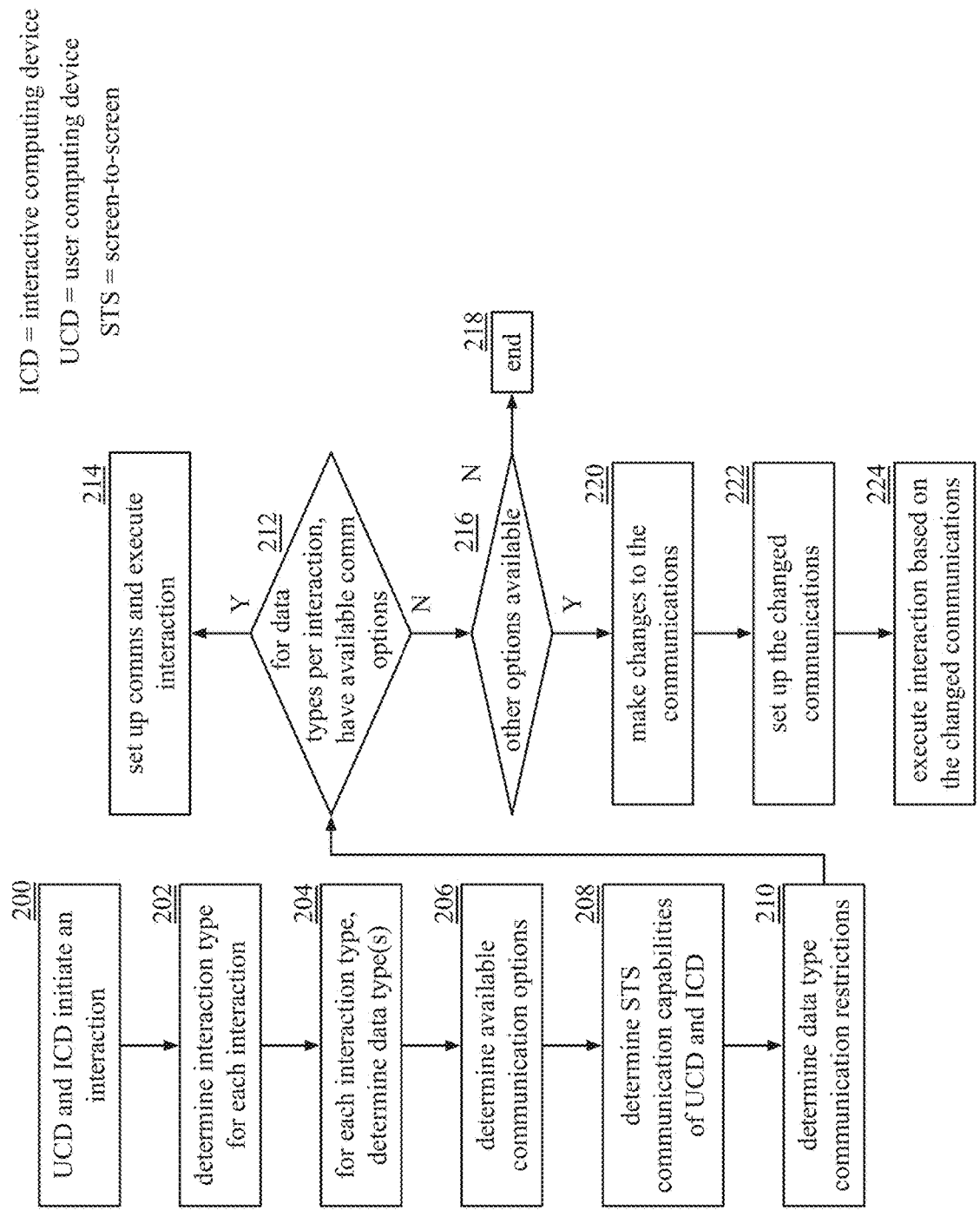
FIG. 31 is a logic flow diagram of an example of a method of determining a type of communication to use for an interaction in accordance with the present invention.

FIG. 31 is a logic flow diagram of an example of a method, executed by an interactive computing device (ICD) and/or a user computing device (UCD) (hereinafter the ICD, the UCD and/or another computing device is referred to as a computing device), of determining a type of communication to use for an interaction between the user computing device and the interactive computing device. The determination is based on one or more of a data type, a sensitivity (e.g., privacy level) of the data, a user application, an operator of interactive computing device, a bandwidth of the screen-to-screen connection and/or other parameters.

The method begins with step 200, where the computing device initiates an interaction (e.g., a communication of data between the UCD and the ICD). In an embodiment, the interaction includes a plurality of interactions (e.g., the interaction and other interactions). For example, a purchase a cup of coffee interaction includes an information exchange interaction (e.g., selection of items) and a purchase transaction interaction (e.g., payment processing).

The method continues with step 202, where the computing device determines an interaction type for each interaction. The interaction type includes, but is not limited to, one or more of a one-way data exchange, a two-way data exchange, a purchase transaction, a registration transaction, a physical access transaction, an equipment (e.g., device, car, scooter, etc.) enable transaction, and a pre-paid transaction.

The method continues to step 204, where for each interaction type, the computing device determines one or more data type(s). The one or more data types include private information, publicly available information, payment information, transaction information, screen-to-screen (STS) communication account information, and user application account information. The method continues to step 206, where the computing device determines available communication options. For example, the available communication options include a screen-to-screen (STS) communication, a cellular data communication, a Bluetooth communication, and wireless local area network (WLAN) communication.

The method continues to step 208, where the computing device determines STS communication capabilities of the UCD and the ICD. For example, the computing device determines whether the UCD and the ICD have one or more of an STS communication unit 30 and an STS communication application. As another example, the computing device determines whether the UCD and the ICD are able to form a body as a network (BaaN) connection. The method continues to step 210, where the computing device determines data type communication restrictions. As a specific example, private information is restricted (e.g., in accordance with a communication protocol) to a BaaN STS connection only, publicly available information is not restricted, payment information is restricted to an STS connection only, transaction information is not restricted, however a first preference is for it to be communicated via cellular data and a second (less preferential than the first preference) preference is for it to be communication via a wireless local area network (WLAN), STS communication account information is restricted to an STS connection and/or cellular data only, and user application account information is restricted from using WLAN.

The method continues to step 212, where for the data types to be utilized per interaction, the computing device determines whether communication options are available (e.g., unrestricted options exist). When communication options are available, the method continues to step 214, where the computing device sets up the communications and the interaction is executed. When communication options are not available, the method continues to step 216, where the computing device determines whether other options are available. In an example, the other options are less desirable options but still allowable in accordance with the restrictions (e.g., transaction information communicated via a WLAN connection). When no other options are available, the method ends at step 218. In an example, step 218 includes sending a message to the ICD and/or the UCD that indicates the interaction status (e.g., failed). When the other options are available, the method continues to step 220 where the computing device makes changes to the communications. For example, the computing device changes the communication options for transaction information from cellular to WLAN (e.g., less preferential), when WLAN is not against the restrictions for transaction information.

The method continues to step 222, where the computing device sets up the changed communications. For example, the computing device instructs the ICD and UCD to communicate transaction information via the WLAN connection. The method continues to step 224, where the computing device executes the interaction based on the changed communications. For example, the ICD and the UCD perform the interaction by sending the transaction information via WLAN.

Figure 32:
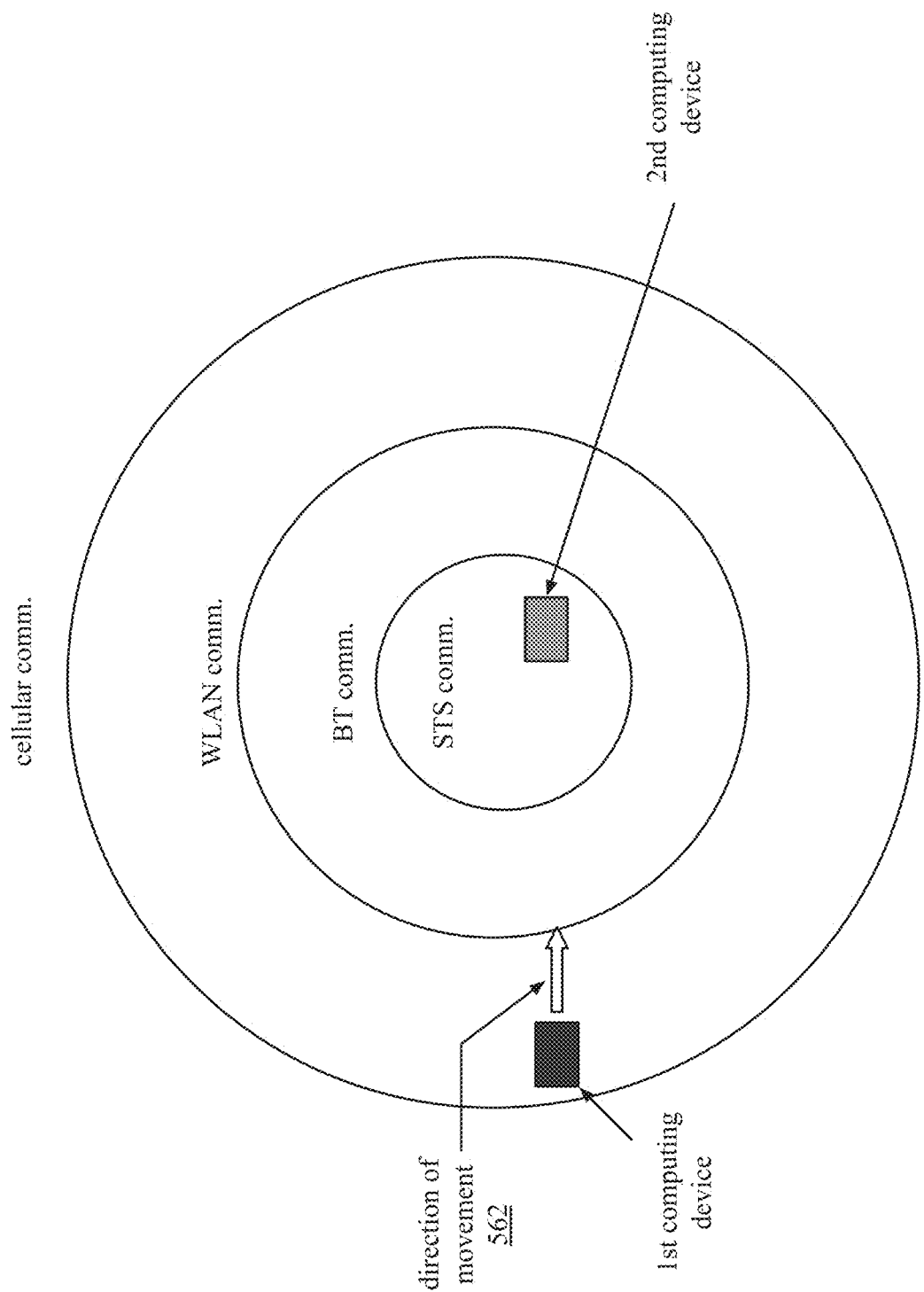
FIG. 32 is a schematic block diagram of an embodiment of an embodiment of initiating and setting up screen to screen (STS) communications in accordance with the present invention.

FIG. 32 is a schematic block diagram of an embodiment of initiating and setting up screen to screen (STS) communications that includes a first computing device (e.g., a user computing device 14) and second computing device (e.g., an interactive computing device 12). As illustrated, various communication types generally operate within a certain type of range (e.g., distance, signal strength, power level, size of body for body as a network (BaaN) STS communications, etc.). For example, communications performed via a cellular network can be performed up to a fourth range, communications performed via a wireless local area network (WLAN) can be performed up to a third range, communications performed via Bluetooth can be performed up to a second range, and communications performed via a screen to screen (STS) connection can be performed up to a first range, where the ranges descend (e.g., are less than, decrease, etc.) in order from the fourth to the first for at least one of the certain types of range.

In an example of operation, the first computing device has a direction of movement 562. The direction of movement includes one or more of a location, a direction, an altitude, a speed, a velocity, and an acceleration. For example, the direction of movement indicates the first computing device is increasing elevation at 2.8 miles per hour in a northwest direction. In an instance, a computing device (e.g., the first computing device, the second computing device, another computing device, etc.) determines when/whether to setup or ready STS communication abilities of the first computing device and/or the second computing device based on the direction of movement. For instance, when the direction of movement of the first computing device is toward the second computing device such that it is estimated that the first computing device will be inside an STS communication range within a first time period, a STS communication readiness check is initiated.

As an example, when the first computing device has a first trajectory and a first spatiotemporal quality (e.g., a first distance from an ICD, a first estimated time from being within a range of the ICD, etc,) the first computing device is prompted to perform a first action (e.g., download an STS communication application, pre-order a typical order associated with an application regarding the second computing device, etc.). As another example, when the first computing device has the first trajectory and the first spatiotemporal quality, the second computing device is instructed to perform a first action (e.g., begin preparing an order for the customer, ensure customer database is updated with information of a user associated with the first computing device, update application on a computing device, etc.).

The direction of movement 562 may further determine which type of communications to use. For example, the first and second computing devices determine to communicate via WLAN for a first time period and/or until the first computing device is within range of another communication type (e.g., Bluetooth, STS, etc.).

Figure 33:
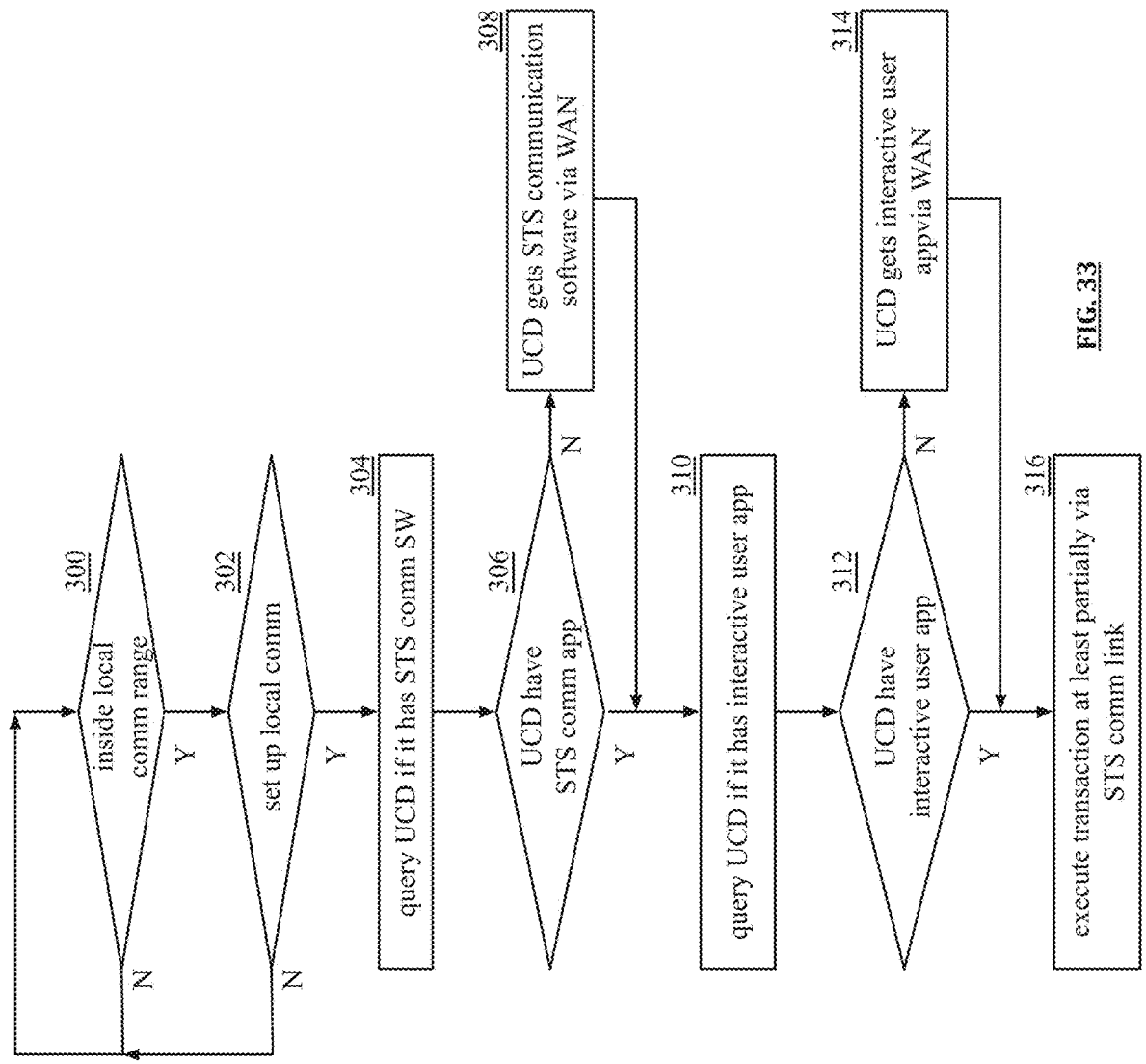
FIG. 33 is a logic flow diagram of another example of a method of setting up a screen to screen (STS) communications in accordance with the present invention.

FIG. 33 is a logic flow diagram of another example of a method of setting up a screen to screen (STS) communications between an interactive computing device (ICD) and a user computing device (UCD). Note that hereinafter in the discussion of this figure the ICD, the UCD and/or another computing device (e.g., an interactive server, an STS communication server, etc.) are referred to as a computing device. The method begins at step 300, where the computing device determines whether the UCD is inside a local communication range. The local communication range includes one or more of a wireless local area network (WLAN) range, a cellular data network range, a Bluetooth connection range, and an STS connection range.

In an example, the UCD periodically or continually searches for a wireless local area network (WLAN) associated with the ICD to determine whether the UCD is within the WLAN range. As another example, the computing device determines a distance (e.g., using global positioning system (GPS) data and/or direction of movement data) between the ICD and the UCD to determine whether the UCD is within a STS communication range (or a likelihood of the UCD coming within range during a time period). As a specific example, the computing device utilizes the distance of the UCD and the ICD to determine whether the UCD is in line inside a coffee shop or in a drive thru lane of the coffee shop. When the UCD is not inside the local communication range, the method continues back to step 300.

When the UCD is inside the local communication range, the method continues to step 302, where the computing device determines whether to set up the local communication(s). When not setting up the local communication, the method continues back to step 300. When setting up the local communication, the method continues with step 304, where the computing device sends a query to the UCD to determine whether the UCD has screen to screen (STS) communication software (e.g., application) installed and/or accessible. In an example, the query also asks whether the UCD has STS communication hardware (e.g., a drive sense module, a touch screen with an electrode, etc.).

The method continues with step 306, where the computing device determines (e.g., based on a query response) whether the UCD has the STS communication application. When the UCD does not have the STS communication application, the method continues to step 308, where the UCD obtains the STS communication application via one or more communication networks (e.g., a wide area network (WAN), a local area network (LAN), cellular data network (e.g., 5G), etc.). For example, the UCD downloads the STS communication application from an STS communication server via a 5G cellular data network connection. Alternatively at step 308, or in addition to, when the UCD doesn't download (e.g., can't download, determines not to download, etc.) the STS communication application, the process ends and/or the computing device sends a message to the UCD for the user to go inside and interact with an ICD for further instructions.

The method continues with step 310, where the computing device sends a query to the UCD to determine whether the UCD has an interactive user application installed or accessible. The method continues to step 312, where the computing device determines (e.g., based on a query response) whether the UCD has the interactive user application. When the UCD does not have the interactive user application, the method continues to step 314, where the UCD obtains (e.g., downloads, gain access to, etc.) the interactive user application via one or more of the communication networks (e.g., a wireless area network (WAN)). Alternatively, or in addition to, when the UCD doesn't download (e.g., can't download, determines not to download, etc.) the interactive user application, the process ends and/or the computing device sends a message to the UCD for the user to go inside and interact with an ICD for further instructions. The method then continues to step 316. When the UCD has the interactive user application, the method continues to step 316, where the UCD and ICD execute a transaction at least partially via an STS communication link.

FIG. 34 is a logic flow diagram of another example of a method of setting up a screen to screen (STS) communication between an interactive computing device (ICD) and a user computing device (UCD). As used in the description of this figure, the ICD, the UCD and/or another computing device are referred to as a computing device. The method begins or continues with step 340, where the computing device determines whether a UCD is inside a local communication range (e.g., 5G, wireless local area network, wide area network, Bluetooth, etc.). When not inside the local communication range, the method continues back to step 340. When inside the local communication range, the method continues to step 342, where the computing device determines whether it can set up a local communication.

When the local communication cannot be setup, the method continues back to step 340. When the local communication can be setup, the method continues to step 344, where the computing device determines whether the UCD has an STS communication application installed and/or accessible. For example, the computing device queries the UCD to respond with an indication of whether it has the STS communication application. When the UCD does not have the STS communication application, the method continues to step 345, where the UCD gets the STS communication application. Alternatively, when the UCD does not get the STS communication application, the process ends. When the UCD has the STS communication application, the method continues to step 346, where the computing device determines whether to pre-order (e.g., via an interaction application) one or more items via a local communication network (e.g., 5G, WLAN of a coffee shop).

When the computing device determines not to pre-order one or more items via the local communication, the method continues to step 347, where the computing device determines to wait until a user of a UCD is at an interactive computing device (e.g., of the coffee shop) to order via a screen to screen (STS) communication. When the computing device determines to pre-order one or more items via the local communication, the method continues to step 348, where the computing device places a pre-order of the one or more items via a local communication link. For example, the user computing device sends a message to an ICD (or other computing device (e.g., coffee shop server)) of a coffee shop that includes data regarding a coffee order (regular order, particular order based on a day of a week and/or time of the day, etc.). The method continues with step 349, where the computing device finalizes the order (e.g., provides payment data, provides signature, selects reward points as payment, etc.) via a screen to screen (STS) communication between the UCD and the ICD.

FIG. 35 is a schematic block diagram of an example of transmitting close proximity signals 127 between a user computing device (UCD) 14 and an interactive computing device (ICD) 12 to form a screen to screen (STS) connection 18. In this example, the user computing device 14 may or may not include a display associated with the touch screen sensor array 34 and the interactive computing device does include a display associated with its touch screen sensor array 34.

In an example of operation, a user (e.g., of UCD 14) touches a button (e.g., start) on a touch screen of the ICD 12 to initiate setting up screen to screen (STS) communications (e.g., how the ICD and UCD will interact in a transaction that includes at least some data transmitted between the ICD and UCD over an STS connection). Alternatively, the user may touch a portion of the UCD 14 touch screen to initiate setting up the STS communications. The ICD 12 transmits a signal (e.g., a default ping signal) to the UCD 14 to initiate an STS connection via close proximity 127 and/or body as a network (BaaN). The UCD receives the ping signal and sends a ping back signal to the ICD. The ping signal and ping back signal are discussed in further detail with reference to one or more subsequent figures.

FIG. 36 is a schematic block diagram of an example of transmitting ping signals via a body as a network (BaaN) screen to screen (STS) connection. As illustrated, the interactive computing device (ICD) 12 and the user computing device (UCD) 14 each include drive sense modules (DSMs) connected to rows of electrodes 105 and columns of electrodes 105. When a user touches the touch screen, the drive sense modules sense the touch based on a change in an electrical characteristic (e.g., an impedance, a current, a reactance, a voltage, a frequency response, etc.) of the affected electrodes 105 at one or more particular frequencies (e.g., fs, fm_1 to fm_n of FIG. 32). The drive sense modules also sense a ping signal at another one or more particular frequencies (e.g., f1, f2, f3 of FIG. 32) of the affected electrodes 105.

Based on the detected touch, the touch screen processing modules determine to drive a signal onto the affected electrodes as a method of transmitting data via the STS connection. For example, the ICD 12 senses a ping signal at a first frequency (f1) on an electrode. The ICD drives a ping back signal onto the electrode at f1 and/or another frequency.

FIG. 37 is a schematic block diagram of an example of an interactive computing device (ICD) 12 generating a default ping signal and transmitting the default ping signal via electrodes that are affected by a user touch. In this example, the ICD 12 creates the default ping signal that is to be transmitted to a user computing device (UCD) via the affected electrodes 105. The signal may be generated in accordance with a modulation scheme. For example, the ICD utilizes an amplitude modulation (AM) scheme to produce the default ping signal. As another example, the ICD utilizes an amplitude shift keying modulation scheme to produce the default ping signal. When the ICD utilizes AM or ASK, a receiving device is able to determine the default ping signal without syncing the UCD's clock with a clock of the ICD.

FIG. 38 is a schematic block diagram of an example of a default ping signal. The default ping signal is generated at one or more particular frequencies (e.g., 300 cycles per second, 300 MHz, 1 GHz, etc) and is repeated in accordance with a screen to screen (STS) communication protocol. The default ping signal indicates to another computing device to setup an STS communication.

In this example, the default ping signal is 16 cycles using a two-level encoding. For example, the ICD transmits at no frequency or a first frequency in accordance with an on-off keying (OOK) modulation scheme, which represents the binary equivalent of 1 bit per cycle. When the ICD does not transmit the first frequency (e.g., no TX) during a cycle, this represents a binary 0. And, when the ICD transmits the first frequency during a cycle, this represents a binary 1. However, other embodiments may use more or less than 16 cycles, more than 1 frequency, and/or more bits per cycle (e.g., four level encoding scheme to represent two bits per cycle as illustrated in FIG. 39).

For example, a default signal has a pattern of 8 cycles at a first frequency. As another example, a default ping signal has a pattern of 8 cycles at the first frequency and eight cycles at a second frequency. As a further example, a default ping signal has a pattern of 4 cycles at the first frequency and 4 cycles at no frequency, 4 cycles at the second frequency, 2 cycles at the no frequency and 2 cycles at the second frequency. As yet another example, a default ping signal has a pattern that repeats three total cycles of 8 cycles at the first frequency and 8 cycles at the second frequency. Note that the frequencies used in the default ping signal may be dedicated for the ping signal. Alternatively, or in addition to, the frequencies used in the default ping signal may be different from frequencies utilized to determine self and/or mutual capacitance of the electrodes.

FIG. 39 is a schematic block diagram of an example of transmitting a default ping signal. In this example, the default ping signal is transmitted in a pattern of 16 cycles using no frequency and a first, second and third frequency, each of which have a binary equivalent of two bits (e.g., 00, 01, 10, 11). The pattern may be repeated a certain number of times according to a screen to screen (STS) communication protocol to ensure a receiving computing device can receive and identify the default ping signal.

FIG. 40 is a schematic block diagram of an example of transmitting a default ping signal shown in FIG. 39 via an electrode 105 that is connected to a front end of a drive sense circuit 103. The front end of the drive sense circuit 103 includes a current source 111 and a comparator 112 connected to the electrode 105. The comparator is inputted an analog reference signal 101 which it uses to compare to signaling on the line connected to the electrode 105 and dependent current source 111.

An example of the analog reference signal 101 is shown having a direct current (DC) component 324 that has a magnitude and an oscillating component 326 oscillating at a frequency "i". The output of the comparator changes in part based on changes to analog reference signal 101. For example, a processing module of an interactive computing device modulates data onto a carrier signal at none, a first, a second, and a third frequency to produce the analog reference signal 101 (e.g., f"i"). The comparator generates an analog compensation signal based on the changes to the analog reference signal. The current source 111 modifies (e.g., increases, decreases) an output current based on the analog compensation signal, that is driven onto electrode 105. An electrical characteristic of the electrode is affected by the output current and is representative of the modulated data (e.g., transmitting no signal, transmitting a signal at a first frequency (e.g., f1), transmitting a signal at a second frequency (e.g., f2) and transmitting a signal at a third frequency (e.g., f3)).

FIG. 41 is a logic flow diagram of an example of a method for establishing a screen to screen (STS) connection. FIG. 42 is a schematic block diagram illustrating the affected electrodes 105 of an interactive computing device (ICD) 12 as discussed in the example of FIG. 41. The method of FIG. 41 begins with step 360, where an interactive computing device (ICD) detects a touch by a user on a touch screen of the ICD. The method continues with step 362, where the ICD determines the electrodes affected by the user touch. For example, a processing module of the ICD determines a change in the self and/or mutual capacitance of electrodes that are affected by the user touch and interprets the change of capacitance as representing a touch. The touch may include two or more touch points (e.g., different affected electrodes).

The method continues with step 364, where the ICD creates a default screen to screen (STS) ping signal. For example, the ICD generates a signal with a particular frequency pattern that represents a ping signal in accordance with a STS communication protocol. The method continues with step 366, where the ICD transmits the default STS ping signal via the affected electrodes (e.g., the bolded electrodes of FIG. 42). The method continues to step 368, where the ICD determines whether the user is still touching the touch screen (e.g., at least a portion of the affected electrodes, any electrodes of the touch screen, etc). When the user is not touching the touch screen, the method continues to step 369, where the ICD generates a message instructing the user to touch the touch screen again and hold until next steps. Alternatively, the method ends at step 369.

When the user is still touching the touch screen, the method continues to step 370, where the ICD determines whether it has received a ping back signal (e.g., from a user computing device of the user). When the ICD has not received the ping back signal (e.g., within a time frame), the method continues back to step 366. Alternatively, when the ICD has not received the ping back signal, the method may end, or continue to step 368. When the ICD has received the ping back signal, the method continues to step 372, where the ICD establishes a type (e.g., close proximity, via human body, etc.) of STS connection. For example, the ICD establishes the STS connection is via a human body (e.g., body as a network (BaaN)). Note the type of connection (e.g., close proximity) for the STS may be different than a type of connection (e.g., BaaN) utilized to setup the STS communications.

FIG. 43 is a schematic block diagram of an example of receiving a default ping signal by a user computing device (UCD) 14. In this example, the default ping signal includes 16 cycles of either no transmission (which represents a binary 0) or transmission at a first frequency (which represents a binary 1). The UCD 14 receives the default ping signal via a body of a user that is touching (or close enough to transmit the default ping signal) a touch screen of the UCD 14 and a touch screen of an interactive computing device (ICD) 12.

FIG. 44 is a schematic block diagram of an example of receiving a ping signal 231 on an electrode 105 connected to a front end of a drive sense circuit 103 (e.g., of a user computing device 14). The front end includes a current source 111 and a comparator 112.

In an example of receiving the ping signal 231, the comparator 112 compares an analog reference signal 101 (e.g., a current signal or a voltage signal) to an electrode signal 321 to produce an analog comparison signal 325, which represents a change in an electrical characteristic of the electrode 105. The received ping signal 231 includes a direct current (DC) component 320 and an oscillating component 322. The DC component 320 is a DC voltage in the range of a few hundred milli-volts to tens of volts or more. The oscillating component 322 includes a sinusoidal signal, a square wave signal, a triangular wave signal, a multiple level signal (e.g., has varying magnitude over time with respect to the DC component), and/or a polygonal signal (e.g., has a symmetrical or asymmetrical polygonal shape with respect to the DC component).

The oscillating component 322 oscillates at a frequency "$f_i$". In an example, $f_i$ includes one or more of a first frequency (f1), a second frequency (f2) and a third frequency (f3) (e.g., as illustrated in the magnitude frequency graph of the ping signal). In this example, the first, second, and third frequencies are the frequencies utilized to setup screen to screen (STS) communications between devices. As another example, fi is a carrier frequency. As another example, fi is the combination of the carrier signal that is modulated with data signals at one or more frequencies (e.g., f1, f2, f3).

The analog reference signal 101 includes a DC component 324 and an oscillating component(s) for self and/or mutual capacitance 326. As an example, the oscillating component(s) include a frequency (fs) for driving/sensing a self-capacitance of an electrode and one or more frequencies (fm_1 to fm_n) for driving/sensing mutual capacitances between the electrode and other electrodes. The frequencies of self and/or mutual capacitances of a touch screen are utilized to determine which electrodes are touched (e.g., affected electrodes), and/or how a touch screen is touched (e.g., motion, etc.) and further what is touching it (e.g., pen, human finger, etc.). For example, the drive sense modules that detect capacitance changes and the type of capacitance change (e.g., self, mutual) are utilized to determine which electrodes of the touch screen are affected by the touch.

Continuing with the example, the current source modifies a current based on the analog comparison signal to keep a voltage on the electrode substantially constant. A processing module determines the presence of f1, f2, and/or f3 based on the analog comparison signal 325. The processing module further determines whether the analog comparison signal 325 indicates the user computing device is receiving a ping signal (e.g., default bit pattern) from another computing device (e.g., an interactive computing device 12).

FIG. 45 is a schematic block diagram of an example of generating a ping back signal via an electrode 105 that is connected to a comparator 112 and a current source 111. As illustrated, the comparator is inputted an analog reference signal 101 and signaling on a line connected to an output of the current source 111 and the electrode 105. The analog reference signal 101 includes a direct current (DC) component 324 and an oscillating component 327 that oscillates at a frequency "k".

The comparator 112 outputs an analog compensation signal based on a comparison of the analog reference signal and signaling on electrode 105. The current source 111 adjusts a current based on the analog compensation signal to keep the inputs of the comparator substantially the same (e.g., same voltage, same current). The electrode transmits the ping back signal based on the current adjustment (e.g., current driven on electrode 105) at one or more frequencies and/or the current adjustment based on the received ping signals.

In this example, when the electrode is effectively transmitting (at a second frequency) while receiving a signal (e.g., at a first frequency), the ping back signal (shown in green) oscillates based on a first frequency component (e.g., f "i") and a second frequency component (e.g., f "k"). For example, the signal component f "i" is combined (e.g., added, multiplied) with the signal component f "k" to produce the ping back signal.

FIG. 46 is a schematic block diagram of an example of producing a ping back signal that includes a current source 111, a comparator 112, an electrode 105, a bandpass filter 454, and a modulator 452. Also illustrated are a time domain graph that plots magnitude versus time for a ping back signal using amplitude shift keying (ASK), and a frequency domain graph that plots magnitude versus frequency of the ping back signal.

In an example of operation, the comparator 112 outputs an analog comparison signal based on its inputs. For example, the electrode receives a default ping signal that changes an electrical characteristic of the electrode. The comparator outputs the analog comparison signal such that it represents a signal component of the default ping signal. The bandpass filter 454, filters out unwanted frequencies to produce a recovered signal component at a desired frequency (e.g., f "i"). The modulator 452 modulates the recovered f "i" signal component based on ping back data 450 to produce a ping back reference input. The modulation includes one or more of amplitude shift keying (ASK), amplitude modulation (AM), phase shift keying (PSK), and 4-quadrature amplitude modulation (4QAM).

The comparator produces a second analog comparison signal based on the ping back reference input, which causes current source 111 to adjust a current signal to keep the inputs to the comparator substantially constant. The current signal is driven onto electrode 105 to produce a ping back signal that represents ping back data 450.

FIG. 47 is a logic flow diagram of an example of a method of setting up a screen to screen (STS) connection. In this example, the STS connection is between an interactive computing device (ICD) and a user computing device (UCD). However, in other examples, the screen to screen connection is set up between one or more UCDs and/or one or more ICDs.

The method begins at step 400, where the interactive computing device (ICD) provides an on-screen "start" button. The "start" button may be a physical button to press, a representation of a button on the display of a touch screen of the ICD, and/or an instruction (e.g., text, voice, etc.) to place a user computing device in a particular area, such that the user computing device is orientated with respect to the ICD to enable an STS connection. In an example, the button (or additional button) further includes an indication of the STS connection type to use. For example, a first button indicates to use a close proximity connection and a second button indicates to use a human body connection. In another example, the ICD includes another mechanism (e.g., physical button, prompt to complete a Completely Automated Public Turing test to tell Computers and Humans Apart, (CAPTCHA), another digital button, a motion, a voice command, etc.). that ensures it is the intent of the user to start the STS connection process.

The method continues with step 402, where the ICD determines whether a user touch has been detected. When the user touch has not been detected, the method continues back to step 400. When the user touch has been detected, the method continues to one or more of steps 403 and 404. At step 403, the ICD displays an instruction to touch a portion of the ICD touch screen (e.g., a touch here button) while the user is touching (e.g., body is in contact with) the user computing device (UCD). At step 404, the ICD displays an instruction to place the UCD in an area of or adjacent to the ICD display, such that a close proximity or vibration STS connection is able to be formed.

After steps 403 and/or 404, the method continues to step 406, where the ICD sends an STS ping signal to the UCD. The STS ping signal is a default signal for any type of STS connection or is a first particular signal for a first STS connection type and a second particular signal for a second STS connection type. The method continues to step 408, where the ICD determines whether it has received a ping back signal. During step 408, the user computing device is actively looking for the STS ping signal from the ICD. An example of the UCD looking for the STS ping signal is discussed in further detail with reference to FIG. 48.

When the ICD has not received the ping back signal within a time period, the method continues to step 410, where the ICD determines whether the wait (e.g., elapsed time) looking for the ping signal has expired (e.g., timed out). When the ICD determines the wait for the receive ping signal has timed out, the method continues to step 412, where the ICD ends the process. Alternatively, or in addition to, the ICD may display a message to download an STS communication application on the UCD, a message to start over with the user, and/or a reminder message of an action to take (e.g., place hand on screen, place phone on screen, touch physical button on side of ICD, etc.). When the ICD determines the wait for the receive ping signal has not timed out, the method continues back to step 406, where the ICD sends another STS ping signal to the user computing device.

When the ICD has received the ping back signal within the time period, the method continues to step 414, where the ICD and the UCD establish a type of STS connection. For example, the ICD and UCD establish to perform STS communication via close proximity STS connection. As another example, the ICD and UCD establish to perform STS communication via the user's body as a network (BaaN) STS connection.

Having established the type of STS connection, the method continues with step 416, where the ICD and UCD establish an STS communication protocol for the STS communication. For example, the STS communication protocol establishes STS communications are to be in accordance with a particular type of one of pattern encoding, binary encoding, and symbol encoding.

FIG. 48 is a logic flow diagram of another example of a method for use in setting up a screen to screen (STS) connection between an interactive computing device (ICD) and a user computing device (UCD). The method begins with step 420, where a UCD periodically senses for an STS ping signal. For example, the UCD has an STS communication application installed or otherwise able to access and the STS communication application periodically wakes up to listen or is always listening for the STS ping signal.

The method continues with step 422, where the UCD determines whether it has detected an STS ping signal. When the STS ping signal is not detected, the method continues back to step 420. When the STS ping signal is detected, the method continues to step 424, where the UCD transmits a ping back signal. In an example, the ping back signal is a ring back signal.

The method continues with step 426, where the ICD and the UCD establish a type of STS connection. For example, the ICD and UCD establish to perform STS communications via a close proximity STS connection. As another example, the ICD and UCD establish to perform STS communications via the user's body as a network (BaaN) STS connection.

Having established the type of STS connection, the method continues with step 428, where the ICD and UCD establish an STS communication protocol for the STS communication. For example, the STS communication protocol establishes STS communications are to be in accordance with one of pattern encoding, binary encoding, and symbol encoding.

FIG. 49 is a logic flow diagram of another example of a method of setting up a screen to screen (STS) connection between an interactive computing device (ICD) and a user computing device (UCD). The method begins with step 430, where the user computing device detects a touch of the screen by the user. For example, a touch screen processing module of the UCD interprets a capacitance (e.g., self-capacitance, mutual capacitance) change of one or more electrodes of the touch screen of the UCD to determine the touch.

The method continues with step 432, where the UCD determines electrodes affected by the touch. For example, the UCD determines which drive sense modules that are coupled to the electrodes (e.g., coupled to an electrode, a row of electrodes, a column of electrodes, etc.) detected a capacitance change at a certain frequency to determine the affected electrodes. The method continues with step 434, where the UCD receives a default ping signal via the affected electrodes.

The method continues with step 436, where the UCD determines whether it recognizes a pattern (e.g., transmission cycle pattern, frequency pattern, an amplitude pattern, etc.) of the default ping signal as the default ping signal. When the UCD does not recognize the pattern, the method continues to step 438, where the UCD determines whether the user is still touching the UCD touch screen. When the user is still touching, the method continues to step 434. When the user is not still touching, the method continues to step 439, where the UCD ends the process. Alternatively, the UCD prompts the user to touch the screen again and hold until the STS communication is setup or until the UCD prompts the user that it is ok to stop touching the UCD touch screen.

When the UCD does recognize the pattern, the method continues to step 440, where the UCD generates a ping back signal. In an example, the UCD backscatters the default ping signal or pings back the signal pattern (e.g., inverse of the ping signal, same pattern as ping signal, etc.). The method continues with step 442, where the UCD transmits a ping back signal. The method continues with step 444, where the UCD determines whether it has received an acknowledgement from the ICD.

When the UCD has not received the acknowledgement, the method continues to step 445, where the UCD determines whether a time period for receiving the acknowledgement has ended (e.g., the process times out). When the process has not timed out, the method continues to step 442. When the process has timed out, the method continues to step 446, where the UCD ends the process. In addition, the UCD may ask the user to start the STS connection process over and/or ask the user to repeat touching the touchscreen so that the UCD can retry sending the ping back signal (e.g., step 442) to the ICD.

When the UCD has received the acknowledgement (ACK), the method continues to step 448 where the UCD and/or ICD establishes the type of STS connection. For example, the ICD and UCD establish to perform STS communication via close proximity STS connection. As another example, the ICD and UCD establish to perform STS communication via the user's body as a network (BaaN) STS connection.

FIG. 50 is a schematic block diagram of an embodiment of an example of a radio frequency (RF) transceiver 460 and a signal source 102, and an illustration of the output of the signal source 102 (e.g., analog reference signal 101). The RF transceiver 460 includes a digital baseband or low IF processing module 461, an analog to digital converter (ADC) 450, a receive (RX) low pass (LP) filter circuit 462, down conversion mixer 463, a low noise amplifier 464, a receive (RX) bandpass (BP) filter circuit 465, a transmit (TX)/receive (RX) splitter 466 coupled to an antenna, a transmit (TX) bandpass (BP) filter circuit 467, a power amplifier 468, an up conversion mixer 469, a transmit low pass (LP) filter circuit 470, a digital to analog converter (DAC) 452 and a local oscillation generator (LOGEN) 473. The signal source 102 includes a direct current (DC) reference voltage circuit 471, a phase locked loop (PLL) 472, and a combining circuit 474.

In an example of operation, the antenna of the TX/RX splitter 466 (e.g., a balun, a duplexer, circulator, etc) receives an inbound radio frequency (RF) signal, which is routed to the RX BP filter module 465. The RX BP filter module 465 is a filter that passes the inbound RF signal to the LNA 464, which amplifies the inbound RF signal to produce an amplified inbound RF signal.

The down conversion mixer 463 converts the amplified inbound RF signal into an inbound symbol stream corresponding to a first signal component and into a second inbound symbol stream corresponding to the second signal component. In an embodiment, the down conversion mixer 463 mixes in-phase (I) and quadrature (Q) components of the amplified inbound RF signal with in-phase and quadrature components of local oscillation generator 473 to produce a mixed I signal and a mixed Q signal for each component of the amplified inbound RF signal. Each pair of the mixed I and Q signals are combined to produce the first and second inbound symbol streams. In this embodiment, each of the first and second inbound symbol streams includes phase information (e.g., +/−Δθ [phase shift] and/or θ(t) [phase modulation]) and/or frequency information (e.g., +/−Δf [frequency shift] and/or f(t) [frequency modulation]). In another embodiment, the inbound RF signal includes amplitude information (e.g., +/−ΔA [amplitude shift] and/or A(t) [amplitude modulation]). The RX LP filter circuit 462 filters the down-converted inbound signal, which is then converted into a digital inbound baseband signal by the ADC 450.

The digital baseband or low IF processing module 461 converts the inbound symbol stream(s) into data in 453 (e.g., voice, text, audio, video, graphics, etc.) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling. Note that the processing module 461 converts a single inbound symbol stream into the inbound data for Single Input Single Output (SISO) communications and/or for Multiple Input Single Output (MISO) communications and converts the multiple inbound symbol streams into the inbound data for Single Input Multiple Output (SIMO) and Multiple Input Multiple Output (MIMO) communications.

In this example, the processing module 461 receives data out 455. As an example, the processing module interprets the data out 455 as a touch of a touch screen to generate a command (e.g., pause, stop, etc.) regarding a streaming video. The processing module processes the command by converting it into one or more outbound symbol streams (e.g., outbound baseband signal) in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion. Note that the processing module converts the outbound data into a single outbound symbol stream for Single Input Single Output (SISO) communications and/or for Multiple Input Single Output (MISO) communications and converts the outbound data into multiple outbound symbol streams for Single Input Multiple Output (SIMO) and Multiple Input Multiple Output (MIMO) communications.

The DAC 452 converts the outbound baseband signal into an analog signal, which is filtered by the TX LP filter circuit 470. The up-conversion mixer 469 mixes the filtered analog outbound baseband signal with a transmit local oscillation (TX LO) to produce an up-converted signal. This may be done in a variety of ways. In an embodiment, in-phase and quadrature components of the outbound baseband signal are mixed with in-phase and quadrature components of the transmit local oscillation to produce the up-converted signal. In another embodiment, the outbound baseband signal provides phase information (e.g., +/−Δθ [phase shift] and/or θ(t) [phase modulation]) that adjusts the phase of the transmit local oscillation to produce a phase adjusted up-converted signal.

In this embodiment, the phase adjusted up-converted signal provides the up-converted signal. In another embodiment, the outbound baseband signal further includes amplitude information (e.g., A(t) [amplitude modulation]), which is used to adjust the amplitude of the phase adjusted up converted signal to produce the up-converted signal. In yet another embodiment, the outbound baseband signal provides frequency information (e.g., +/−Δf [frequency shift] and/or f(t) [frequency modulation]) that adjusts the frequency of the transmit local oscillation to produce a frequency adjusted up-converted signal. In this embodiment, the frequency adjusted up-converted signal provides the up-converted signal. In another embodiment, the outbound baseband signal further includes amplitude information, which is used to adjust the amplitude of the frequency adjusted up-converted signal to produce the up-converted signal. In a further embodiment, the outbound baseband signal provides amplitude information (e.g., +/−ΔA [amplitude shift] and/or A(t) [amplitude modulation]) that adjusts the amplitude of the transmit local oscillation to produce the up-converted signal.

The power amplifier (PA) 468 amplifies the up-converted signal to produce an outbound RF signal. The TX BP filter circuit 467 filters the outbound RF signal and provides the filtered outbound RF signal to the TX/RX splitter 466 for transmission via the antenna that is connected to the TX/RX splitter 466.

The LOGEN 473 also provides a reference oscillation signal to a phase locked loop (PLL) 472 of the signal source 102. The phase locked loop 472 locks onto a phase and/or frequency of the reference oscillation signal to produce an oscillating component 322. Note the frequency of the oscillating component may be different (e.g., greater than, less than) than a frequency of the reference oscillation signal. Further note in an example, the PLL is omitted and the LOGEN 473 provides the oscillating component 322 to the combining circuit 474.

The direct current (DC) reference voltage circuit 471 produces a direct current (DC) component 320. The combining circuit 474 combines (e.g., adds, multiples, etc.) the oscillating component 322 and the DC component 320 to produce analog reference signal 101.

FIG. 51 is a schematic block diagram of an example of an interactive computing device (ICD) interacting with a user computing device (UCD) to select items. As illustrated, a menu of 9 items are displayed on the ICD. Note the menu may include for each corresponding item one or more of a graphical representation, nutritional information, price information, ingredient information, and estimated completion time information. Further note a running total of a user's selections could also be displayed. For example, a sidebar of the menu displays items a user has already selected along with a total purchase price (e.g., in a currency (e.g., dollars, pounds, bitcoin, etc.) and/or rewards elements (e.g., points, stars, rewards level, etc.).

In an example of operation, the ICD provides (e.g., displays, sends to a user computing device (UCD)) a menu of options able to be selected by a user. The ICD receives one or more selections of options via a touch (e.g., BaaN) from the user on the touch screen of the ICD, a voice selection from the user, a Bluetooth communication from the UCD, and/or in combination with an STS communication.

FIG. 52 is a schematic block diagram of an example of an interactive computing device (ICD) interacting with a user computing device (UCD) to mirror a menu of items. In an example of operation, the user of a UCD opens a coffee company application on the UCD. The coffee application is mirrored, at least partially, on an ICD associated with the coffee company (e.g., point of sale (POS) at brick and mortar location). The mirroring may be performed via a wireless local area network (WLAN), Bluetooth and/or a cellular data network (e.g., 5G network).

In an example, the UCD and ICD have already set up an STS connection (e.g., via user touching the ICD, via user placing the UCD in close proximity to the ICD, etc.). In another example, the UCD and ICD will setup an STS connection during or subsequent to the selection of menu items. As illustrated, the user selects item 2 on a touch screen of the UCD and the ICD displays a mirrored menu showing item 2 being selected.

FIG. 53 is a schematic block diagram of an example of an interactive computing device (ICD) interacting with a user computing device (UCD) to select items of a menu. The UCD displays a menu of items for selections by a user. The menu may be part of an application downloaded on the UCD. The application may be acquired via the ICD and/or from an interaction application server 20.

In this example, the user computing device (UCD) receives selections of the menu from a user via its touch screen. For example, the user touches an area of the touch screen that corresponds to a selection of item 2. In an embodiment, the user touches the area ("button") of the touch screen that displays an item a certain number of times (e.g., releasing finger and then placing finger in same area again) corresponding to a desired quantity of the item. As a specific example, when the user desires two lattes and one breakfast sandwich, the user touches the button for a latte twice and the breakfast sandwich once. In another embodiment, after the user makes a selection (e.g., touches item 2), a quantity selection option (e.g., in same area of as item 2 on the touch screen, in different area of touch screen, etc.) is then displayed prompting the user to input a quantity or confirm a default (e.g., 1) quantity.

Having received the selection of an item, the UCD sends the selections to the ICD, which displays the selections on a display of the ICD. For example, the user selects a quantity of two of item 7, a quantity of one of item 4, and a quantity of three of item 2. As illustrated, the ICD may display the selections along with price information.

FIG. 54 is a schematic block diagram of an example of an interactive computing device (ICD) interacting with a user computing device (UCD) to edit a menu selection. In this example, the coffee shop application displays an edit button. A user of the UCD selects the edit button when they wish to modify an item or quantity of the item previously selected. When receiving the edit selection, the UCD sends an edit signal to the ICD that indicates the user wishes to edit the item and/or quantity. The user may the edit the menu selections by one or more of the touch screen of the UCD, the touch screen of the ICD, and a voice command.

FIG. 55 is a schematic block diagram of an example of an interactive computing device (ICD) interacting with a user computing device (UCD) to edit a menu selection. In this example, the menu displayed on the ICD is mirrored to the display of the UCD after the ICD receives the edit signal. Alternatively, or in addition to, the ICD screen may be sent to the UCD for editing. The user selects the item(s) to be edited. For example, the user selects a quantity value button of item 2 to edit.

FIG. 56 is a schematic block diagram of an example of an interactive computing device (ICD) interacting with a user computing device (UCD) to edit a menu selection. After selecting the quantity of item 2, the user is prompted to enter a new value for the quantity. For example, the user is presented with an empty quantity field and digit buttons 0-9 to manually enter a new quantity. As another example, the UCD displays the current quantity with up and down arrows for the user to touch to modify the current quantity by a default value (e.g., by 1). In this specific example, the user edits the quantity of item 2 from a quantity of three to a quantity of two. The ICD receives the selection and display an updated tabulated menu (e.g., the line total for item 2 and the total for all items).

FIG. 57 is a schematic block diagram of an example of an interactive computing device (ICD) interacting with a user computing device (UCD) to edit a menu selection. As illustrated, the user selects an end edit button to finalize editing and returns to a previous screen or to a finalize order screen. Once the editing is complete, the ICD may discontinue the mirroring and the UCD may return the display to the last shown in the application.

FIG. 58 is a schematic block diagram of an example of an interactive computing device (ICD) interacting with a user computing device (UCD) to edit a menu selection. To finishing the editing, the user selects a done button, which causes the UCD to send a done signal to the ICD. In an example, the done button causes the selected items to be ordered. In an instance, the UCD and ICD then communicate via an STS connection (e.g., BaaN, close proximity, etc.) to process payment for the ordered items.

FIG. 59 is a schematic block diagram of an embodiment of setting up screen to screen (STS) communications between a user computing device (UCD) 14 and an interactive computing device (ICD) 12. The UCD 14 and the ICD 12 both include a screen to screen (STS) communication application 90.

The example begins by the UCD 14 sending (1) a user identification (ID) package 570 to the ICD via an STS connection. The user ID package 570 includes a user ID information for the UCD 571, STS account ID information 572, and UCD ID information 573. In an example, one or more portions of the information 571-573 is confidential information 141.

The user ID information for UCD 571 includes one or more of a user name field, a password (PW) field, an address field, a phone number field, a date of birth (DOB) field, and a personal field. The personal data field includes data that further identifies a user of the UCD (e.g., personal codes, personal biometric data, etc.). The STS account ID information 572 includes one or more of a user name field, a PW field, an account (acct) ID field, and a time stamps field. The time stamps field may include times regarding creation of an STS account, a last 10 STS uses, etc.). The UCD ID information 573 includes one or more of an international mobile equipment identity (IMEI) field and an internet protocol (IP) address field.

Continuing with the example, after receiving the user ID package 570, the ICD 12 creates a verification package 578, which includes an aggregate of the user ID package 570 and an ICD operator ID package 574 or selected portions thereof. The ICD operator ID package 574 includes operator ID information for the ICD 575, STS account ID information 576, and ICD ID information 577. The information 575 includes one or more of an operator name field, an operator password field, an address field, a phone number field, and an operator unique ID field. The STS account ID information 576 includes an operator name field, a password field, and an account ID field. The ICD ID information 577 field includes an IMID field and an IP address field. In an example, the verification package 578 includes a user name and password of information 571, and an operator name and password of information 575. Note one or more portions of the information 575-577 is classified as confidential information 141.

FIG. 60 is a schematic block diagram of the example of the setting up screen to screen (STS) communications of FIG. 59 that continues with the interactive computing device (ICD) sending (3) the verification package 578 to a screen to screen (STS) communication server 22. The STS communication server 22 receives and reviews (4) the verification package 578. The reviewing may include one or more verifications. As an example of a first verification, the STS communication server 22 reviews the verification package 578 by looking up and verifying the user STS account information that is stored in a user database 580 substantially matches the user STS account information included in verification package 578. As an example of a second verification, the STS communication server 22 further reviews the verification package 578 by looking up and verifying the ICD operator STS account information that is stored in ICD database 582 substantially matches the ICD operator STS account information included in verification package 578.

Having reviewed the verification package 578, the STS communication server 22 sends (5) an acknowledgement (ACK) or error message to one or both of the user computing device (UCD) 14 and the ICD 12. For example, the STS communication server 22 sends an ACK to UCD 14 when the review of the user STS account information is favorable (e.g., user STS account info in verification package 578 substantially the same as user STS account information stored in user database 580). As another example, the STS communication server 22 sends an error message to ICD 12 when the review of the ICD operator STS account information is unfavorable (e.g., ICD operator STS account information in verification package 578 is not substantially the same as ICD operator STS account information stored in user database 580).

The example continues with the UCD 14 confirming (6) the ACK. For example, when the UCD is sent an ACK from the STS communication server 22, the UCD sends (6) its ACK to ICD 12. Alternatively, the UCD may send a ping verification message to the ICD that indicates a favorable acknowledgement was received by the UCD in step (5).

FIG. 61 is a schematic block diagram of the example of the setting up the screen to screen (STS) communications of FIGS. 59-60 that continues with the STS communication server creating a one-time use interaction security code. Continuing with the example, the STS communication server creates (7) the one-time user security interaction code. The interaction security code may be one or more of an alphanumerical code (e.g., A3zv89jb3, etc.), a numerical code (e.g., 8374), a public/private key pair, data transmission information (e.g., type of encoding, transmission frequency, etc.) and a graphical code (e.g., QR code, bar code, etc.).

Having created the security interaction code, the STS communication server 22 sends (8a) a first portion of the security interaction code to the user computing device (UCD) 14 and sends (8b) a second portion of the security interaction code to the interactive computing device (ICD) 12. As an example, the security interaction code is a numerical code of "8374". Thus, a first portion could be "83" and the second portion could be "74". Alternatively, the first portion could be "84" with a message indicating "8" is a first digit of the numerical code and "4" is a fourth digit of the numerical code, and the second portion could be "37" with a message indicating "3" is a second digit of the numerical code and "7" is a third digit of the numerical code.

As another example, the security interaction code is an indication of which frequencies to use (e.g., 100 Hz, 20 MHz, 3 GHz, etc.) for an STS communication. Thus, a first portion could indicate a first frequency is 100 Hz and a second portion indicates a second frequency is 120 Hz. In yet another example, the security interaction code is an indication of bits per cycle and the type of modulation for the STS communications. As such, a first portion could be "4" and the second portion could be "amplitude shift keying".

Having received the portions of the security interaction code, the UCD 14 and the ICD 14 exchange their respective portions to recreate the security interaction code. For example, UCD 14 sends "83" to the ICD 12, and ICD 12 sends "74" to UCD 14 such that both the UCD 14 and ICD 12 recreate security code "8374". The recreated security code may then be verified with the STS communication server in order for the STS connection to be utilized (e.g., for an STS communication of confidential information). Note that in an example, steps 7-9 are performed after both the UCD 14 and ICD 12 have been verified in step (4).

FIG. 62 is a schematic block diagram of an embodiment of the example of the setting up screen to screen (STS) communications of FIGS. 59-61 that continues with the ICD 12 and UCD 14 selecting (10) a modality for menu interaction. The modality includes one or more of mirroring displays during menu interaction, using one of the UCD or ICD for the menu interaction, and using both the UCD and ICD for different part of the menu interaction (e.g., UCD to order, ICD for processing payment).

In an example, the selection could be encoded using a second security interaction code (e.g., code that specifies a type of encoding, etc.). Note the setting up the STS communication includes determining a connection type (e.g., BaaN, close proximity, etc.) and a communication protocol (e.g., what data to be transmitted via STS, via Bluetooth, via WLAN, what frequencies to use, what modulation scheme to use, how many bits per cycle, etc.).

FIG. 63 is a logic flow diagram of an example of a method of determining a menu interaction modality between an interactive computing device (ICD) and a user computing device (UCD) (the ICD and/or UCD are hereinafter referred to in this figure as a computing device). The method begins at step 610, where the computing device determines whether the interaction with the menu is performed via an ICD touch screen or via a UCD touch screen. When the computing device determines the menu interaction is via the ICD screen, the method continues to step 612, where the ICD displays menu options for a user touch selection.

When the menu interaction is via the UCD touch screen, the method continues to step 614, where the computing device determines whether to mirror menu display data one both of the touch screens or split the menu display data between the UCD and the ICD touch screens.

When the computing device determines to mirror the menu display data, the method continues to step 618, where the computing device selects a wireless communication means (e.g., WLAN, Bluetooth, cellular data, etc.) to be used for the mirroring. When the computing device determines to split the screens, the method continues to step 616, where the computing device selects a wireless communication means (e.g., WLAN, Bluetooth, cellular data, etc.) to be used for the splitting.

FIG. 64 is a logic flow diagram of an example of a method of setting up a screen to screen (STS) communication setting between an interactive computing device (ICD) and a user computing device (UCD) (the ICD and/or UCD are hereinafter referred to in this figure as a computing device). The method begins at step 630, where the computing device determines whether an STS connection is initiated by touch (e.g., body as a network (BaaN)), or by device proximity (e.g., close proximity). When the STS connection is initiated by touch, the method continues to step 634, where the computing device determines BaaN is to be utilized as a connection medium for setting up the STS communication settings. When the STS connection is initiated by proximity, the method continues to step 632, where the computing device determines device to device close proximity is to be utilized as the connection medium for setting up the STS communications.

Having setup the STS communication medium (e.g., steps 632 and 634), the method continues with step 636, where the computing device selects a data signaling format for the STS communications. The data signaling format includes one or more of a frequency-time pattern encoding, frequency shift keying (FSK) on selected electrodes, amplitude shift keying (ASK) on selected electrodes, phase shift keying on selected electrodes, 4 quadrature amplitude modulation on selected electrodes, FSK/ASK combination on selected electrodes, and/or other data signaling formats. In an example, one of the previous list of data signaling formats is utilized as a default data signaling format. For example, the computing device determines a default data signaling format for STS communications is ASK on selected electrodes.

Having selected a data signaling format, the method continues to step 637, where the computing device determines whether the STS communication was successful. For example, the ICD sends a ping signal in accordance with the selected data signaling format and determines the STS communication was successful when receiving a favorable ping back signal from the UCD.

When the STS communication is successful, the method continues to step 638, where the computing device selects a communication path option for menu interaction. The communication path options includes one or more of an STS connection via BaaN, an STS connection via device to device close proximity, an ICD touch screen direct touch, Bluetooth, wireless local area network (WLAN), and cellular data. When the STS communication is not successful, the method continues to step 639, where the computing device retries setting up the STS communication or the process ends.

FIG. 65 is a schematic block diagram of an embodiment of processing a screen to screen (STS) transaction that includes a user computing device (UCD) 14, an interactive computing device (ICD) 12, a network 15 and a payment processing server 24. The UCD 14 includes a payment application 92 and the ICD 12 includes one or more payment processing applications 142.

In an example of operation, the UCD 14 sends (1) payment information to the ICD 12 via an STS connection 18. For instance, payment application 92 obtains information regarding a first payment account of a user of the UCD 14 as the payment information. A payment account includes one or more of a credit card account, a debit card account, a gift card account, a checking account and a loyalty rewards account. The ICD 12 receives the payment information and creates (2), via a payment processing application 142, a payment package. The payment package includes at least some of the payment information and operator account information (e.g., identification info, authorization info, etc.) associated with an operator (e.g., coffee shop entity) of the ICD.

The ICD 12 sends (3) the payment package to a payment processing server 24 via the network(s) 15. The payment processing server 24 processes (4) the payment and sends (5) a payment response (e.g., accepted, declined) to the ICD 12 via network(s) 15. The ICD 12 then finalizes (6) the interaction with the UCD 14 based on the payment response. For example, when a favorable payment response (e.g., accepted) was received, the ICD 12 prompts a user of the UCD to finalize the interaction via a screen to screen (STS) connection 18. For instance, the ICD displays a message asking the user to sign (forming a body as a network (BaaN) STS connection between the UCD and the ICD) in a particular portion of the screen while STS communications are enabled on the UCD 14. As another example, when an unfavorable payment response is received (e.g., declined), the ICD prompts the user for a different payment method and/or ends the transaction.

FIG. 66 is a logic flow diagram of an example of a method of processing a screen to screen (STS) transaction between a user computing device (UCD) and an interactive computing device (ICD). In the description of this Figure, the ICD, UCD and/or another computing device are referred to as a computing device. Note the UCD and the ICD both have access to an STS communication application and an STS user/operator interactive application.

The method begins or continues with step 670, where the computing device determines to set up a screen to screen (STS) connection. The method continues with step 672, where the UCD sends its information and user STS communication information to the ICD via the STS connection. The method continues with step 674, where the ICD validates the UCD and user information of a user associated with the UCD. In an example, the validation is performed in conjunction with a cellular data network (e.g., 5G). The cellular data provider of the cellular data network stores information utilized in setting up an STS communication application used by one or both of the ICD and the UCD.

The method continues with step 676, where the ICD determines whether the UCD and user information is valid. When the UCD and user information in not valid, the method continues to step 677, where the process ends. When the UCD and user information is valid, the method continues to step 678, where the ICD provides a menu of options for selection by a user of the UCD. In an example, the menu of options are displayed on a touch screen of the ICD. As another example, the menu of options are displayed on a touch screen of the UCD. As yet another example, the menu of options are displayed on a display of the of UCD and the ICD (e.g., mirrored, split (some items or menu info shown on one device but not the other). When the menu of options are displayed on the UCD, the UCD may obtain the data needed for the displaying via an STS connection, via Bluetooth, via a wireless local area network, and/or via a cellular data network.

The method continues with step 680, where the ICD receive selections of the menu of options from a user of the UCD. The method continues with step 682, where the ICD determines whether the user is done selecting from the menu of options. The determination includes one or more of a timeout, a command, and a selection of a done button. When the user is not done selecting, the method loops back to step 680. When the user is done selecting, the method continues to step 684, where the ICD summarizes the users' selections and displays an amount due for the selections and/or a line item amount for each of the individual selections.

The method continues with step 686, where the computing device determines whether the UCD accepts the summarized selections. When the UCD does not accept the summarized selections, the method continues to step 688, where the computing device determines whether to edit or end the process. When ending the process, the method continues to step 689, where the process ends. When editing, the method continues to step 690 where the UCD edits the summarized selections. For example, the UCD receives inputs (e.g., touch, voice, eye movement, etc.) from a user of the UCD and interprets the inputs as edits of the previous selections. The method then continues back to step 682. Alternatively, at step 688, the UCD may go back to step 686 and accept the summarized selections (e.g., when determining the user accidently did not accept (e.g., touched wrong button)).

When the UCD accepts the selections, the method continues with step 692, where the computing device determines whether a payment is needed. For example, the ICD determines whether the user of the UCD has pre-paid for the selections or the user is paying cash. In an example, the payment includes store loyalty points, a gift card, and a pre-paid account associated with a store that the ICD has authorization to access. When no payment is needed, the method continues to step 702, where the interaction is completed.

When payment is needed, the method continues to step 694, where the UCD provides the ICD with payment information via an STS connection. The method continues with step 696, where the ICD processes the payment. The method continues with step 698, where the ICD determines whether the payment was successfully processed. When the payment is successfully processed, the method continues to step 702, to complete the interaction.

When the payment is not successfully processed, the method continues to step 699, where the computing device determines whether to use an alternative payment method (e.g., different card, points instead of card, etc.) or end the transaction. When ending, the method continues to step 700, where the process ends. When using an alternative method, the method continues to step 694, where the UCD provides the ICD with the alternative payment information (e.g., identification of a loyalty account).

FIG. 67 is a logic flow diagram of an example of a method of processing a screen to screen (STS) transaction between a user computing device (UCD) and an interactive computing device (ICD). In the description of this Figure, the ICD, the UCD and/or another computing device are referred to as a computing device.

The method begins or continues with step 710, where the UCD receives a message to initiate interaction the ICD. The method continues to step 712, where the UCD identifies one or more servers (e.g., STS communication server, interaction application server, etc.) associated with the ICD. The method continues with step 714, where the UCD sends a UCD verification package to the identified servers. The method continues with step 716, where the computing device determines whether it has received a transaction message. When the computing device has not received the transaction message, the method continues to step 717, where the process ends, is retried, an update is performed (e.g., update user profile, update STS interactive user application, etc.) or other action is performed based on the transaction message.

When the computing device has received the transaction message, the method continues to step 718, where the computing device sets up an STS connection between the UCD and the ICD. For example, the ICD prompts the user to touch a portion of the touch screen of the ICD while the user is touching (holding, in pocket, etc.) the UCD. The method continues with step 720, where the UCD sends a transaction message to the ICD via the STS connection. The method continues with step 722, where the ICD provides a menu of options. For example, the ICD displays the menu of options on a touch screen associated with the ICD. The method continues with step 724, where the ICD receives selections of options. The method continues with step 726, where the computing device determines whether a user is done selecting. When the user is not done selecting, the method loops back to step 724.

When the user is done selecting, the method continues to step 728, where the ICD summarizes the selections of the user and a total amount due for the selections. The method continues with step 730, where the computing device determines whether the summarized selections are accepted by the user of the UCD. When the summarized selections are not accepted, the method continues to step 732, where the computing device determines whether to edit the transaction or end. When ending, the method continues to step 734, where the process ends. When editing, the method continues to step 736, where the UCD edits the summarized selections. After the UCD edits the summarized selections, the method then continues with step 724.

When the selections are accepted, the method continues to step 740, where the computing device determines whether payment is needed. When payment is not needed the method continues to step 750, where the interaction is completed. When the payment is needed, the method continues to step 742, where the UCD provides the ICD payment information via the STS connection. The method continues with step 744, where the ICD processes payment. The method continues with step 746, where the computing device determines whether payment was processed successfully.

When the payment was not processed successfully, the method continues to step 748, where the computing device determines whether to use an alternative payment method (e.g., different card, loyalty account points instead of card, etc.) or to end the transaction. When ending, the method continues to step 749, where the process ends. When using an alternative method, the method continues to step 742, where the UCD provides the ICD with the alternative payment information (e.g., identification of a loyalty account). When the payment was processed successfully, the method continues to step 750, where the interaction is completed.

FIG. 68 is a schematic block diagram of an embodiment of processing a screen to screen (STS) transaction that includes a user computing device (UCD) 14, an interactive computing device (ICD) 12, an interaction application server 20, a user database 580, and an interactive computing device (ICD) database 582. The user computing device 14 includes a user interaction application 148 and an STS communication application 90. The ICD 12 includes an operator interaction application 140 and an STS communication application 90. The user/operator interaction application is one or more of a coffee shop, a restaurant chain, a gas station, ticket sales company, a fast food chain, a department store, a hardware store, an auto repair store, an amusement park, a move theatre, and a musical instrument store.

In an example of operation, the UCD 14 sends (1) a user application identification (ID) package to the ICD 12 via an STS connection. The ICD creates (2) a verification package based on the user application ID package. The user application ID package and the verification package are similar to the user ID package and verification package of FIG. 57, but these are specific to the interaction applications run on the UCD 14 and the ICD 12. For example, user application identification package includes user account information and the verification package includes operator account information and at least some of the user account information. In an example, the user application identification package is encoded and/or encrypted using an interaction security code.

Having created the verification package, the ICD sends the verification package to the interaction application server 20. The interaction application server 20 reviews (4) the verification package to verify whether the UCD and ICD are valid and/or authorized. For example, the interaction application server 20 looks up and verifies (4a) the user account information with the user data base 580. As another example, the interaction application server 20 looks up and verifies (4a) the ICD operator account information with the ICD database 582.

Having reviewed the verification package, the interaction application server 20 sends an acknowledgement or error to the ICD 12 and/or the UCD 14. For example, when the interaction application server 20 determines the user account information of the verification package substantially matches user account information stored in user database 580, the interaction application server sends an acknowledgement to the UCD 14. Alternatively, or in addition to, when the interaction application server 20 determines the user account information of the verification package substantially matches user account information stored in user database 580, the interaction application server sends an acknowledgement to the ICD 12. As another example, when the interaction application server 20 determines the operator account information of the verification package does not substantially match operator account information stored in ICD database 582, the interaction application server sends an error to one or more of the UCD 14 and the ICD 12. When the ACKs are received by both the ICD and the UCD, the ICD displays (6) a menu screen.

FIG. 69 is a schematic block diagram of an example of processing a screen to screen (STS) transaction that continues with the example of FIG. 68. The interaction application server 20 creates (7) a one-time use second security code. The interaction server sends (8a) a first portion of the second security code to the UCD 14 and sends (8b) a second portion of the second security code to the ICD 12. As a specific example, the second security code is four numerical characters "4092". The interaction application server 20 sends a first and third digit of the second security code (e.g., "4" and "9") to the UCD 14 and sends a second and fourth digit of the second security code (e.g., "0" and "2") to the ICD 12.

The UCD 14 and the ICD exchange (e.g., via the STS connection, via Bluetooth, etc.) their respective portions of the second security code so the each device can recreate (9) the second security code. For example, the UCD encrypts the first portion of the security code with a public key of the ICD and sends the encrypted first portion to the ICD. The ICD decrypts the encrypted first portion using its private key to recover the first portion (e.g., "4" and "9"). The ICD then combines the recovered first portion with the second portion to recreate the security code of "4092". The UCD and ICD may then verify the code with the STS communication server to process a transaction.

FIG. 70 is a logic flow diagram of an example of a method of validating a user computing device (UCD) and user information in part utilizing a screen to screen (STS) connection. The logic flow diagram is accompanied by a truth table for the UCD and an interactive computing device (ICD).

The method begins or continues with step 760, where a user computing device (UCD) sends a user identification package (e.g., digital data) to an interactive computing device (ICD) via the STS connection. The user ID package includes one or more of user identifying information (e.g., name, birthday, etc.), account identifying information (e.g., name, routing number, card number, etc.), and UCD identifying information (e.g., MAC address, international mobile equipment identity (IMEI), cell number, etc.).

The method continues with step 762, where the ICD generates a verification package. The verification package includes at least some of the user identification package, ICD identifying information, and ICD owner/operation identifying information. The method continues with step 764, where the ICD sends the verification package to the STS communication server. The ICD may utilize a unique key pair (e.g., of a public/private key pair, etc.) to encrypt the verification package that it obtained earlier by registering with the STS communication server for sending packages.

The method continues with step 766, where the STS communication server reviews the verification package. For example, the STS communication server determines, based on the verification package, whether a user computing device (UCD), a user associated with the UCD, and an STS account identification information of the user and/or UCD is valid (1) or invalid (e.g., 0). When any values shown in the truth table include a zero (0), the STS communication server determines the verification package is invalid. When the values only include ones (1), the STS communication server determines the verification package for the user is valid.

As another example, the STS communication server determines, based on the verification package, whether an interactive computing device (ICD), an operator associated with the ICD, and an STS account identification information of the operator and/or ICD is valid (1) or invalid (e.g., 0). When any values shown in the truth table include a zero (0), the STS communication server determines the verification package is invalid. When the values only include ones (1), the STS communication server determines the verification package for the operator is valid.

The method continues with step 768, where the computing device determines whether the verification package was successfully verified. When the verification package was successfully verified, the method continues to step 770, where the STS communication server sends an acknowledgement (ACK) to the ICD. When the verification package was not successfully verified, the method continues to step 769, where the STS communication server sends an invalid STS setup message to the ICD.

FIG. 71 is a logic flow diagram of an example of a method of setting up a screen to screen (STS) connection between a user computing device (UCD) and an interactive computing device (ICD). In the description of this Figure, the ICD, the UCD and/or another computing device are referred to as a computing device. The method begins or continues with step 780, where the UCD sends an STS communication verification to the STS communication server. The method concurrently continues with steps 782 and 790. At step 790, the ICD sends the STS communication verification (e.g., as a verification package) to an STS communication server. The method continues with step 792, where the ICD determines whether it has received an acknowledgment from the STS communication server. When the ICD has not received the acknowledgment, the method continues back to step 790. Alternatively, the method times out and ends when the ICD has not received the ACK within a time period. At step 782, the UCD determines whether it has received an acknowledgement (ACK) from the STS communication server. When the UCD has not received the ACK, the method continues back to step 780. Alternatively, the method times out and ends when the ICD has not received the ACK within a time period.

When the ICD and the UCD have received the acknowledgment, the method continues to step 784, where the ICD and UCD exchange their respectively acknowledgments. The method concurrently continues with steps 786 and 794, where the UCD and ICD both determine whether both acknowledgements are favorable.

When the UCD determines that both ACKs are not favorable, the method continues to step 780. When the UCD determines that both ACKs are favorable, the method continues to step 788, where the UCD sends an interactive user application verification to an interactive application server. The method continues with step 800, where the UCD determines whether it has received a positive (e.g., favorable, indication verification passed, etc.) acknowledgement (ACK) from the interactive application server. When the UCD has not received a positive acknowledgement (ACK), the method continues back to step 780. When the UCD has received a positive acknowledgement (ACK), the method continues to step 796.

When the ICD determines that both ACKs are not favorable, the method continues to step 790. When the ICD determines that both ACKs are favorable, the method continues to step 796. At step 796, the UCD and ICD setup a STS communication link (e.g., connection) for an interactive user transaction. For example, the UCD and ICD use a body as a network (BaaN) STS connection to communicate payment information to complete a transaction.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", "connected", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A user computing device (UCD) comprising:
   memory that stores operational instructions; and
   one or more processing modules operably coupled to the memory, wherein, when enabled, the one or more processing modules configured to execute the operational instructions to operate a screen to screen (STS) communication application to facilitate STS communications between the UCD and an interactive computing device (ICD) including to:

generate a user identification (ID) package;
generate a drive-sense signal that has an oscillating component and that is based on the user ID package;
transmit the user ID package to the ICD via an STS connection between UCD and the ICD via driving the drive-sense signal on a single line to a touch sense element of the UCD, wherein the STS connection between the UCD and the ICD is based on at least one of a human body or a close proximity between the UCD and the ICD;
detect change of the drive-sense signal on the single line; and
based on a favorable verification of a verification package as performed by a STS communication server that is communication with at least one of the UCD or the ICD, receive an acknowledgement (ACK) from the STS communication server that is based on the favorable verification of the verification package as performed by the STS communication server, wherein the verification package is based on the user ID package being received by the ICD, and wherein the user ID package including a user ID for the UCD, a STS account ID information, and UCD ID information.

2. The UCD of claim 1, wherein, when enabled, the one or more processing modules configured to execute the operational instructions to:
based on the favorable verification of the verification package as performed by the STS communication server, transmit a confirmation of the favorable verification of the verification package as performed by the STS communication server to the ICD via driving the drive-sense signal on a single line to a touch sense element of the UCD.

3. The UCD of claim 1, wherein, when enabled, the one or more processing modules configured to execute the operational instructions to:
based on an unfavorable verification of the verification package as performed by the STS communication server, receive an error message that is based on of the unfavorable verification of the verification package to the ICD from the STS communication server.

4. The UCD of claim 1, wherein the user ID for the UCD further comprising at least one of:
a user name field;
a password (PW) field;
an address field;
a phone number field;
a date of birth (DOB) field; or
a personal field.

5. The UCD of claim 1, wherein the STS account ID information further comprising at least one of:
a user name field;
a password (PW) field;
an account ID field; or
a time stamps field.

6. The UCD of claim 1, wherein the UCD ID information further comprising at least one of:
an international mobile equipment identity (IMEI) field; or
an internet protocol (IP) address field.

7. The UCD of claim 1, wherein the ICD is further configured to:
generate the verification package based on the user ID package being received by the ICD; and
transmit the verification package to the STS communication server.

8. The UCD of claim 7, wherein the ICD is further configured to:
receive the ACK from the STS communication server that is based on the favorable verification of the verification package as performed by the STS communication server.

9. The UCD of claim 7, wherein the ICD is further configured to:
based on an unfavorable verification of the verification package as performed by the STS communication server, receive an error message that is based on of the unfavorable verification of the verification package to the ICD from the STS communication server.

10. The UCD of claim 7, wherein the verification package further comprising an aggregate of the user ID package and an ICD operator ID package.

11. The UCD of claim 10, wherein the ICD operator ID package further comprising operator ID information for the ICD, STS account ID information, and ICD ID information.

12. The UCD of claim 11, wherein the operator ID information for the ICD further comprising at least one of:
an operator name field;
an operator password field;
an address field;
a phone number field; or
an operator unique ID field.

13. The UCD of claim 11, wherein the STS account ID information further comprising at least one of:
an operator name field;
a password field; or
an account ID field.

14. The UCD of claim 11, wherein the ICD ID information further comprising at least one of:
an international mobile equipment identity (IMEI) field; or
an internet protocol (IP) address field.

15. A user computing device (UCD) comprising:
memory that stores operational instructions; and
one or more processing modules operably coupled to the memory, wherein, when enabled, the one or more processing modules configured to execute the operational instructions to operate a screen to screen (STS) communication application to facilitate STS communications between the UCD and an interactive computing device (ICD) including to:
generate a user identification (ID) package;
generate a drive-sense signal that has an oscillating component and that is based on the user ID package;
transmit the user ID package to the ICD via an STS connection between UCD and the ICD via driving the drive-sense signal on a single line to a touch sense element of the UCD, wherein the STS connection between the UCD and the ICD is based on at least one of a human body or a close proximity between the UCD and the ICD;
detect change of the drive-sense signal on the single line; and
based on a favorable verification of a verification package as performed by a STS communication server that is communication with at least one of the UCD or the ICD, receive an acknowledgement (ACK) from the STS communication server that is based on the favorable verification of the verification package as performed by the STS communication server, wherein:
the verification package is based on the user ID package being received by the ICD;

the verification package is generated by the ICD based on the user ID package being received by the ICD and transmitted by the ICD to the STS communication server;

the user ID package including a user ID for the UCD, a STS account ID information, and UCD ID information; and the verification package further including an aggregate of the user ID package and an ICD operator ID package.

16. The UCD of claim 15, wherein, when enabled, the one or more processing modules configured to execute the operational instructions to:

based on the favorable verification of the verification package as performed by the STS communication server, transmit a confirmation of the favorable verification of the verification package as performed by the STS communication server to the ICD via driving the drive-sense signal on a single line to a touch sense element of the UCD.

17. The UCD of claim 15, wherein, when enabled, the one or more processing modules configured to execute the operational instructions to:

based on an unfavorable verification of the verification package as performed by the STS communication server, receive an error message that is based on of the unfavorable verification of the verification package to the ICD from the STS communication server.

18. The UCD of claim 15, wherein:

the user ID for the UCD further including at least one of:
a user name field;
a password (PW) field;
an address field;
a phone number field;
a date of birth (DOB) field; or
a personal field;

the STS account ID information further including at least one of:
another user name field;
another password (PW) field;
an account ID field; or
a time stamps field; and the UCD ID information further including at least one of:
an international mobile equipment identity (IMEI) field; or
an internet protocol (IP) address field.

19. The UCD of claim 15, wherein:

the ICD operator ID package further including operator ID information for the ICD, STS account ID information, and ICD ID information.

20. The UCD of claim 19, wherein:

the operator ID information for the ICD further including at least one of:
an operator name field;
an operator password field;
an address field;
a phone number field; or
an operator unique ID field;

the STS account ID information further including at least one of:
an operator name field;
a password field; or
an account ID field; and the ICD ID information further including at least one of:
an international mobile equipment identity (IMEI) field; or
an internet protocol (IP) address field.

* * * * *